I
US006957870B2

(12) United States Patent
Kagawa et al.

(10) Patent No.: US 6,957,870 B2
(45) Date of Patent: Oct. 25, 2005

(54) BRAKING PRESSURE CONTROL APPARATUS CAPABLE OF SWITCHING BETWEEN TWO BRAKE OPERATING STATES USING POWER-OPERATED AND MANUALLY OPERATED PRESSURE SOURCES, RESPECTIVELY

(75) Inventors: Kazunori Kagawa, Toyota (JP);
Kimihiro Matsuki, Aichi-ken (JP);
Tetsuya Miyazaki, Toyota (JP);
Fumiaki Kawahata, Toyota (JP);
Akihiro Otomo, Toyota (JP); Eiji Nakamura, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/736,440

(22) Filed: Dec. 15, 2000

(65) Prior Publication Data

US 2001/0006306 A1 Jul. 5, 2001

(30) Foreign Application Priority Data

Dec. 24, 1999 (JP) .................................. 11-367991
Dec. 24, 1999 (JP) .................................. 11-367992

(51) Int. Cl.[7] ................................................ B60T 8/48
(52) U.S. Cl. .............................. 303/113.4; 303/122.11; 303/155
(58) Field of Search ........................ 303/113.4, 122.11, 303/714.1, 155, 116.1, 116.2, 146, 147, 148

(56) References Cited

U.S. PATENT DOCUMENTS

| | | | |
|---|---|---|---|
| 3,802,745 A | 4/1974 | Strifler et al. | |
| 4,817,767 A | 4/1989 | Seibert et al. | |
| 4,848,853 A | 7/1989 | Mizuno et al. | |
| 4,869,560 A | 9/1989 | Nishii | |
| 4,874,207 A | 10/1989 | Nishii et al. | |
| 5,568,962 A | 10/1996 | Enomoto et al. | |
| 5,588,718 A | 12/1996 | Winner et al. | |
| 5,762,406 A | 6/1998 | Yasui et al. | |
| 5,769,509 A | 6/1998 | Feigel et al. | |
| 5,887,954 A * | 3/1999 | Steiner et al. | 303/113.4 |
| 5,927,827 A | 7/1999 | Reuter et al. | |
| 6,019,438 A * | 2/2000 | Sawada et al. | 303/113.4 |
| 6,062,655 A * | 5/2000 | Nishii et al. | 303/113.4 |
| 6,076,897 A | 6/2000 | Binder et al. | |

(Continued)

FOREIGN PATENT DOCUMENTS

JP 63-20256 1/1988

(Continued)

*Primary Examiner*—Matthew C. Graham
(74) *Attorney, Agent, or Firm*—Oliff & Berridge, PLC

(57) ABSTRACT

A braking pressure control apparatus including a first pressure source including a power-operated pressurizing device, a second pressure source operable by a manually operable brake operating member to pressurize a fluid to a pressure higher than a level corresponding to the operating force of the brake operating member, a switching device for selectively placing the braking system in a first state in which a brake cylinder is operated with the fluid pressurized by the first pressure source and a second state in which the brake cylinder is operated with the fluid pressurized by the second pressure source, and a change restricting device operable upon a switching between the first and second states, to restrict a change of the operating state of the brake operating member and a change of the brake cylinder pressure, which change take place due to the switching, or a switching control device for controlling the switching device on the basis of the running condition of a vehicle whose wheel is braked by the braking pressure.

49 Claims, 27 Drawing Sheets

U.S. PATENT DOCUMENTS

| | | |
|---|---|---|
| 6,126,248 A | 10/2000 | Kawahata et al. |
| 6,158,825 A | 12/2000 | Schunck et al. ......... 303/113.4 |
| 6,309,031 B1 * | 10/2001 | Crombez et al. ........ 303/113.4 |
| 6,315,371 B1 * | 11/2001 | Wachi et al. ............ 303/113.4 |
| 6,345,871 B1 * | 2/2002 | Harris et al. ............. 303/113.4 |
| 6,354,672 B1 | 3/2002 | Nakamura et al. |
| 6,425,644 B2 * | 7/2002 | Kawahata et al. ..... 303/122.11 |

FOREIGN PATENT DOCUMENTS

| | | |
|---|---|---|
| JP | A-1-106760 | 4/1989 |
| JP | 4-232153 | 8/1992 |
| JP | 4-244464 | 9/1992 |
| JP | 5-65060 | 3/1993 |
| JP | 7-336806 | 12/1995 |
| JP | 8-506301 | 7/1996 |
| JP | 9-39768 | 2/1997 |
| JP | 9-118213 | 5/1997 |
| JP | 9-123887 | 5/1997 |
| JP | A-9-142273 | 6/1997 |
| JP | 10-86804 | 4/1998 |
| JP | 11-115737 | 4/1999 |

* cited by examiner

FRONT WHEELS

REAR WHEELS

REAR WHEELS

REAR WHEELS

FIG. 6
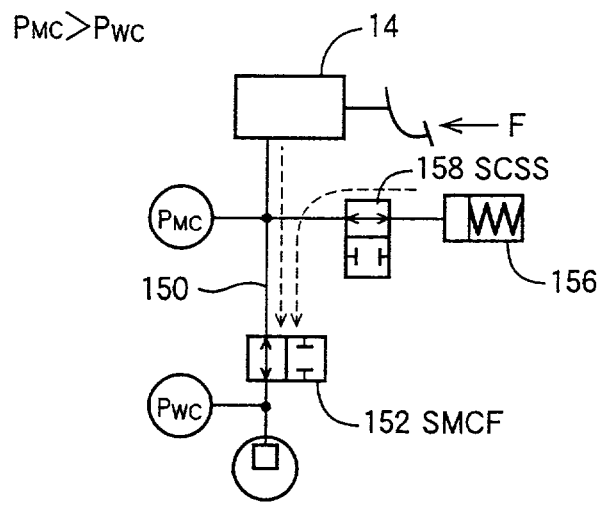
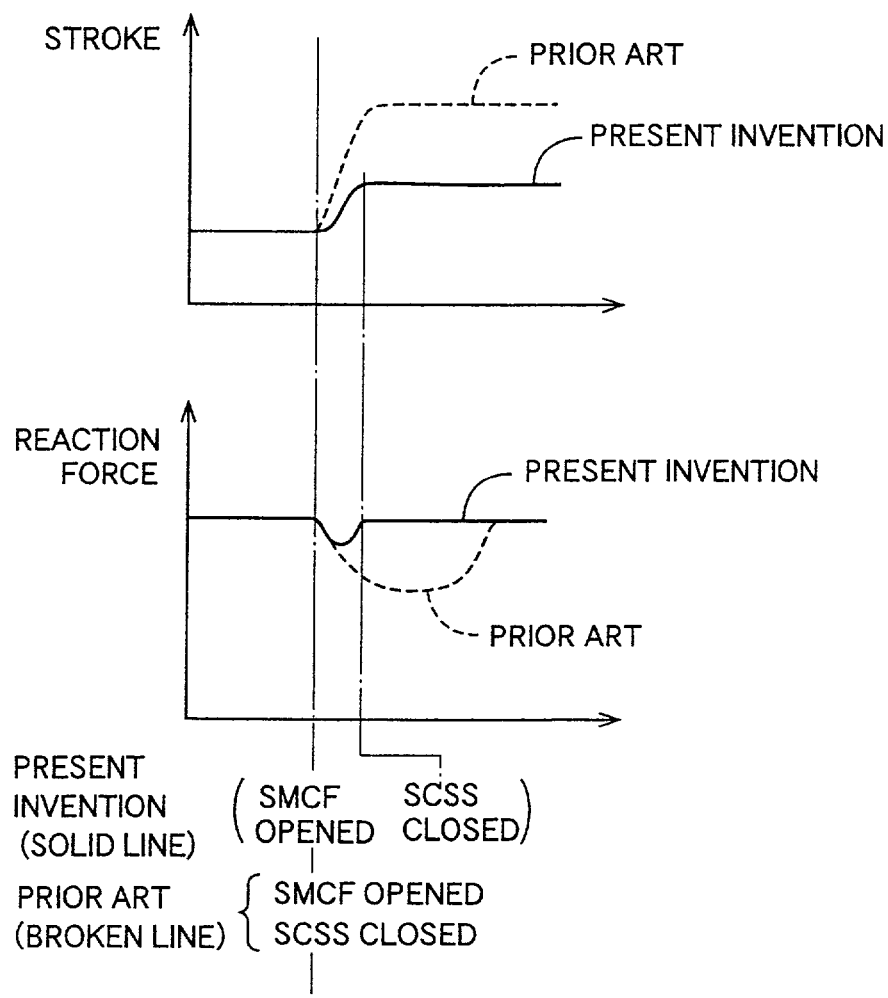

FIG. 19A

| ABNORMAL DEVICES OR ELEMENTS | | ABNORMAL STATE (TREATMENTS) | FIRST STATE | |
|---|---|---|---|---|
| | | | KEPT | INHIBITED |
| PUMP DEVICE (FIRST HYD. PRESSURE SOURCE) | PUMP MOTOR | LOW ACCUMULATOR PRESSURE | | O |
| | PUMP | LOW ACCUMULATOR PRESSURE | | O |
| | ACCUMULATOR | LOW ACCUMULATOR PRESSURE | | O |
| SECOND HYD. SYSTEM | SHUT-OFF VALVE | STUCK IN CLOSED POSITION | | O |
| | STROKE SIMLATOR | SHUT-OFF VALVE STUCK IN CLOSED POSITION | | O |
| | HYDRAULIC BOOSTER | LOW MASTER CYLINDER PRESSURE OR LOW BOOSTER PRESSURE | O | |
| LINEAR VALVE DEVICES | INCREASING VALVE | STUCK IN OPEN POSITION (PRESSURE DROP AFTER RAPID RISE → LOW ACCUMULATOR PRESSURE) | | O |
| | | STUCK IN CLOSED POSITION (OPENING COMMUNICATING VALVE) | | O |

FIG. 19B

| ABNORMAL DEVICES OR ELEMENTS | | ABNORMAL STATE (TREATMENTS) | FIRST STATE | |
|---|---|---|---|---|
| | | | KEPT | INHIBITED |
| | | (CONTROLLING 4 BRAKE CYLINDERS) | | |
| | REDUCING VALVE | STUCK IN OPEN POSITION (CONTROLLING 3 BRAKE CYLINDERS) | O | |
| | | STUCK IN CLOSED POSITION (OPENING COMMUNICATING VALVE) (CONTROLLING 4 BRAKE CYLINDERS) | O | |
| | FRONT OR REAR LINEAR VALVE | ABNORMAL VALVE IN SECOND STATE AND NORMAL VALVE IN FIRST STATE | O | |
| SENSORS | CYLINDER PRESSURE SENSOR | OPENING COMMUNICATING VALVE (CONTROLLING 4 BRAKE CYLINDERS) | O | |
| | ONE OF TWO ACC PRESSURE SENSORS | INACCURATE DETECTION OF ACC PRESSURE, ALTHOUGH THE DETECTION IS POSSIBLE BY THE OTHER NORMAL SENSOR | | O |

FIG. 19C

| ABNORMAL DEVICES OR ELEMENTS | | ABNORMAL STATE | FIRST STATE | |
|---|---|---|---|---|
| | | | KEPT | INHIBITED |
| | ONE OF TWO MC PRESSURE SENSORS | CONTROL BASED ON THE OTHER NORMAL SENSOR, OR THE STROKE SENSORS | O | |

BRAKING PRESSURE CONTROL APPARATUS CAPABLE OF SWITCHING BETWEEN TWO BRAKE OPERATING STATES USING POWER-OPERATED AND MANUALLY OPERATED PRESSURE SOURCES, RESPECTIVELY

This application is based on Japanese Patent Applications Nos. 11-367991 and 11-367992 both filed Dec. 24, 1999, the contents of which are incorporated hereinto by reference.

BACKGROUND OF THE INVENTION

1. Field of the Invention

The present invention relates to a braking pressure control apparatus including two hydraulic systems for operating a hydraulically operated brake.

2. Discussion of Related Art

JP-A-5-65060 discloses a braking pressure control apparatus including (1) a brake cylinder, (2) a power-operated hydraulic pressure source operable to pressurize a working fluid to a level corresponding to an operating force acting on a manually operable brake operating member, (3) a master cylinder operable with the operating force of the brake operating member to pressurize the fluid, and (4) a solenoid-operated valve device operable between a first state for fluid communication of the brake cylinder with the power-operated hydraulic pressure source, with the brake cylinder being disconnected from the master cylinder, and a second state for fluid communication of the brake cylinder with the master cylinder, with the brake cylinder being disconnected from the power-operated hydraulic pressure source. This braking pressure control apparatus suffers from a drawback which is caused upon switching of the operating state of the solenoid-operated valve device between the first and second states, for instance, an undesirable variation of the operating state of the brake operating member.

JP-A-5-65060 also discloses an example of a braking pressure control apparatus of the type including (1) a first hydraulic system including a power-operated hydraulic pressure source operable to pressurize the working fluid and capable of controlling the pressure of the pressurized fluid, for operating a brake with the pressurized fluid delivered from the power-operated hydraulic pressure source, (2) a second hydraulic system including a master cylinder operable with an operating force acting on a manually operable brake operating member, to pressurize the working fluid, for operating the brake with the pressurized fluid delivered from the master cylinder, (3) a switching device operable to selectively establish a first operating state in which the brake is operated with the pressurized fluid delivered from the power-operated hydraulic pressure source, and a second operating state in which the brake is operated with the pressurized fluid delivered from the master cylinder, and (4) a control device for controlling the switching device such that the braking system is placed in the operating state while the first hydraulic system is normal, and in the second operating state while the first hydraulic system is abnormal.

In the braking pressure control apparatus described just above, the master cylinder provided in the first hydraulic system is adapted to pressurize the fluid on the basis of the operating force of the brake operating member, but the pressure of the fluid pressurized by the master cylinder cannot be made higher than a level corresponding to the operating force of the brake operating member. Further, the second hydraulic system is operated to operate the brake only while the first hydraulic system is abnormal.

SUMMARY OF THE INVENTION

It is a first object of the present invention to provide a braking pressure control apparatus which is constructed to minimize the drawback caused upon switching of a solenoid-operated valve device.

A second object of this invention is to provide a braking pressure control apparatus which includes a first hydraulic system operable to operate a brake with a pressurized fluid delivered by a power-operated hydraulic pressure source and a second hydraulic system operable to operate the brake with a pressurized fluid having a pressure corresponding to the operating force of a brake operating member, and which apparatus permits more effective functioning of the first and second hydraulic systems.

The first object may be achieved according to any one of the following modes (1)–(32) of the present invention, and the second object may be achieved according to any one of the following modes (33)–(75). Each of the following modes is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking pressure control apparatus for controlling a pressure of a working fluid in a brake cylinder in a hydraulically operated braking system, the braking pressure control apparatus comprising:

a first hydraulic pressure source including a power-operated pressurizing device for pressurizing the fluid;

a second hydraulic pressure source operable by an operation of a manually operable brake operating member, to pressurize the fluid to a pressure higher than a level corresponding to an operating force acting on the brake operating member;

a switching device for selectively placing the braking system in a first operating state in which the brake cylinder is operated with the pressurized fluid delivered from the first hydraulic pressure source while the brake cylinder is disconnected from the second hydraulic pressure source, and a second operating state in which the brake cylinder is operated with the pressurized fluid delivered from the second hydraulic pressure source while the brake cylinder is disconnected from the first hydraulic pressure source; and a change restricting device operable upon a switching of the braking system between the first and second operating states by the switching device, to restrict at least one of a change of an operating state of the brake operating member and a change of the fluid pressure in the brae cylinder, which changes take place due to the switching.

In the braking pressure control apparatus constructed according to the above mode (1) of this invention, the change restricting device is provided to restrict a change of the operating state of the manually operable brake operating member, and/or a change of the fluid pressure in the brake cylinder, which changes take place when the braking system is switched between the first and second operating states. Accordingly, the present braking pressure control apparatus is less likely to suffer from drawbacks or inconvenience which would be caused upon switching of the braking system between the first and second operating states. For instance, the present braking pressure control apparatus is less likely to suffer from a change of the operating state of the brake operating member which is unexpected to the operator of the braking system, a noise generated upon switching of the braking system between the first and second operating states by the switching device, and an undesirable change in the generated braking force upon switching between the first and second operating states, as described below in detail with respect to the following modes of the invention.

The change of the operating state of the brake operating member includes a change in the operating stroke of the brake operating member, and a change in the reaction fore acting on the brake operating member. The change of the fluid pressure in the brake cylinder includes a change in the amount of change of the brake cylinder pressure, a change in the rate of change of the brake cylinder pressure, a change in a derivative of the rate of change, and a change in the other parameters relating to the level of the brake cylinder pressure, and further includes a change in the manner of control of the brake cylinder pressure.

Where the braking system is used in an automotive vehicle, the braking system is switched between the first and second operating states, depending upon the state of the vehicle. The state of the vehicle includes states indicating whether elements of a vehicle drive device, a braking device (including the hydraulically operated braking system), a steering device and other devices of the vehicle are normal or abnormal, and running states of the vehicle. The states indicating whether the braking device is normal or abnormal includes abnormal or defective states of the first and second hydraulic pressure sources. The running states of the vehicle include a state in which the hydraulically operated braking system should be operated in an anti-lock braking pressure control mode, a state in which the hydraulically operated braking system should be operated in a vehicle turning stability control mode. The switching device is commanded to switch the braking system between the first and second operating states, when any one of predetermined running conditions for switching the braking system is satisfied. For instance, the braking system is switched from the second operating state to the first operating state, when a predetermined condition for initiating the anti-lock braking pressure control is satisfied during an operation of the brake operating member, or when a predetermined condition for initiating the vehicle turning stability control is satisfied during turning of the vehicle. Conversely, the braking system is switched from the first operating state to the second operating state, when a predetermined condition for terminating the anti-lock braking pressure control or a predetermined condition for terminating the vehicle turning stability control is satisfied.

Further, the braking system may be switched between the first and second operating states, when a suitable control switch on an instrument panel or a suitable manually operable operating member is operated by the vehicle operator. For example, the braking system is switched from the second operating state to the first operating state, when the vehicle operator activates or turns on an operating member or a switch which is provided for initiating a braking effect control in which the fluid pressure in the brake cylinder for braking each wheel of the vehicle is controlled so that the deceleration value of the vehicle corresponds to the operating amount of the brake operating member.

The vehicle on which the present braking pressure control apparatus is installed may includes an electric motor as a drive power source. In this case, the braking device may be operated in a cooperative braking control mode in which the hydraulic braking force to be generated by the brake cylinder in the hydraulically operated braking system is controlled such that a sum of this hydraulic braking force and a regenerative braking force to be generated by the electric motor coincides with a value desired by the vehicle operator. This cooperative braking control is effected while the braking system is placed in the first operating state. When a predetermined condition for terminating the cooperative braking control is satisfied, the braking system is switched from the first operating state to the second operating state.

In the first operating state of the braking system, the fluid pressure in the brake cylinder is controlled by controlling the first hydraulic pressure source. Where the first hydraulic pressure source includes a pressure control valve device disposed between the pressurizing device and the brake cylinder, the pressure control valve device is controlled to control the fluid pressure in the brake cylinder. Where the first hydraulic pressure source does not include such a pressure control valve device, the amount of power to be supplied to the pressurizing device is controlled to control the brake cylinder pressure.

The above-indicated "level corresponding to an operating force acting on the brake operating member" is typically proportional to the operating force of the brake operating member. The above-indicated level of the brake cylinder pressure may be either linearly or non-linearly proportional to the operating force of the brake operating member. That is, the above-indicated level has a predetermined relationship with the operating force, and is determined by the operating force.

(2) A braking pressure control apparatus according to the above mode (1), wherein the second hydraulic pressure source includes at least one of a booster for boosting the operating force of the brake operating member, and a pressure-increasing device for increasing the fluid pressure generated by operation of the brake operating member.

Where the second hydraulic pressure source includes at least one of the booster and the pressure-increasing device, the pressure of the fluid pressurized by the second hydraulic pressure source can be made higher than the level corresponding to the operating force of the brake operating member. Accordingly, the change in the braking force generated by the brake cylinder can be restricted when the braking system is switched from the first operating state to the second operating state during an operation of the brake cylinder in the first operating state to generate the braking force larger than a value corresponding to the operating force of the brake operating member. The braking pressure control apparatus according to the above mode (2) is therefore capable of restricting the change of the operating state of the brake operating member upon switching of the braking system from the first operating state to the second operating state. In this sense, the booster and the pressure-increasing device indicated above may be considered to be a part of the change restricting device.

The booster may be a hydraulic booster described below with respect to the following mode (3), or a vacuum booster.

The hydraulic booster is supplied with a pressurized fluid from a suitable pressure source which is capable of pressurizing the fluid to a level higher than the maximum pressure that can be generated by the second hydraulic pressure source based on the operating force of the brake operating member. This pressure source may include a pump device or an accumulator. The first hydraulic pressure source may also serve as this pressure source for the hydraulic booster.

(3) A braking pressure control apparatus according to the above mode (1) or (2), wherein the second hydraulic pressure source includes a hydraulic booster for boosting the operating force of the brake operating member, the hydraulic booster being operable with a pressurized fluid having a pressure higher than a maximum pressure that can be generated by the second hydraulic pressure source based on the operating force of the brake operating member.

(4) A braking pressure control apparatus according to the above mode (3), wherein the hydraulic booster includes a pressure regulating device operable to regulate the pressure of a pressurized fluid received a pressure source, to a level corresponding to the operating force of the brake operating member, the hydraulic booster having a booster chamber which receives the pressurized fluid whose pressure has been regulated by the pressure regulating portion, the booster chamber being partially defined by a rear end face of a power piston which is operatively connected to the brake operating member.

The hydraulic booster provided in the apparatus according to the above mode (4) has a preferred arrangement.

(5) A braking pressure control apparatus according to any one of the above modes (1)–(4), wherein the switching device includes a solenoid-operated cut-off valve disposed in a fluid passage which connects the second hydraulic pressure source and the brake cylinder, and the change restricting device includes a solenoid-operated-cut-off-valve control portion for controlling the solenoid-operated cut-off valve.

In the first operating state of the braking system, the solenoid-operated cut-off valve is placed in its closed state disconnecting the brake cylinder from the second hydraulic pressure source. When the solenoid-operated cut-off valve is switched to the open state for permitting the fluid flows between the second hydraulic pressure source and the brake cylinder, the brake cylinder can be operated with the pressurized fluid delivered from the second hydraulic pressure source. Thus, the braking system can be smoothly switched between the first and second operating states, by controlling the solenoid-operated cut-off valve.

The solenoid-operated cut-off valve may be a solenoid-operated shut-off valve which is selectively placed in its open and closed states by energization or de-energization of its solenoid coil with an electric current, as described below with respect to the following mode (9). Alternatively, the solenoid-operated cut-off valve may be a solenoid-operated flow control valve whose amount of opening for fluid flow therethrough is changed by controlling the amount of electric current applied to its solenoid coil, as described below with respect to the following mode (8).

Where the solenoid-operated cut-off valve is a solenoid-operated shut-off valve which is switched from its closed state to the open state when the braking system is switched from the first operating state to the second operating state, the change restricting device may be adapted to alternately open and close the cut-off valve (shut-off valve) with a controlled duty ratio or cycle. Where the solenoid-operated cut-off valve is a solenoid-operated flow control valve whose solenoid coil is energized with a predetermined amount of electric current to permit the corresponding rate of fluid flow therethrough when the braking system is switched from the first operating state to the second operating state, the change restricting device may be adapted to energize the solenoid coil such that the amount of electric current applied to the coil is intermediate between the above-indicated predetermined amount and an amount (e.g., zero) for the fully closed state. In either of these cases, the rate of increase of the fluid pressure in the brake cylinder can be restricted by the change restricting device. The change restricting device may be adapted to control the moments at which the solenoid-operated shut-off is opened and closed or the moment at which the rate of fluid flow through the solenoid-operated flow control valve is controlled.

(6) A braking pressure control apparatus according to the above mode (5), wherein the second hydraulic pressure source includes a power piston operatively connected to the brake operating member, a pressurizing piston connected to the power piston, a pressure source capable of delivering a pressurized fluid, and a pressure regulating device operable to regulate the pressure of the pressurized fluid received from the pressure source to a level corresponding to the operating force of the brake operating member, the second hydraulic pressure source having a first pressure chamber which is partially defined by a rear end face of the power piston and which receives the pressurized fluid whose pressure has been regulated by the pressure regulating device, the second hydraulic pressure source further having a second pressure chamber partially defined by a front end face of the pressurizing piston, and wherein the hydraulically operated braking system includes a plurality of brake cylinders including at least one first brake cylinder connected through a first fluid passage to the first pressure chamber, and at least one second brake cylinder connected through a second fluid passage to the second pressure chamber, the change restricting device includes a first solenoid-operated cut-off valve provided in the first fluid passage, and a second solenoid-operated cut-off valve provided in the second fluid passage, the solenoid-operated-cut-off-valve control portion being operable to control at least one of the first and second solenoid-operated cut-off valves, for restricting at least one of (1) at least one of a difference between the fluid pressure in the at least one first brake cylinder and the fluid pressure in the first pressure chamber, and a difference between the fluid pressure in the at least one second brake cylinder and the fluid pressure in the second pressure chamber, and (2) a difference between the fluid pressures in the at least one first brake cylinder and the at least one second brake cylinder.

The hydraulically braking system including the braking pressure control apparatus according to the above mode (6) of this invention has two sub-systems one of which includes at least one first brake cylinder connected to the first pressure chamber, and the other of which includes at least one second brake cylinder connected to the second pressure chamber. Further, the two sub-systems include the respective first and second solenoid-operated cut-off valves. By controlling the first and second solenoid-operated cut-off valves upon switching of the braking system between the first and second operating states, the fluid pressure difference between the first brake cylinder and the first pressure chamber, and/or the fluid pressure difference between the second brake cylinder and the second pressure chamber can be restricted. Further, the fluid pressure difference between the first and second brake cylinders can be restricted.

(7) A braking pressure control apparatus according to the above mode (6), wherein the solenoid-operated-cut-off-valve control portion is operable upon switching of the braking system from the first operating state to the second operating state, to open the second solenoid-operated cut-off valve so as to permit flows of the fluid through the second fluid passage, before opening the first solenoid-operated cut-off valve.

In the braking pressure control apparatus according to the above mode (7), the moments at which the first and second solenoid-operated cut-off valves are switched form the closed state to the open state are controlled upon switching of the braking system form the first operating state to the second operating state. Opening the first and second solenoid-operated cut-off valves at different times makes it possible to reduce the difference between the fluid pressures in the brake cylinder and the pressure chamber which correspond to the cut-off valve which is opened later, as compared with simultaneous opening of the two cut-off valves. Further, this control of the two cut-off valves may make it possible to reduce the amount of change of the fluid pressure in that brake cylinder, and reduce the fluid pressure difference between the first and second brake cylinders. While either one of the first and second cut-off valves is opened prior to the other depending upon the characteristic of the braking system, it is generally advantageous to delay the opening action of the cut-off valve corresponding to the brake cylinder which has a higher degree of operating response, with respect to the opening action of the other cut-off valve.

In the present braking pressure control apparatus, the opening action of the first solenoid-operated cut-off valve is delayed, since the corresponding first brake cylinder usually has a higher degree of operating response. Namely, the rate of increase of the fluid pressure in the first brake cylinder is higher than that of the fluid pressure in the second brake cylinder, when the pressurized fluid is delivered from the second hydraulic pressure source to the first and second brake cylinders, provided the fluid pressure difference between the first pressure chamber and the first brake cylinder is the same as that between the second pressure chamber and the second brake cylinder. The first pressure chamber is supplied with the pressurized fluid which is delivered from the pressure source and whose pressure has been regulated by the pressure regulating device, so that the pressurized fluid is delivered from the first pressure chamber to the first brake cylinder, at a higher rate of flow, whereby the fluid pressure in the first brake cylinder is increased at a higher rate. On the other hand, the fluid in the second pressure chamber is pressurized by an advancing movement of the pressurizing piston, and the thus pressurized fluid is delivered to the second brake cylinder, so that the rate of increase of the fluid pressure in the second brake cylinder is usually lower than that of the fluid pressure in the first brake cylinder.

In view of the above tendencies, the solenoid-operated-cut-off-valve control portion in the braking pressure control apparatus according to the above mode (7) is arranged to open the second solenoid-operated cut-off valve before opening the first solenoid-operated cut-off valve, for reducing the fluid pressure in the second pressure chamber to thereby reduce the fluid pressure in the first pressure chamber. The first cut-off valve is opened after the fluid pressure in the first pressure chamber has been sufficiently reduced, so that the pressure difference between the first brake cylinder and the first pressure chamber upon opening of the first cut-off valve can be made smaller than when the first and second cut-off valves are opened simultaneously. As a result, the amount of change of the fluid pressure in the first brake cylinder can be restricted, and the pressure difference between the first and second brake cylinders can be restricted. It will be understood that the braking pressure control apparatus according to the above mode (7) is effective particularly in the braking system wherein the first brake cylinder has a higher degree of operating response than the second brake cylinder.

(8) A braking pressure control apparatus according to any one of the above modes (5)–(7), wherein the solenoid-operated cut-off valve is a solenoid-operated flow control valve whose amount of opening for fluid flows therethrough changes with an amount of electric current applied thereto, and wherein the solenoid-operated-cut-off-valve control portion controls the amount of opening of the solenoid-operated flow control valve on the basis of a difference between the fluid pressure in the brake cylinder and the pressure of the fluid pressurized by the second hydraulic pressure source.

In the braking pressure control apparatus according to the above mode (8), the amount of opening of the flow control valve for fluid flows therethrough is made smaller when the absolute value of the pressure difference between the brake cylinder and the second hydraulic pressure source is relatively large, than when the absolute value is relatively small. In this respect, it is noted that the rate of change of the fluid pressure in the brake cylinder when the flow control valve has a certain amount of opening is higher when the absolute value of the above-indicated pressure difference is relatively large, than when the absolute value is relatively small. Accordingly, the amount of opening of the flow control valve is made relatively small when the absolute value of the pressure difference is relatively large.

The amount of opening of the flow control valve may be gradually changed with the time which has passed after the condition for switching the braking system from the first operating state to the second operating state is satisfied. It is possible to alleviate inconveniences that may occur upon switching of the braking system from the first operating state to the second operating state, by gradually increasing the amount of opening of the flow control valve as the time passes. Such inconveniences may be similarly alleviated by controlling the amount of opening of the flow control valve on the basis of the absolute value of the pressure difference between the brake cylinder and the second hydraulic pressure source.

(9) A braking pressure control apparatus according to any one of the above modes (5)–(8), wherein the solenoid-operated cut-off valve is a solenoid-operated shut-off valve which has a solenoid coil and which is selectively placed in an open state and a closed state by energization and de-energization of the solenoid coil, and wherein the solenoid-operated-cut-off-valve control portion includes a duty-control portion operable to control a duty ratio of the solenoid-operated shut-off valve.

The rate of flow of the fluid through the solenoid-operated shut-off valve can be controlled by controlling the duty ratio or cycle of the shut-off valve. Accordingly, the rate of change of the fluid pressure in the brake cylinder can be controlled by controlling the duty ratio. The duty ratio may be determined on the basis of the absolute value of the difference between the fluid pressure in the brake cylinder and the pressure of the fluid pressurized by the second hydraulic pressure source, as in the braking pressure control apparatus according to the above mode (8).

(10) A braking pressure control apparatus according to any one of the above modes (5)–(9), wherein the solenoid-operated-cut-off-valve control portion controls the solenoid-operated cut-off valve while an absolute value of a difference between the fluid pressure in the brake cylinder and the pressure of the fluid pressurized by the second hydraulic pressure source is larger than a predetermined threshold.

The solenoid-operated cut-off valve may be switched from the closed state to the open state immediately after the braking system is commanded to be switched from the first operating state to the second operating state, while the absolute value of the pressure difference between the brake cylinder and the second hydraulic pressure source is relatively small. In this condition, there exists a relatively low need for the change restricting device to control the solenoid-operated cut-off valve. When the absolute value of the above-indicated pressure difference is relatively large, the rate of change of the fluid pressure in the brake cylinder is higher than when the absolute value is relatively small, so that the need for controlling the solenoid-operated cut-off valve is relatively high.

(11) A braking pressure control apparatus according to any one of the above modes (5)–(10), wherein the solenoid-operated-cut-off-valve control portion initiates controlling the solenoid-operated cut-off valve upon detection of a symptom indicating a high degree of probability that the switching device switches the braking system between the first operating state and the second operating states.

For instance, the solenoid-operated-cut-off-valve control portion may be arranged to initiate controlling the solenoid-operated cut-off valve upon detection of a symptom indicating a high degree of probability that a predetermined condition for switching the braking system between the first and second operating states will be satisfied in the near future (within a predetermined time). This arrangement permits more effective control of the cut-off valve so as to alleviate the inconveniences which would occur upon switching of the braking system, than the arrangement wherein the control of the cut-off valve is initiated when the predetermined condition for switching the braking system is satisfied.

As described below, the braking system is switched from the second operating state to the first operating state when a predetermined condition for initiating the anti-lock braking pressure control or a predetermined condition for initiating the vehicle turning stability control is satisfied. For instance, the condition for initiating the anti-lock braking pressure control is satisfied when the amount of slipping or locking of any wheel of the vehicle being braked has exceeded a predetermined first upper limit, and the condition for initiating the vehicle turning stability control is satisfied when the degree of turning stability of the vehicle has been lowered to a predetermined first lower limit. In these instances, the symptom indicating a high degree of probability that the condition for initiating the anti-lock braking pressure control is satisfied is detected when the amount of slipping or locking of the wheel being braked has exceeded a predetermined second upper limit smaller than the first upper limit, and when the slipping or locking amount is being increased. The symptom indicating a high degree of probability that the condition for initiating the vehicle turning stability control is satisfied is detected when the degree of turning stability of the vehicle has been lowered to a predetermined second lower limit higher than the first lower limit, and when the degree of turning stability is being reduced. Further, a symptom indicating a high degree of probability that the switching device switches the braking system from the first operating state to the second operating state is detected, for instance, when a predetermined condition for terminating the anti-lock braking pressure control is expected to be satisfied in the near future, and a symptom indicating a high degree of probability that a predetermined condition for terminating the vehicle turning stability control is expected to be satisfied in the near future.

The braking system is switched from the first second operating state to the first operating state when a predetermined condition for terminating the cooperative braking control is satisfied. For instance, the condition for terminating the cooperative braking control is satisfied when the operating speed of the electric motor has been lowered to a predetermined first lower limit, or when the amount of electric energy that can be stored in the battery has been reduced to a predetermined first lower limit. In these instances, the symptom indicating a high degree of probability that the condition for terminating the cooperative braking control is satisfied is detected when the operating speed of the electric motor has been lowered to a predetermined second lower limit higher than the first lower limit, and when the operating speed is being lowered, or when the amount of electric energy that can be stored in the battery has been reduced to a predetermined second lower limit larger than the first lower limit, and when the amount of electric energy that can be stored is being reduced.

The braking system is switched from the first operating state to the second operating state when an abnormality of the first hydraulic pressure source is detected, and is switched from the second operating state to the first operating state when an abnormality of the second hydraulic pressure source is detected. For instance, an abnormality of the first hydraulic pressure source is detected when the pressure of the fluid pressurized by the pressurizing device of the first hydraulic pressure source is lower than a predetermined first lower limit. In this case, a symptom indicating a high degree of probability that there exists an abnormality of the first hydraulic pressure source is detected when the pressure of the fluid pressurized by the first hydraulic pressure source is lower than a predetermined second lower limit higher than the first lower limit, and when the pressure is being lowered.

(12) A braking pressure control apparatus according to any one of the above modes (5)–(11), wherein the solenoid-operated-cut-off-valve control portion is operable only when the braking system is switched from the first operating state to the second operating state, and is inoperable when the braking system is switched from the second operating state to the first operating state.

When the braking system is switched from the first operating state to the second operating state, the solenoid-operated cut-off valve is switched from the closed state to the open state, so that the brake cylinder is communicated with the second hydraulic pressure source, and the fluid pressure in the brake cylinder is made equal to that of the second hydraulic pressure source. When the fluid pressure in the brake cylinder is considerably different from the pressure of the second hydraulic pressure source upon switching of the braking system from the first operating state to the second operating state, the fluid pressure in the brake cylinder is changed at a relatively high rate.

When the braking system is switched from the second operating state to the first operating state, the cut-off valve is switched from the open state to the closed state. In this case, the rate of change of the fluid pressure in the brake cylinder can be restricted by controlling the first hydraulic pressure source.

Accordingly, there is a relatively low need to control the solenoid-operated cut-off valve when the braking system is switched from the second operating state to the first operating state, but the need to control the cut-off valve is relatively high upon switching of the braking system from the first operating state to the second operating state.

(13) A braking pressure control apparatus according to any one of the above modes (1)–(12), wherein the change restricting device includes an orifice provided between the second hydraulic pressure source and the brake cylinder.

The orifice provided between the second hydraulic pressure source and the brake cylinder can restrict the rate of change of the fluid pressure in the brake cylinder, even while the solenoid-operated cut-off valve is in the open state.

(14) A braking pressure control apparatus according to any one of the above modes (6)–(13), wherein the change restricting device includes:

a connecting passage connecting the first fluid passage connecting the first pressure chamber and the at least one first brake cylinder, and the second fluid passage connecting the second pressure chamber and the at least one second brake cylinder, the connecting passage being connected at one end thereof to a portion of the first fluid passage between the first solenoid-operated cut-off valve and the at least one first brake cylinder, and at the other end thereof to a portion of the second fluid passage between the second solenoid-operated cut-off valve and the at least one second brake cylinder;

a communication valve provided in the connecting passage, and operable between a closed state therefore for inhibiting flows of the fluid through the connecting passage, and an open state for permitting the flows of the fluid through the connecting passage; and a communication control portion operable when the braking system is switched between the first and second operating states, to open the communication valve, and open at least one of the first and second solenoid-operated cut-off valves.

In the braking pressure control apparatus according to the above mode (14), the first and second brake cylinders are communicated with one of the first and second pressure chambers, by opening the communication valve and one of the first and second solenoid-operated cut-off valves, so that the first and second brake cylinders are supplied with the pressurized fluid delivered from the above-indicated one of the pressure chambers, which corresponds to the cut-off valve placed in the open state. Accordingly, the difference between the fluid pressures in the first and second brake cylinders can be reduced.

In the above arrangement, the rate of increase of the fluid pressure in each of the first and second brake cylinders can be made lower than in the arrangement in which the first and second brake cylinders are supplied with the pressurized fluids delivered from the respective first and second pressure chambers, in the absence of the connecting passage connecting the first and second brake cylinders through the first and second fluid passages. Where the rate of flow of the pressurized fluid from the first pressure chamber to the first brake cylinder is substantially equal to that of the pressurized fluid from the second pressure chamber to the second brake cylinder, the rate of change of the fluid pressure in each of the first and second brake cylinders can be restricted, irrespective of whether the pressurized fluid is delivered from the first pressure chamber or the second pressure chamber to the first and second brake cylinders. Where the rate of flow of the pressurized fluid from one of the first and second pressure chambers is higher than that of the pressurized from the other pressure chamber, for instance, where the rate of flow of the pressurized fluid from the first pressure chamber is higher than that of the pressurized fluid from the second pressure chamber, the rate of increase of the fluid pressure in the first brake cylinder can be restricted under any condition, but the rate of increase of the fluid pressure in the second brake cylinder may be restricted under some condition, or may be made higher under some other condition. However, the average rate of increase of the fluid pressures in the first and second brake cylinder can be restricted. The change restricting device including the connecting passage and the communication valve is effective to restrict or reduce the difference between the fluid pressures in the first and second brake cylinders, particularly where the rates of flow of the pressurized fluids from the first and second pressure chambers are different from each other.

The communication control portion is required to control only one of the first and second solenoid-operated cut-off valves as well as the communication valve, that is, is not required to simultaneously control the two solenoid-operated cut-off valves.

Like the solenoid-operated cut-off valves, the communication valve may be either a solenoid-operated shut-off valve or a solenoid-operated flow control valve whose amount of opening is variable.

(15) A braking pressure control apparatus according to one of the above modes (1)–(14), wherein the first hydraulic pressure source includes a solenoid-operated pressure control valve device disposed between the pressurizing device and the brake cylinder and operable to control the fluid pressure in the brake cylinder while the braking system is placed in the first operating state, and wherein the change restricting device includes a control-state-change restricting portion operable upon the switching of the braking system between the first and second operating states, to control the solenoid-operated pressure control valve device, so as to restrict a change in the manner of control of the fluid pressure in the brake cylinder before and after the switching of the braking system.

The change in the manner of control of the brake cylinder pressure before and after the switching of the braking system between the first and second operating states can be restricted by controlling the solenoid-operated pressure control valve device. The brake cylinder pressure may be controlled either electrically or mechanically. The brake cylinder pressure may be electrically controlled by controlling an amount of electric energy to be applied to an appropriate pressure control device, in both the first operating state and the second operating state. Alternatively, the brake cylinder pressure may be electrically controlled in the first operating state only, and mechanically in the second operating state.

When the predetermined condition for switching the braking system from the first operating state to the second operating state, the solenoid-operated cut-off valve is switched from the closed state to the open state, so that the fluid pressure in the brake cylinder is changed from the level in the first operating state, to a level corresponding to the operating force of the brake operating member in the second operating state. In other words, the control characteristic of the brake cylinder pressure (the braking effect characteristic) is changed from that of the first operating state to that of the second operating state. In the braking pressure control apparatus according to the above mode (15), the solenoid-operated pressure control valve device is controlled without opening the solenoid-operated cut-off valve (while holding the cut-off valve in the closed state), to control the fluid pressure in the brake cylinder to a suitable level, for instance, to a level which is determined on the basis of both the level established in the first operating state and the level corresponding to the operating force of the brake operating member in the second operating state. Thus, the brake cylinder pressure is controlled with a control characteristic which is intermediate between that of the first operating state and that of the second operating state, so that the change in the manner of control of the brake cylinder upon switching of the braking system is restricted. The control of the brake cylinder pressure by the solenoid-operated pressure control valve device may be referred to as "modified control" which is different from the normal manners of control in the first and second operating states.

This modified control of the brake cylinder pressure may be effected for a predetermined time after the condition for switching the braking system between the first and second operating states is satisfied, or until the number of operations of the brake operating member has reached a predetermined value. While the brake cylinder pressure is controlled during the switching to the second operating state, with the control characteristic intermediate between the control characteristics of the first and second operating states, the control characteristic may be changed continuously or in steps toward the control characteristic of the second operating state. This arrangement permits a smooth transition in the manner of control of the brake cylinder pressure.

When the predetermined condition for switching the braking system from the second operating state to the first operating state is satisfied, the solenoid-operated cut-off valve is immediately closed, and the brake cylinder pressure is controlled by the solenoid-operated pressure control valve device, such that the control characteristic is intermediate between that of the second operating state and that of the first operating state. This arrangement permits a gradual change in the control characteristic, contrary to an abrupt change in the case where the control characteristic is immediately changed to that of the first operating state.

The control-state-change restricting portion of the change restricting device according to the above mode (15) is preferably operated when the braking system is not required to be abruptly or rapidly switched between the first and second operating states, and can be operated when the solenoid-operated pressure control valve is normally functioning.

Where the first hydraulic pressure source does not includes the solenoid-operated pressure control valve device, the change in the manner of control of the brake cylinder pressure can be restricted by controlling the amount of electric power to be supplied to the pressurizing device of the first hydraulic pressure source.

(16) A braking pressure control apparatus according to any one of the above modes (1)–(15), wherein the braking system includes a stroke simulator connected to a fluid passage connecting the second hydraulic pressure source and the brake cylinder, and a simulator cut-off valve having a closed state for disconnecting the stroke simulator from the fluid passage and an open state for communicating the stroke simulator with the fluid passage, and where the change restricting device includes a fluid-flow control portion operable upon the switching of the braking system between the first and second operating states, to control the simulator cut-off valve, for controlling at least one of a flow of the fluid from the fluid passage into the stroke simulator and a flow of the fluid from the stroke simulator into the fluid passage.

The simulator cut-off valve is usually placed in the open state in the first operating state of the braking system, and in the closed state in the second operating state. In the first operating state in which the brake cylinder is disconnected from the second hydraulic pressure source, the operating stroke of the brake operating member is reduced. To permit a change of the brake operating stroke even in the first operating state, the simulator cut-off valve is opened to permit fluid communication between the stroke simulator and the second hydraulic pressure source operated by the brake operating member. In the second operating state, on the other hand, the flow of the pressurized fluid from the second hydraulic pressure source into the stroke simulator is not desirable, so that the simulator cut-off valve is placed in the closed state.

By opening the simulator cut-off valve for communicating the stroke simulator with the fluid passage connecting second hydraulic pressure source and the brake cylinder, the pressurized fluid may be delivered from the stroke simulator or may be accommodated into the stroke simulator. That is, the pressurized fluid may flow between the fluid passage and the stroke simulator, so that the pressurized fluid stored in the stroke simulator can be delivered to the brake cylinder, and so that the pressurized fluid discharged from the brake cylinder can be stored in the stroke simulator. Thus, the amounts of fluid flows between the second hydraulic pressure source and the brake cylinder can be reduced, resulting in a reduction in the amount of change of the operating state of the brake operating member.

The simulator cut-off valve is preferably a solenoid-operated shut-off valve having a closed state and an open state which are selectively established by energization and de-energization of its solenoid coil, but may be a solenoid-operated flow control valve whose amount of opening is variable with a change in the amount of electric current to be applied to its solenoid coil.

(17) A braking pressure control apparatus according to the above mode (16), wherein the switching device includes a solenoid-operated cut-off valve disposed in a fluid passage which connects the second hydraulic pressure source and the brake cylinder, and the change restricting device includes a valve-opening control portion for opening the solenoid-operated cut-off valve and the simulator cut-off valve at different times.

(18) A braking pressure control apparatus according to the above mode (17), wherein the valve-opening control portion opens the solenoid-operated cut-off valve before closing the simulator cut-off valve, when the switching device is commanded to switch the braking system from the first operating state to the second operating state.

When the predetermined condition for switching the braking system from the first operating state to the second operating state is satisfied, the solenoid-operated cut-off valve is first opened, and then the simulator cut-off valve is closed. Therefore, the simulator cut-off valve is held in the open state when the solenoid-operated cut-off valve is opened. When the solenoid-operated cut-off valve is opened, the fluid pressure in the brake cylinder is higher than the pressure of the fluid pressurized by the second hydraulic pressure source (the fluid pressure in the fluid passage connecting the second hydraulic pressure source and the brake cylinder is higher than the fluid pressure in the stroke simulator), or alternatively the pressure of the pressurized fluid of the second hydraulic pressure source is higher than the fluid pressure in the brake cylinder (the pressure in the stroke simulator is higher than the pressure in the fluid passage).

When the pressure in the stroke simulator is higher than the brake cylinder pressure, the pressurized fluid is delivered from both the second hydraulic pressure source and the stroke simulator to the brake cylinder. Accordingly, the amount of the pressurized fluid delivered from the second hydraulic pressure source to the brake cylinder is reduced by the amount of the pressurized fluid delivered from the stroke simulator, so that the amount of increase of the operating stroke of the brake operating member (so-called "pedal sink" which is an ineffective portion of the overall operating stroke) can be reduced.

When the brake cylinder pressure is higher than the pressure in the stroke simulator, the pressurized fluid discharged from the brake cylinder is partly accommodated in the stroke simulator and partly returned to the second hydraulic pressure source. Accordingly, the amount of the pressurized fluid returned from the brake cylinder back to the second hydraulic pressure source is reduced by the amount of the pressurized fluid accommodated in the stroke simulator, so that the amount of decrease of the operating stroke of the brake operating member (so-called "Pedal kick-back") can be reduced.

(19) A braking pressure control apparatus according to any one of the above modes (16)–(18), wherein the change restricting device includes a brake-off switching portion operable to effect at least one of a switching operation of the solenoid-operated cut-off valve between the closed and open states and a switching operation of the simulator cut-off valve between the closed and open states, while the brake operating member is not in operation.

The amount of change of the brake cylinder pressure and the amount of change of the operating state can be restricted by switching the solenoid-operated cut-off valve and the simulator cut-off valve while the brake operating member is not in operation. The brake-off switching control portion provided in the braking pressure control apparatus according to the above mode (19) is applicable to both of the switching of the braking system from the first operating state to the second operating state and the switch from the second operating state to the first operating state.

When the braking system is switched from the second operating state to the first operating state, for instance, the simulator cut-off valve is switched from the closed state to the open state. In this case, the pressurized fluid is delivered from the second hydraulic pressure source to the stroke simulator, resulting in an undesirable change of the operating stroke of the brake operating member. Where this switching of the simulator cut-off valve is effected while the brake operating member is not in operation, the operator of the brake operating member does not feel a change of the operating stroke.

(20) A braking pressure control apparatus according to the above mode (19), wherein the brake-off switching control portion is operated to initiate at least one of the switching operations of the solenoid-operated cut-off valve and the simulator cut-off valve after detection of a non-operated state of the brake operating member after a predetermined condition for switching the braking system between the first operating state and the second operating state is satisfied.

In the braking pressure control apparatus according to the above mode (20), the braking system is actually switched between the first and second operating states after the non-operated state of the brake operating member has been detected. This mode of the invention is suitable where the switching of the braking system need not be rapidly effected.

(21) A braking pressure control apparatus according to any one of the above modes (16)–(20), wherein the change restricting device includes a simulator-valve control portion operable when a predetermined condition for switching the braking system from the second operating state to the first operating state, to control the simulator cut-off valve.

By controlling the simulator cut-off valve upon switching of the braking system between the first and second operating states, the fluid flows between the second hydraulic pressure source and the stroke simulator can be controlled so as to restrict the change in the operating state of the brake operating member.

For instance, the simulator cut-off valve is controlled depending upon a change in the operating stroke of the brake operating member, such that the cut-off valve is placed in the open state when the operating stroke is changed, and is held in the closed state when the operating stroke is held constant.

Where the simulator cut-off valve is a solenoid-operated shut-off valve, the duty ratio of the shut-off valve is controlled for a predetermined time after the predetermined condition for switching the braking system from the second operating state to the first operating state is satisfied. In this case, the duty ratio of the shut-off valve may be increased (to increase the ratio of the open time) with the time.

(22) A braking pressure control apparatus for controlling a pressure of a working fluid in a brake cylinder in a hydraulically operated braking system, the braking pressure control apparatus being characterized by comprising:

a first hydraulic pressure source including a power-operated pressurizing device for pressurizing the fluid;

a second hydraulic pressure source operable by an operation of a manually operable brake operating member, to pressurize the fluid to a pressure corresponding to an operating force acting on the brake operating member; and a switching device for selectively placing the braking system in a first operating state in which a pressure of the fluid in the brake cylinder is controlled on the basis of the pressurized fluid delivered from the first hydraulic pressure source while the brake cylinder is disconnected from the second hydraulic pressure source, and a second operating state in which the pressurized fluid is delivered from the second hydraulic pressure source to the brake cylinder while the brake cylinder is disconnected from the first hydraulic pressure source.

The braking pressure control apparatus constructed according to the above mode (22) of the present invention may incorporate any one of the technical features of the various modes (1)–(21) described above.

(23) A braking pressure control apparatus according to the above mode (22), wherein the second hydraulic pressure source includes at least one of (1) a booster operable with a pressurized fluid whose pressure is higher than a maximum pressure that can be generated by the second hydraulic pressure source in the absence of the booster, the booster boosting the operating force of the brake operating member, and (2) a pressure-increasing device operable to increase the pressure of the fluid pressurized by the operation of the brake operating member.

In the braking pressure control apparatus according to the above mode (23), the second hydraulic pressure source includes at least one of the hydraulic booster and the pressure-increasing device.

(24) A braking pressure control apparatus according to the above mode (22) or (23), further comprising a pressure-difference reducing device operable to reduce a difference between the fluid pressure in the brake cylinder and the pressure of the fluid pressurized by the second hydraulic pressure source, when the braking system is switched between the first and second operating states by the switching device.

The amount of change of the brake cylinder pressure and the rate of change of the same can be restricted by reducing the pressure difference between the brake cylinder and the second hydraulic pressure source upon switching of the braking system between the first and second operating states. Thus, the pressure-difference reducing device is effective to reduce the inconveniences which would take place when the braking system is switched between the firs and second operating states.

Where the braking system has the two sub-systems as described above with respect to the above mode (6), it is not necessary to reduce the pressure difference between the brake cylinder in each sub-system and the corresponding pressure chamber of the second hydraulic pressure source. In other words, it is suffice to reduce the pressure difference between the brake cylinder in one of the two sub-systems and the corresponding pressure chamber. In some cases, the pressure difference between the brake cylinder in the other sub-system and the corresponding pressure chamber can be reduced by reducing the pressure difference between the brake cylinder in the above-indicated one sub-system and the corresponding pressure chamber. In this case, the pressure-difference reducing device may be considered to be a device for reducing the pressure difference between the individual brake cylinders.

(25) A braking pressure control apparatus according to any one of the above modes (22)–(24), further comprising a flow-amount reducing device operable to reduce amounts of flow of the fluid between the second hydraulic pressure source and the brake cylinder when the braking system is switched between the first and second operating states by the switching device.

The influence of the switching of the braking system on the operating state of the brake operating member can be reduced by reducing the amounts of flows of the fluid between the second hydraulic pressure source and the brake cylinder. The influence includes a change of the reaction force acting on the brake operating member, and a change of the operating stroke of the brake operating member. To reduce the amounts of flows of the fluid between the second hydraulic pressure source and the brake cylinder, the simulator cut-off valve may be utilized, as described above with respect to the above mode (16).

(26) A braking pressure control apparatus according to any one of the above modes (22)–(25), further comprising a change-rate restricting device for restricting a rate of change of the fluid pressure in the brake cylinder when the braking system is switched between the first and second operating states by the switching device.

For instance, the rate of change of the brake cylinder pressure can be reduced, by controlling the duty ratio or cycle of the solenoid-operated cut-off valve provided between the second hydraulic pressure source and the brake cylinder, as described above with respect to the above move (9), rather than opening the solenoid-operated cut-off valve immediately after the switching device is commanded to switch the braking system between the first and second operating states.

(27) A braking pressure control apparatus according to any one of the above modes (22)–(26), wherein the switching device is operated to effect at least a switching operation of the braking system from the first operating state to the second operating state, while the brake operating member is not in operation.

(28) A braking pressure control apparatus according to any one of the above modes (22)–(27), further comprising a control-state-change restricting device operable to restrict a change in a control characteristic of the fluid pressure in the brake cylinder when the braking system is switched between the first and second operating states by the switching device.

The change in the control characteristic of the brake cylinder pressure can be restricted by controlling the pressure of the fluid pressurized by the first hydraulic pressure source.

(29) A braking pressure control apparatus according to the above mode (28), wherein the control-state-change restricting device is operable to change the control characteristic each time the brake operating member is operated, such that the control characteristic during switching of the braking system is changed toward a nominal control characteristic of one of the first and second operating states to which the braking system is switched.

The change in the control characteristic of the brake cylinder pressure can be restricted by changing the control characteristic upon each operation of the brake operating member, so that the control characteristic is gradually changed. This arrangement makes it possible to reduce the deterioration of the operating feel of the brake operating member by the operator, namely, to reduce a change of the operating state of the brake operating member which is unexpected to the operator.

The control characteristic may be changed with the time after the predetermined condition for switching the braking system is satisfied. The control characteristic may be changed either continuously or in steps.

(30) A braking pressure control apparatus according to any one of the above modes (22)–(29), further comprising an influence reducing device operable to reduce an influence of the switching of the braking system by the switching device on an operating state of the brake operating member, which influence is unexpected to an operator of the brake operating member.

The change of the operating stroke of the brake operating member and the change of the reaction force acting on the brake operating member upon switching of the braking system from the first operating state to the second operating state can be reduced by opening the opening the solenoid-operated cut-off valve provided between the second hydraulic pressure source and the brake cylinder, while holding the simulator cut-off valve in the open state, as described above with respect to the above mode (16). Further, the deterioration of the operating feel of the brake operating member can be reduced by controlling the solenoid-operated cut-off valve.

(31) A braking pressure control apparatus according to any one of the above modes (22)–(30), further comprising a modified-pressure-control device operable to control the fluid pressure in the brake cylinder during the switching of the braking system by the switching device, in a manner different from normal manners in which the fluid pressure in the brake cylinder is controlled in the first and second operating states.

For example, the brake cylinder pressure may be controlled by controlling the pressure of the fluid pressurized by the first hydraulic pressure source, in a manner different from the nominal manner in which the pressure of the first hydraulic pressure source is controlled in the first operating state of the braking system.

(32) A braking pressure control apparatus according to any one of the above modes (22)–(31), further comprising a forecasting-type change restricting device operable to initiate an operation to restrict at least one of a change of an operating state of the brake operating member and a change of the fluid pressure in the brake cylinder, upon detection of a symptom indicating a high degree of probability that the braking system is switched between the first and second operating states by the switching device.

(33) A braking pressure control apparatus according to any one of the above modes (22)–(32), further comprising at least one of (1) a first abnormality detecting device for detecting an abnormality of the first hydraulic pressure source, and (2) a second abnormality detecting device for detecting an abnormality of said second hydraulic pressure source.

(34) A braking pressure control apparatus according to any one of the above modes (22)–(33), further comprising a control device for controlling the switching device on the basis of a state of a vehicle on which the braking system is installed.

The state of the vehicle includes normal or abnormal states of a drive power source, a transmission device, and a braking device of the vehicle which includes the hydraulically operated braking system, and a running state of the vehicle.

(35) A braking pressure control apparatus according to the above mode (34), wherein the control device commands the switching device to place the braking system in the first operating state when the running state of the vehicle requires the fluid pressure in the brake cylinder to be controlled to a level which does not correspond to the operating force acting on the brake operating member which is being operated by an operator of the vehicle when a running state of the vehicle.

(36) A braking pressure control apparatus according to the above mode (34) or (35), wherein the control device commands the switching device to place the braking system in the first operating state when the running condition of the vehicle does not require the fluid pressures in the brake cylinders for all of the four wheels of the vehicle to be controlled in the same manner.

(37) A braking pressure control device according to any one of the above modes (34)–(36), wherein the control device commands the switching device to place the braking system in the first operating state when the running condition of the vehicle requires the fluid pressure in the brake cylinder to be controlled to a level different from the pressure of the fluid pressurized by the second hydraulic pressure source.

(38) A braking pressure control apparatus according to any one of the above modes (34)–(37), wherein the control device commands the switching device to place the braking system in the second operating state when the vehicle is permitted to run.

(39) A braking pressure control apparatus according to any one of the above modes (34)–(38), wherein the control device commands the switching device to place the braking system in the second operating state when the vehicle is stationary.

(40) A braking pressure control apparatus for a hydraulically operated brake, characterized by comprising:

a first hydraulic system including a first hydraulic pressure source which is power-operated to pressurize a working fluid and capable of controlling a pressure of the pressurized fluid, for operating the brake with the pressurized fluid delivered from the first hydraulic pressure source;

a second hydraulic system including a manually operable brake operating member, and a second hydraulic pressure source which is operable by an operating force acting on the brake operating member, to pressurize the working fluid to a pressure corresponding to the operating force, for operating the brake with the pressurized fluid delivered from the second hydraulic pressure source;

a switching device operable to selectively establish a first state in which the brake is operated by at least the first hydraulic system, and a second state in which the brake is operated by at least the second hydraulic system; and a switching control device operable to control the switching device.

In the braking pressure control apparatus according to the above mode (40), the "pressure corresponding to the operating force" is typically proportional to the operating force of the brake operating member. However, the pressure of the fluid pressurized by the second hydraulic pressure source may have a non-linear relationship with the operating force, provided the pressure is determined by the operating force.

In the first state, the brake is operated by at least the first hydraulic system. That is, the brake may be operated in the first state, by only the first hydraulic system, or a plurality of hydraulic systems including the first hydraulic system. For instance, the brake is operated in the first state, by the first and second hydraulic systems, or by the first hydraulic system and a third hydraulic system other than the first and second hydraulic systems. Similarly, the brake may be operated in the second state, by only the second hydraulic system, or a plurality of hydraulic systems including the second hydraulic system.

The switching control device is adapted to control the switching device to selectively establish the first and second states, namely, to switch a braking system including the brake and the first and second hydraulic systems, between the first and second states. The switching control device may be arranged to command the switching device to switch the braking system between the first and second states, according to a predetermined rule, for instance, to switch the braking system between the two states at a predetermined time interval, or each time the number of operations of the brake operating member has reached a predetermined value. Alternatively, the switching control device commands the switching device to select the first or second state depending upon the specific state of the braking system. Where the brake is used for braking an automotive vehicle, however, the switching control device is preferably arranged to control the switching device to selectively establish the first or second state, when the state of the vehicle has satisfied any one of predetermined conditions for selecting the first or second state.

The state of the vehicle includes normal or abnormal states of a drive device, a braking device, a steering device and other components of the vehicle, and further includes the running condition of the vehicle. The switching control device may be adapted to control the switching device depending upon the state of the vehicle other than the state of the first hydraulic pressure source.

(41) A braking pressure control apparatus according to the above mode (40), wherein the second hydraulic pressure source is operable to pressurize the fluid to a pressure which corresponds to the operating force of the brake operating member and which is higher than a pressure of the fluid pressurized by the operating force.

For instance, the second hydraulic pressure source includes (1) a master cylinder for pressurizing the fluid to a level corresponding to the operating force of the brake operating member, and (2) a at least one of a booster for boosting the operating force and transmitting the boosted operating force to the master cylinder, and a pressure-increasing device for increasing the pressure of the fluid pressurized by the master cylinder and delivering the pressurized fluid having the increased pressure to a brake cylinder of the brake. The booster may be either a hydraulic booster operable with a pressurized fluid received from a high-pressure source, or a vacuum booster operable by a negative or reduced pressure.

(42) A braking pressure control apparatus according to the above mode (40) or (41), wherein the hydraulically operated brake is provided for braking a wheel of a vehicle, and the switching control device controls the switching device on the basis of a running condition of the vehicle.

In the braking pressure control apparatus according to the above mode (43), the braking system is appropriately switched between the first and second states, depending upon the running condition or state of the vehicle.

The running condition of the vehicle includes a slipping state of the wheel, and a yaw rate, a steering angle, a running speed, an acceleration value (deceleration value) of the vehicle, The running condition further includes a running environment of the vehicle, and operating states of various manually operable members (e.g., operating state of the brake operating member, operating state of a vehicle accelerating member, operating state of a steering wheel, and operating state is of an ignition switch). In other words, the running state of the vehicle is influenced by at least one of the running condition and the operating states of the manually operable members. The running condition may also be represented by the operating states of various components of the vehicle (e.g., the drive device, steering device and braking device). Usually, the operating states of these components are determined by the operating states of the manually operable members. The running environment of the vehicle includes the surface condition of the roadway (e.g., friction coefficient, presence of raised and recessed portions or stepped portions, and gradient), and the weather condition (e.g., wind velocity and temperature). The running condition is considered to include the load (including the passengers and cargo) on the vehicle, since the load determines the vehicle braking state.

The braking system is selectively placed in the first state or the second state, depending upon the running condition of the vehicle, that is, whether any one of predetermined conditions for selecting the first state or the second state is satisfied or not. These predetermined conditions will be described with respect to the following modes (48)(53) of the invention.

The second hydraulic system in the braking pressure control apparatus according to the above mode (42) may or may not include the hydraulic booster or pressure-increasing device described above.

(43) A braking pressure control apparatus according to any one of the above modes (40)–(42), wherein the switching device is operable in at least one of the first and second states, to establish a third state in which the brake is operated by both of the first and second hydraulic systems.

In the braking pressure control apparatus according to the above mode (43), the switching device is operable in at least one of the first and second states, to establish the third state in which the brake is operated by both of the first and second hydraulic systems, so that the pressurized fluid is delivered from both of the first and second hydraulic systems to a brake cylinder of the brake. In the third state, the fluid pressure in the brake cylinder can be increased at a higher rate than in the first or second state in which the pressurized fluid is delivered from only one of the two hydraulic systems.

(44) A braking pressure control apparatus according to any one of the above modes (40)–(43), wherein the switching control device includes a ratio control portion operable to control the switching device for controlling a ratio of a rate of flow of the pressurized fluid from the first hydraulic system to a brake cylinder of the brake to a rate of flow of the pressurized fluid from the second hydraulic system to the brake cylinder.

The braking pressure control apparatus according to the above mode (44) is arranged to control the ratio of the rate of flow of the pressurized fluid from the first hydraulic pressure source to the brake cylinder to a rate of flow of the pressurized fluid from the second hydraulic pressure source to the brake cylinder.

While the second hydraulic pressure source is arranged to pressurize the fluid to the pressure corresponding to the operating force of the brake operating member, the first hydraulic pressure source is capable of controlling the pressure of its pressurized fluid to a level irrespective of the operating force of the brake operating member. By controlling the ratio of the rates of flows of the pressurized fluid from the first and second hydraulic pressure sources to the brake cylinder, therefore, it is possible to control the braking effect characteristic of the brake cylinder, which is represented by a relationship between the operating state of the brake operating member and the fluid pressure in the brake cylinder, for instance. When the rate of flow of the fluid from the pressurized fluid from the second hydraulic pressure source is made higher than the rate of flow of the pressurized fluid from the first hydraulic pressure source, for example, the brake cylinder exhibits the braking effect characteristic wherein the brake cylinder pressure is likely to follow to the operating state of the brake operating member. When the rate of flow of the pressurized fluid from the first hydraulic pressure is made higher than the rate of flow of the pressurized fluid from the second hydraulic pressure source, the brake cylinder exhibits the braking effect characteristic wherein the brake cylinder pressure is likely to deviate from the operating state of the brake operating member.

The ratio control portion of the switching control device which is operable to control the ratio of the rates of the fluid flows from the first and second hydraulic pressure sources to the brake cylinder may be considered to be a braking-effect-characteristic control portion operable to control the braking effect characteristic of the brake cylinder.

The switching control device may include a ratio control portion operable to control the switching device for controlling a ratio of an amount of flow of the pressurized fluid from the first hydraulic pressure source to the brake cylinder to an amount of flow of the pressurized fluid from the second hydraulic pressure source to the brake cylinder.

In the above case, the pressurized fluid is first delivered from one of the first and second hydraulic pressure sources, and then the pressurized fluid is delivered from the other hydraulic pressure source.

(45) A braking pressure control apparatus according to the above mode (44), wherein the hydraulically operated brake is provided for braking a wheel of a vehicle, and the ratio control portion includes a ratio determining portion for determining the ratio on the basis of a state of the vehicle.

If the running state of the vehicle requires the brake cylinder pressure to be controlled to a level considerably higher than the level corresponding to the operating force of the brake operating member, the ratio of the rate of flow of the pressurized fluid from the first hydraulic pressure source to the rate of flow of the pressurized fluid flow from the second hydraulic pressure source is increased. If the running state requires the brake cylinder pressure to be controlled to a level relatively close the level corresponding the brake operating force, the above-indicated ratio is reduced. For instance, the ratio is increased when the slipping tendency of the wheel being braked is higher than a critical locking tendency, the ratio is made higher than when the slipping tendency is not higher than the critical locking tendency.

(46) A braking pressure control apparatus according to any one of the above modes (40)–(45), wherein the first hydraulic pressure source includes (a) a power-operated pressurizing device operable to pressurize the fluid, and (2) a pressure control valve device operable to control the pressure of the fluid pressurized by the pressurizing device, and wherein the second hydraulic pressure source includes (a) a master cylinder operable to pressurize the fluid to a level corresponding to the operating force of the brake operating member, and (b) at least one of a hydraulic booster operable with the pressurized fluid delivered from the pressurizing device, to boost the operating force and transmit the boosted operating force to the master cylinder, and a pressure-increasing device operable with the pressurized fluid delivered from the pressurizing device, to increase the pressure of the fluid pressurized by the master cylinder and supply the pressurized fluid having the increased pressure to a brake cylinder of the brake, the switching control device including a pressurized-fluid distributing portion operable to control a ratio of a rate of flow of the pressurized fluid from the pressurizing device to the brake cylinder through the pressure control valve device to a rate of flow of the pressurized fluid from the pressurizing device to the at least one of the hydraulic booster and the pressure-increasing device.

Like the braking pressure control apparatus according to the above mode 45), the braking pressure control apparatus according to the above mode (46) is capable of controlling the braking effect characteristic of the brake cylinder, by controlling the ratio of the rate of flow of the pressurized fluid from the pressurizing device to the brake cylinder through the pressure control valve device to the rate of flow of the pressurized fluid from the pressurizing device to the at least one of the hydraulic booster and the pressure-increasing device. The present arrangement permits effective utilization of the pressurized fluid delivered from the pressurizing device of the first hydraulic pressure source.

In the braking pressure control apparatus according to the above mode (46), the switching device may include a first cut-off valve provided between the pressurizing device and the pressure control valve device, and a second cut-off valve provided between the pressurizing device and the second hydraulic pressure source (at least one of the hydraulic booster and the pressure-increasing device), as described below in the DETAILED DESCRIPTION OF THE PREFERRED EMBODIMENTS. In this case, the pressurized-fluid distributing portion includes a cut-off-valve control portion for controlling those first and second cut-off valves. Further, at least one valve included in the pressure control valve device may function as the first cut-off valve. In this instance, the pressure control valve device constitutes a part of the switching device.

The first and second cut-off valves indicated above may be either solenoid-operated shut-off valves each having an open state and a closed state that are established by energization or de-energization of a solenoid coil, or alternatively solenoid-operated flow control valves whose amount of opening is variable with an amount of electric current applied to their solenoid coils. Similarly, the pressure control valve device may include at least one solenoid-operated shut-off valve, or at least one solenoid-operated flow control valve.

(47) A braking pressure control apparatus according to any one of the above modes (40)–(46), wherein the switching device includes a selectively cutting-off device operable between a first cut-off state in which the brake cylinder is communicated with the first hydraulic pressure source and is disconnected from the second hydraulic pressure source, and a second cut-off state in which the brake cylinder is communicated with the second hydraulic pressure source and is disconnected from the first hydraulic pressure source.

In the braking pressure control apparatus according to the above mode (47), the brake is operated by the first hydraulic system when the selectively cutting-off device is placed in the first cut-off state, and by the second hydraulic system when the selectively cutting-off device is placed in the second cut-off state. When the selectively cutting-off device is alternately placed in the first and second cut-off states at a relatively short time interval, the brake is operated by the first and second hydraulic systems alternately. This state established by the selectively cutting-off device of the switching device may be considered to be a third state in which the first and second states indicated above are alternately established.

The selectively cutting-off device may include either solenoid-operated cut-off valves having an open state and a closed state which are established by energization and de-energization of their solenoid coils, or alternatively solenoid-operated flow control valves whose amount of opening is variable with an amount of electric current applied to their solenoid coils.

(48) A braking pressure control apparatus according to any one of the above modes (40)–(47), wherein the hydraulically operated brake is provided for braking a wheel of a vehicle, and the switching control device command the switching device to establish the first state, when a running condition of the vehicle requires the brake to be operated with the pressurized fluid whose pressure does not corresponds to the operating force of the brake operating member.

In the braking control apparatus according to the above mode (48), the switching control device commands the switching device to establish the first state, when the state of the vehicle requires any one of the following controls; an anti-lock braking pressure control; a vehicle turning stability control (a right-left braking force distribution control for controlling a difference between the right and left braking forces); a front-rear braking force distribution control for controlling a ratio of the total front braking force to the total rear braking force; a cooperative braking control in which the vehicle is braked by both of a hydraulic braking force generated by the hydraulically operated brake and a regenerative braking force generated by an electric motor provided as a vehicle drive power source; a braking control in an ecology-oriented vehicle running mode, for braking the vehicle while the vehicle is held stationary with a vehicle drive power source held in the off state; and various automatic braking controls including a traction control. In the anti-lock braking pressure control, for example, the fluid pressure in a brake cylinder of the brake is controlled so that the slipping state of the wheel being braked is held in an optimum state. Thus, the fluid pressure in the brake cylinder is not controlled to a level corresponding to the operating force of the brake operating member.

(49) A braking pressure control apparatus according to any one of the above modes (40)–(48), wherein the hydraulically operated brake is provided for each of four wheels of a vehicle, and the switching control device commands the switching device to establish the first state, when a running condition of the vehicle does not requires the brakes for the four wheels to be controlled in the same manner.

The running conditions of the vehicle which do not require the brakes for the four wheels to be controlled in the same manner include: a running condition requiring the brakes for the four wheels to be controlled independently of each other; a running condition requiring at least one of the brakes for the four wheels to be controlled independently of the other brakes; a running condition requiring the brakes for the front wheels and the brakes for the rear wheels to be controlled independently of each other; and a running condition requiring the brakes for the right wheels and the brakes for the left wheels to be controlled independently of each other.

Described in detail, the running conditions which do not require the brakes for the four wheels to be controlled in the same manner include a running condition requiring the anti-lock braking pressure control, a running condition requiring the vehicle turning stability control and a running condition requiring the front-rear braking force distribution control. Further, the brakes for the four wheels are not required to be controlled in the same manner, where the cooperative braking control is effected such that the fluid pressure in the brake cylinders of the brakes for the non-drive wheels and the fluid pressure in the brake cylinders of the brakes for the drive wheels (to which the regenerative braking force is applied) are controlled to different levels. Where the electric motor is provided as a vehicle drive source for each of the wheels, and where the fluid pressures in the brake cylinders of the brakes for the four wheels are controlled depending upon the regenerative braking forces applied to the respective wheels, the brakes for the four wheels are not required to be controlled in the same manner.

Where the first hydraulic pressure source in the braking pressure control apparatus according to the above mode (48) includes the pressure control valve device described above with respect to the above mode (46) and where the switching control device commands the switching device to establish the second state during a normal operation of the braking system (in which the brakes for the four wheels are controlled in the same manner), the operating time of the first hydraulic pressure source in the first state is reduced, and the required number of operations of the pressure control valve device is reduced, so that the expected service life of the pressure control valve device is prolonged.

(50) A braking pressure control apparatus according to any one of the above modes (40)–(49), wherein the hydraulically operated brake is provided for braking a wheel of a vehicle, and the switching control device commands the switching device to establish the first state, when a running condition of the vehicle requires the brake to be operated with the pressurized fluid whose pressure is different from the pressure of the fluid pressurized by the second hydraulic pressure source.

The pressure of the fluid pressurized by the second hydraulic pressure source is determined by the operating force of the brake operating member, and the relationship between those fluid pressure and operating force is known. The first state is established when the pressure of the pressurized fluid with which the brake is required to be operated is different from the pressure determined by the brake operating force.

Where the second hydraulic pressure source includes a booster for boosting the brake operating force and transmitting the boosted brake operating force to the master cylinder, for instance, the first state is established when the pressure of the pressurized fluid with which the brake is operated is required to be controlled in a post-boosting-limit control mode in which the fluid pressure of the brake is increased to a level which cannot be established before the boosting limit of the booster has been reached and which would be established if the brake operating force after the boosting limit has been reached were boosted at the boosting ratio before the boosting limit has been reached. The first state is established also when the pressure of the pressurized fluid with which the brake is operated is required to be controlled in the braking effect control mode such that the vehicle is braked with a deceleration value which corresponds to the brake operating force. The control in the post-boosting-limit control mode and the braking effect control mode may be automatically effected during a normal operation of the brake operating member, or in response to an operation of a suitable manually operable member such as a selector switch by the vehicle operator. The post-boosting-limit control is considered to be effected when the vehicle braking force generated by the second hydraulic pressure source is insufficient to provide the operator's desired vehicle braking force.

(51) A braking pressure control apparatus according to any one of the above modes (40)–(50), wherein said hydraulically operated brake is provided for braking a wheel of a vehicle, and the switching control device commands the switching device to establish the second state, when said vehicle which has been inhibited from running is permitted to run.

When the vehicle which has been inhibited from running is permitted to run, an initial diagnosis is usually performed to diagnose the second hydraulic system for any abnormality. Where the second state is established when the vehicle is permitted to run, it is not necessary to switch the braking system from the first state to the second state for performing the initial diagnosis, so that the initial diagnosis can be initiated immediately after the vehicle is permitted to run.

Usually, the vehicle is permitted to run by starting or turning on the vehicle drive device. After the vehicle drive device has been turned on, the vehicle drive device is usually operated in a warm-up mode. In this warm-up mode, it is desirable to reduce the amount of energy consumption. When the braking system is placed in the second state, the amount of energy consumption is smaller than when the braking system is placed in the first state in which the second hydraulic system is power-operated.

(52) A braking pressure control apparatus according to any one of the above modes (40)–(51), wherein the hydraulically operated brake is provided for braking a wheel of a vehicle, and the switching control device commands the switching device to establish the second state, when the vehicle is stationary.

In the braking pressure control apparatus according to the above mode (52), the second state is established when the vehicle is stationary. When the vehicle is stationary, the required accuracy of control of the pressure of the pressurized fluid by which the brake is operated is relatively low, since the brake is merely required to hold the vehicle stationary.

(53) A braking pressure control apparatus according to any one of the above modes (40)–(52), wherein the hydraulically operated brake is provided for braking a wheel of a vehicle, and the switching control device includes a braking pressure control device operable when the first state is established by the switching device and when the vehicle is stationary, to control the pressure of the pressurized fluid by which the brake is operated, to a level of the fluid pressurized by the second hydraulic pressure source.

As described above, the second state is preferably established while the vehicle is stationary. However, the operating feel of the brake operating member may be deteriorated if the second state is established immediately after the vehicle is brought to the stationary state. In view of this, the pressure of the pressurized fluid of the brake is controlled to the level of the second hydraulic pressure source before the braking system is switched from the first state to the second state, so that the deterioration of the operating feel of the brake operating member upon switching of the braking system to the second state is restricted.

The vehicle in the stationary state which has been permitted to run may be inhibited from running (with the ignition switching being turned off, for example). In this case, the braking system is switched to the second state. In the braking pressure control apparatus according to the above mode (53), the braking pressure control device is effective to restrict the deterioration of the operating feel of the brake operating member when the running of the vehicle is inhibited while the vehicle is stationary.

The braking pressure control device in the present braking pressure control apparatus may be considered to be a device for controlling the fluid pressure of the brake before the braking system is switched to the second state, or a device for restricting a change in the operating state of the brake operating member when the braking system is switched to the second state.

(54) A braking pressure control apparatus according to any one of the above modes (40)–(53), further comprising a braking pressure control device operable when the first state is established by the switching device, to control the pressure of the pressurized fluid by which the brake is operated, on the basis of an operating amount of the brake operating member, and at least one of a rate of change of the operating amount and a derivative of the rate of change.

By controlling the fluid pressure of the brake on the basis of the operating amount of the brake operating member and at least one of the rate of change of the operating amount and the derivative of the rate of change, the delay of a change of the fluid pressure of the brake with respect to a change of the brake operating amount can be made smaller than when the fluid pressure of the brake is controlled on the basis of only the brake operating amount. Accordingly, the fluid pressure of the brake can be controlled according to the state of operation of the brake operating member by the operator.

The operating amount of the brake operating member may be the operating stroke or force of the brake operating member. The brake operating stroke or force may be detected either directly or indirectly. Although the brake operating stroke or force is desirably detected directly, for reducing the above-indicated delay, the brake operating stroke or force may be obtained from a suitable physical quantity which varies with a change in the operating state of the brake operating member. The delay may be further reduced when the fluid pressure of the brake is controlled on the basis of both of the rate of change of the brake operating amount and the derivative of the rate of change as well as the operating amount.

For instance, the desired value of the fluid pressure of the brake is determined on the basis of the brake operating amount, the rate of change of the brake operating amount and the derivative of the rate of change, and the actual value of the fluid pressure is controlled so as to coincide with the determined desired value, as described below in the DETAILED DESCRIPTION OF THE PREFERRED EMBODIMENTS.

(55) A braking pressure control apparatus according to any one of the above modes (40)–(54), further comprising:

a stroke simulator device operable to permit flows of the fluid to and from the second hydraulic pressure source, according to an operation of the brake operating member; and a diagnosing device for diagnosing the stroke simulator device for any abnormality thereof, and wherein the switching control device commands the switching device to establish the second state, when said diagnosing device determines that the stroke simulator device is abnormal.

The stroke simulator device is placed in the operable state permitting the fluid flows to and from the second hydraulic pressure source when the first state is established, and is placed in the inoperable state when the second state is established. In the first state in which the fluid pressurized by the pressurizing device of the first hydraulic pressure source is delivered to a brake cylinder of the brake, the operating stroke of the brake operating member would be very small if the stroke simulator device were placed in the inoperable state. In view of this, the stroke simulator is placed in the operable state when the first state is established. In the second state in which the fluid pressurized by the second hydraulic pressure source in response to the operation of the brake operating member is delivered to the brake cylinder, the operating stroke will not be small even when the stroke simulator device is placed in the inoperable state. Accordingly, the braking system is switched to the second state when the stroke simulator is diagnosed to be abnormal.

The abnormality of the stroke simulator device includes an operating failure of a stroke simulator. The stroke simulator device may include a simulator cut-off valve having an open state for fluid communication between the stroke simulator and the second hydraulic pressure source, and a closed state in which the stroke simulator is disconnected from the second hydraulic pressure source. In this case, the abnormality of the stroke simulator device also includes an abnormality of the simulator cut-off valve, such as sticking of the valve member in its closed state.

The sticking of the valve member of the simulator cut-off valve in the closed state and the defect of the stroke simulator may be detected on the basis of a relationship between the amount of change of the brake operating stroke and the amount of change of the fluid pressure of the brake. If the amount of change of the fluid pressure of the brake with respect to the amount of change of the brake operating stroke is larger than the normal amount, the valve member of the simulator cut-off valve is considered to be stuck in its closed state. If the amount of change of the fluid pressure of the brake is smaller than the normal value, the stroke simulator is considered to be defective. The amount of change of the fluid pressure of the second hydraulic pressure source rather than the amount of change of the fluid pressure of the brake may be used in diagnosing the stroke simulator device.

In the event of detection of any of the abnormalities of the stroke simulator device, the switching control device commands the switching device to establish the second state, and the simulator cut-off valve is placed in the closed state. If the valve member of the simulator cut-off valve is stuck in the closed state, the cut-off valve remains in the closed state with its valve member in the closed state.

(56) A braking pressure control apparatus according to any one of the above modes (40)–(55), further comprising:

a brake-operating-state detecting device for detecting an operating state of the brake operating member;

a diagnosing device for diagnosing the brake-operating-state detecting device for any abnormality thereof; and a first-pressure-source control device for controlling the pressure of the fluid pressurized by the first hydraulic pressure source, on the basis of an output signal of the brake-operating-state detecting device, and wherein the switching control device commands the switching device to establish the second state, when the diagnosing device determines that the brake-operating-state detecting device is abnormal.

The brake-operating-state detecting device may directly or indirectly detect the operating state of the brake operating member such as the operating stroke or operating force. The brake-operating-state detecting device adapted to indirectly detect the brake operating state may be a detecting device arranged to detect the fluid pressure of the brake, or any other physical quantity which varies with a change in the brake operating state.

While the present braking pressure control apparatus according to the above mode (56) is adapted to establish the second state when the brake-operating-state detecting device is abnormal, the apparatus according to any one of the following modes (57)–(59) is adapted to keep the braking system in the first state even when the brake-operating-state detecting device is abnormal.

(57) A braking pressure control apparatus according to any one of the above modes (40)–(56), further comprising:

a stroke detecting device for detecting an operating stroke of the brake operating member;

a force detecting device for detecting the operating force of the brake operating member;

a diagnosing device for diagnosing the stroke detecting device and the force detecting device for any abnormality thereof;

a first pressure control device operable when the stroke detecting device and the force detecting device are normal, to control the pressure of the pressurized fluid by which the brake is operated, on the basis of both the operating stroke and the operating force which are respectively detected by the stroke detecting device and the force detecting device; and a second pressure control device operable when one of the stroke detecting device and the force detecting device is abnormal, to control the pressure of the pressurized fluid by the brake is operated, on the basis of an output signal of the other of the stroke detecting device and the force detecting device.

The force detecting device may directly detect the operating force of the brake operating member, or indirectly detect the operating force by detecting the pressure of the fluid pressurized by the second hydraulic pressure source, as described above.

In the braking pressure control apparatus according to the above mode (57), the control of the fluid pressure of the brake can be continued in the first state, even if one of the operating stroke detecting device and the force detecting device is abnormal. Accordingly, it is possible to continue the braking effect control and the post-boosting-limit braking control, making it possible to reduce a reduction in the controllability of the braking pressure. Further, it is possible to reduce the need of terminating the cooperative braking control upon detection of an abnormality of the detecting devices, so that the energy efficiency of the braking system is accordingly improved. In addition, it is possible to reduce the need of terminating the anti-lock braking pressure control upon detection of an abnormality of the detecting devices, leading to improved braking stability of the braking system.

(58) A braking pressure control apparatus according to any one of the above modes (40)–(55) and (57), further comprising:

a plurality of operating-state detecting devices for detecting an operating state of the brake operating member;

a diagnosing device for diagnosing each of the plurality of operating-state detecting devices for any abnormality thereof;

a first pressure control device operable when the plurality of operating-state detecting devices are normal, to control the pressure of the fluid pressurized by the first hydraulic pressure source on the basis of at least one of output signals of the plurality of operating-state detecting devices; and a second pressure control device operable when at least one of the plurality of operating-state detecting devices is normal and when at least one of the plurality of operating-state detecting devices is abnormal, to control the pressure of the fluid pressurized by the first hydraulic pressure source, on the basis of an output signal of the at least one operating-state detecting device which is normal.

The provision of a plurality of detecting devices for detecting the operating state of the brake operating member is effective to assure a fail-safe operation of the braking pressure control apparatus. Where the plurality of operating-state detecting devices are all normal, the accuracy of control of the fluid pressure of the first hydraulic pressure source is made higher when the control is based on a value which is obtained by statistically processing the output signals of the two or more detecting devices, than when the control is based on the output signal of one of the detecting devices. The statistically process value may be an average value, a median value, a maximum value or a minimum value of the output signals of the detecting devices.

(59) A braking pressure control apparatus according to any one of the above modes (40)–(55), (58) and (59), which is provided for controlling the pressure of the pressurized fluid in each of a plurality of brake cylinders of a plurality of brakes, and wherein the first hydraulic pressure source includes a plurality of pressure control valve devices which are operable independently of each other to control the pressures of the pressurized fluid in the plurality of brake cylinders, on the basis of the fluid pressurized by the pressurizing device, the braking pressure control apparatus further comprising:

a plurality of braking-pressure detecting devices for detecting the pressure in the plurality of brake cylinders, respectively;

a diagnosing device for diagnosing each of the braking-pressure detecting devices for any abnormality thereof;

a connecting passage connecting two of the plurality of brake cylinders;

a communicating valve provided in the connecting passage;

a first pressure control device operable when the plurality of braking-pressure detecting devices are all normal, to control the plurality of pressure control valve devices on the basis of the pressures detected by the braking-pressure detecting devices; and a second pressure control device operable when one of the plurality of braking-pressure control devices is abnormal and when the braking-pressure detecting device corresponding to the brake cylinder connected through the connecting passage to the brake cylinder corresponding to the abnormal braking-pressure detecting device is normal, the second pressure control device controlling the two pressure control valve devices connected to each other by the connecting passage, on the basis of the pressure detected by the normal braking-pressure detecting device, while the communicating valve in the connecting passage is open.

In the braking pressure control apparatus according to the above mode (59), the pressure control valve devices are controlled in a feedback fashion on the basis of the fluid pressures in the brake cylinders detected by the braking-pressure detecting devices. While the communicating valve is in the open state, the fluid pressures in the two brake cylinders connected to each other by the connecting passage can be detected by one of the two corresponding braking-pressure detecting devices, so that the pressure control valve devices corresponding to the two brake cylinders can be controlled on the basis of the pressure detected by the one detecting device. In this case, the fluid pressures in the two brake cylinders are controlled to the same level.

The braking pressure control apparatus according to the above mode (59) is also operable where at least one of the pressure control valve devices is abnormal, as described below with respect to the following mode (60).

(60) A braking pressure control apparatus according to any one of the above modes (40)–(59), which is provided for controlling the pressure of the pressurized fluid in each of a plurality of brake cylinders of a plurality of brakes, and wherein the first hydraulic pressure source includes a plurality of pressure control valve devices which are operable independently of each other to control the pressures of the pressurized fluid in the plurality of brake cylinders, on the basis of the fluid pressurized by the pressurizing device, the braking pressure control apparatus further comprising:

a diagnosing device for diagnosing each of the pressure control valve devices for any abnormality thereof;

a connecting passage connecting two of the plurality of brake cylinders;

a communicating valve provided in the connecting passage;

a first pressure control device operable when the plurality of pressure control valve devices are all normal, to control the pressures in the plurality of brake cylinders, by controlling the plurality of pressure control valve devices, respectively; and a second pressure control device operable when the diagnosing device determines that at least one of the plurality of pressure control valve is abnormal and when the pressure control valve device corresponding to the brake cylinder connected through the connecting passage to the brake cylinder corresponding to the abnormal pressure control valve device is normal, the second pressure control device controlling the pressures in the two brake cylinders connected to each other by the connecting passage, by controlling the normal pressure control valve device, while the communicating valve in the connecting passage is open.

While the communicating valve is in the open state, the fluid pressures in the two brake cylinders connected to each other through the connecting passage can be controlled by controlling one of the corresponding two pressure control valve devices.

The control by the second pressure control device is described in detail in laid-open publication JP-A-11-245784 of Japanese Patent Application filed by the assignee of the present invention.

(61) A braking pressure control apparatus according to any one of the above modes (40)–(60), which is provided for controlling the pressure of the pressurized fluid in each of four brake cylinders of four brakes, and wherein the first hydraulic pressure source includes four pressure control valve devices which are operable independently of each other to control the pressures of the pressurized fluid in the four brake cylinders, on the basis of the fluid pressurized by the pressurizing device, the braking pressure control apparatus further comprising:

a diagnosing device for diagnosing each of the four pressure control valve devices for any abnormality thereof;

a first pressure control device operable when the four pressure control valve devices are all normal, to control the pressures in the plurality of brake cylinders, by controlling the four pressure control valve devices, respectively; and a second pressure control device operable when the diagnosing device determines that one of the four pressure control valve device is abnormal, to control the pressure in each of the brake cylinders corresponding to the normal pressure control valve devices, by controlling the normal pressure control valve devices, while the brake cylinder corresponding to the abnormal pressure control valve device is disconnected from both of the first and second hydraulic pressure sources.

Where the four brakes are provided for braking respective four wheels of a vehicle, the total vehicle braking force is not insufficient even when one of the four brakes is not normally operable due to an abnormality of the corresponding pressure control valve device, that is, even when the three wheels are braked. When the abnormal pressure control valve device is for one of the rear wheel brakes, the influence of the abnormality of this pressure control valve device is reduced.

When one of the two pressure control valve devices for the rear wheel brakes is abnormal, only the front wheel brakes may be activated while the rear wheel brakes are held in the non-operated state. Usually, the vehicle can be brought to a stop with a sufficient braking force by activation of only the two front wheel brakes, without considerable deterioration of the braking stability.

In the braking pressure control apparatus according to the above mode (61), the second pressure control device is also operable when two of the four pressure control valve devices are abnormal.

(62) A braking pressure control apparatus for controlling a pressure of a working fluid in at least one first brake cylinder of a first cylinder group, and the pressure of the fluid in at least one second brake cylinder of a second cylinder group, the braking pressure control apparatus comprising:

a first hydraulic pressure source including (1) a power-operated pressurizing device for pressurizing the fluid, and (2) a plurality of pressure control valve devices corresponding to the at least one first brake cylinder and the at least one second brake cylinder, the pressure control valve devices being operable to control the pressures of the fluid in the corresponding wheel brake cylinders independently of each other, on the basis of the fluid pressurized by the pressurizing device;

a diagnosing device for diagnosing each of the plurality of pressure control valve devices for any abnormality thereof;

a second hydraulic pressure source operable by an operation of a manually operable brake operating member, to pressurize the fluid to a pressure which corresponds to an operating force acting on the brake operating member and which is higher than a level of the fluid pressurized by the operating force;

a cutting-off device including a first cut-off valve disposed between the second hydraulic pressure source and the at least one first brake cylinder and operable between an open state in which the second hydraulic pressure source and the at least one brake cylinder are communicated with each other and a closed state in which the second hydraulic pressure source and the at least one first brake cylinder are disconnected form each other, and a second cut-off valve disposed between the second hydraulic pressure source and the at least one second brake cylinder and operable between an open state in which the second hydraulic pressure source and the at least one second brake cylinder are communicated with each other and a closed state in which the second hydraulic pressure source and the at least one second brake cylinder are disconnected from each other;

a valve-device control device operable when the diagnosing device determines that at least one of the plurality of pressure control valve devices is abnormal, to control the first and second cut-off valves such that one of the first and second cut-off valves which corresponds to one of the first and second cylinder groups which includes the at least one pressure control valve device which is diagnosed to be abnormal is placed in the open state and such that the other of the first and second cut-off valves is placed in the closed state, the valve-device control device further controlling the pressure of the fluid in each brake cylinder of the other of the first and second cylinder groups, by controlling the corresponding normal pressure control valve device.

When at least one of the plurality of pressure control valve devices is diagnosed to be abnormal, all of the at least one brake cylinder of the first or second cylinder group which includes the at least one brake cylinder corresponding to the abnormal at least one pressure control valve device is communicated with the second hydraulic pressure source, and all of the at least one brake cylinder of the other group is disconnected to the second hydraulic pressure source. In this condition, the pressure of the fluid in each of the at least one brake cylinder of the above-indicated other group is controlled by controlling the corresponding normal pressure control valve device. Thus, upon detection of an abnormality of at least one pressure control valve device, all of the brake cylinders are not communication with the second hydraulic pressure source, so that the fluid pressurized by the second hydraulic pressure source is effectively utilized to operate the at least one brake cylinder corresponding to the normal pressure control valve device, making it possible to reduce the reduction of controllability of the brake cylinder pressures.

Each pressure control valve device may be used for controlling the pressures in the two or more brake cylinders, or the pressure in the corresponding brake cylinder. The braking pressure control apparatus according to the above mode (62) may further include a plurality of braking-pressure detecting devices for detecting the pressures of the fluid in the respective brake cylinders. Where the pressure control valve devices are controlled on the basis of the fluid pressures detected by the braking-pressure detecting devices, the valve-device control device may be operated when at least one of the braking-pressure detecting device is diagnosed to be abnormal. In this case, the at least one brake cylinder of the cylinder group including the at least one brake cylinder corresponding to the abnormal at least one braking-pressure detecting device is communicated with the second hydraulic pressure source.

The braking pressure control apparatus according to the above mode (62) may incorporate any one of the technical features of the above modes (40)–(61).

(63) A braking pressure control apparatus for a hydraulically operated brake, the braking pressure control apparatus comprising:

a first hydraulic system including a first hydraulic pressure source which is power-operated to pressurize a working fluid and capable of controlling a pressure of the pressurized fluid, for operating the brake with the pressurized fluid delivered from the first hydraulic pressure source;

a second hydraulic system including a manually operable brake operating member, and a second hydraulic pressure source which is operable by an operating force acting on the brake operating member, to pressurize the working fluid to a pressure corresponding to the operating force, for operating the brake with the pressurized fluid delivered from the second hydraulic pressure source; and a switching device for selectively establishing a first state in which the brake is operated by the first hydraulic system, a second state in which the brake is operated by the second hydraulic system, and a third state in which the brake is operated by the first and second hydraulic systems.

The braking pressure control apparatus according to the above mode (63) may incorporates any one of the technical features of the above modes (40)–(61).

(64) A braking pressure control apparatus according to the above mode (63), further comprising a switching control device operable to command the switching device to establish the third state when an amount of increase of a braking force generated by the brake, which amount is desired by an operator of the brake operating member, is larger than a predetermined threshold.

The amount of increase of the braking force desired by the operator of the brake operating member is relatively large when the operator desires to abruptly activate the brake, or when the operation of the brake operating member is initiated. In such an instance, the third state is established so that the fluid pressure of the brake can be increased at a relatively high rate, enabling the brake to generate the operator's desired braking force in a short time. In the third state, the braking effect characteristic can be controlled, as described above with respect to the above mode (44).

(65) A braking pressure control apparatus according to the above mode (63) or (64), wherein the switching control device commands said switching device to establish one of the second and third states, when the first hydraulic pressure source is abnormal.

(66) A braking pressure control apparatus for a hydraulically operated brake, said braking pressure control apparatus comprising:

a power-operated hydraulic pressure source for pressurizing a working fluid and capable of controlling a pressure of the pressurized fluid, for operating the brake with the pressurized fluid delivered from the hydraulic pressure source; and a pressure control device operable to control a pressure of the fluid of the brake, by controlling the pressure of the fluid pressurized by the hydraulic pressure source, on the basis of an operating amount of a manually operable brake operating member, and at least one of a rate of change of the operating amount and a derivative of said rate of change.

The hydraulic pressure source may include a power-operated pressurizing device operable to pressurize the fluid, and a pressure control valve device operable to control the pressure of the fluid pressurized by the pressurizing device. In this case, the pressure control valve device is controlled by the pressure control device, for controlling the pressure of the fluid pressurized by the hydraulic pressure source.

Where the hydraulic pressure source does not include a pressure control valve device, the pressure control device controls the amount of power to be applied to the pressurizing device, for controlling the pressure of the fluid pressurized by the hydraulic pressure source.

The braking pressure control apparatus according to the above mode (66) may incorporate any one of the technical features of the above modes (40)–(65).

(67) A braking pressure control apparatus according to any one of the above modes (40)–(66), further comprising a change restricting device operable upon a switching between the first and second states by the switching device, to restrict at last one of a change of an operating state of the brake operating member and a change of the fluid pressure in a brake cylinder of the brake.

The change restricting device makes it possible to restrict the inconveniences which take place when the switching device is operated to effect the switching between the first and second states.

(68) A braking pressure control apparatus according to any one of the above modes (40)–(65), further comprising a pressure-difference reducing device operable to reduce a difference between the fluid pressure in a brake cylinder of the brake and the pressure of the fluid pressurized by the second hydraulic pressure source, when the switching device is operated to effect the switching between said first and second states.

(69) A braking pressure control apparatus according to any one of the above modes (40)–(65), (67) and (68), further comprising a flow-amount reducing device operable to reduce amounts of flow of the fluid between the second hydraulic pressure source and a brake cylinder of the brake when the switching device is operated to effect the switching between the first and second states.

(70) A braking pressure control apparatus according to any one of the above modes (40)–(65) and (67)–(69), further comprising a change-rate restricting device for restricting a rate of change of the fluid pressure in a brake cylinder of the brake when the switching device is operated to effect the switching between the first and second states.

(71) A braking pressure control apparatus according to any one of the above modes (40)–(65) and (67)–(70), wherein the switching device is operated to effect at least the switching from the first state to the second state, while the brake operating member is not in operation.

(72) A braking pressure control apparatus according to any one of the above modes (40)–(65) and (67)–(71), further comprising a control-state-change restricting device operable to restrict a change in a control characteristic of the fluid pressure in said brake cylinder when the braking system is switched between said first and second operating states by said switching device.

(73) A braking pressure control apparatus according to any one of the above modes (40)–(65) and (67)–(72), further comprising:

a second-pressure-source pressure detecting device for detecting the pressure of the fluid pressurized by the second hydraulic pressure source;

a braking pressure detecting device for detecting the fluid pressure in a brake cylinder of the brake; and a diagnosing device for diagnosing at least one of the second-pressure-source pressure detecting device and the braking pressure detecting device for any abnormality thereof, on the basis of output signals of the second-pressure-source pressure detecting device and the braking pressure detecting device.

(74) A braking pressure control apparatus according to any one of the above modes (40)–(65) and (67)–(73), wherein the second hydraulic pressure source includes:

a hydraulic booster including a power piston operatively connected to the brake operating member, and having a booster chamber which is partially defined by an end face of the power piston and which receives a pressurized fluid whose pressure corresponds to the operating force of the brake operating member; and a master cylinder including a pressurizing piston operatively connected to the power piston, and having a pressurizing piston which is partially defined by a front end face of the pressurizing piston.

(75) A braking pressure control apparatus according to the above mode (74), further comprising:

a master-cylinder pressure detecting device for detecting the pressure of the fluid in the pressurizing chamber;

a booster pressure detecting device for detecting the pressure of the fluid in the booster chamber; and a diagnosing device for diagnosing the apparatus for any abnormality thereof, on the basis of the pressures detected by the master-cylinder pressure detecting device and the booster pressure detecting device.

It is possible to diagnose the master cylinder and the hydraulic booster for any abnormality thereof, on the basis of the master-cylinder pressure and the booster pressure which are detected by the master-cylinder and booster pressure detecting devices.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which:

FIG. 6 is a view indicating fluid flows from a master cylinder and the stroke simulator toward a wheel brake cylinder when the simulator shut-off valve is controlled by the braking pressure control apparatus while the master cylinder pressure is higher than the wheel brake cylinder pressure;

FIGS. 19A, 19B and 19C are views showing a data table stored in the ROM, which data table indicates various treatments for dealing with various kinds of abnormalities of the braking system of FIG. 15;

DETAILED DESCRIPTION OF THE PREFERRED EMBODIMENTS

Figure 1:
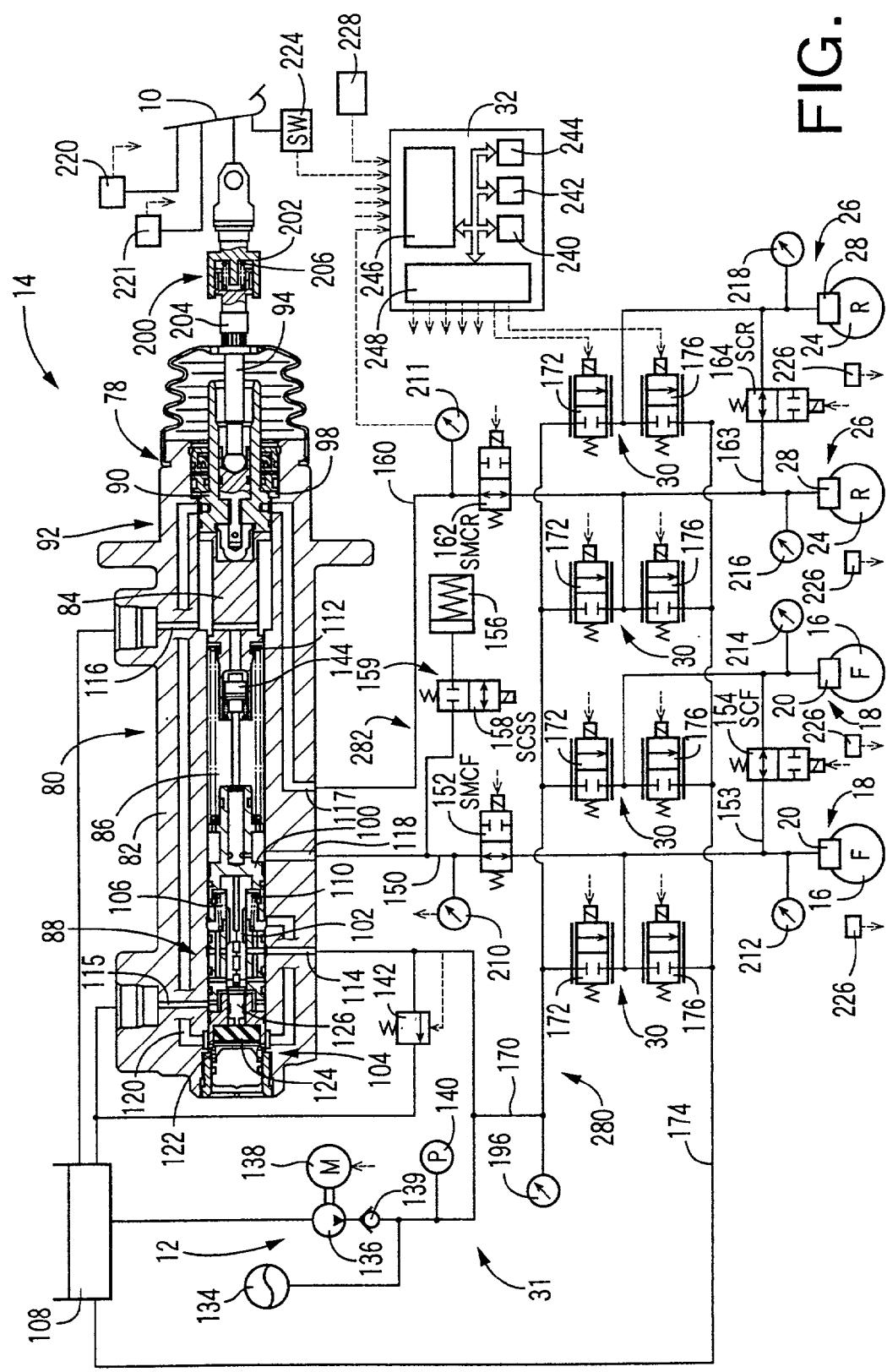
FIG. 1 is a schematic view of a braking system including a braking pressure control apparatus constructed according to one embodiment of this invention.

Referring first to FIG. 1, the hydraulically operated braking system shown therein includes a manually operable brake operating member in the form of a brake pedal 10, a pump device 12, a second hydraulic pressure source 14, front wheel brakes 18 having wheel brake cylinders 20 provided for respective front wheels 16, rear wheel brakes 26 having wheel brake cylinders 28 provided for respective rear wheels 24, and four linear valve devices 30 provided for the respective wheel brake cylinders 20, 28. In the present embodiment, the pump device 12 and mutually independent pressure control valve devices in the form of the linear valve devices 30 constitute a first hydraulic pressure source 31. The braking system has a first operating state in which the wheel brake cylinder 20, 28 of each wheel 16, 24 is activated with a pressurized fluid delivered from the first hydraulic pressure source 31, and a second operating state in which the wheel brake cylinder 20, 28 is activated with a pressurized fluid delivered from the second hydraulic pressure source 14. The braking system is selectively placed in one of the first and second operating states. In the first operating state, the fluid pressures in the individual wheel brake cylinders 20, 28 are controllable independently of each other by the respective linear valve devices 30. The first and second operating states are selectively established under the control of an electronic brake control unit 32 (hereinafter referred to as ("ECU 32"). In the present invention, the linear valve devices 30 constitute a solenoid-operated pressure control valve device.

The second hydraulic pressure source 14 includes a hydraulic booster 78 and a master cylinder 80.

The master cylinder 80 has a housing 82, a pressurizing piston 84 fluid-tightly and slidably received within the housing 82, and a pressurizing chamber 86. A working fluid in the pressurizing chamber 86 is pressurized by an advancing movement of the pressurizing piston 84.

The hydraulic booster 78 includes a pressure regulating portion 88, and an input portion 92 including a power piston 90. The pressure regulating portion 88 is arranged to regulate the pressure of a pressurized fluid delivered from the pump device 12, to a level corresponding to an operating force acting on the brake pedal 10. The brake pedal 10 is connected through an operating rod 94 to the power piston 90. The power piston 90 partially defines a rear pressurizing chamber (booster chamber) 98 on its rear side. The pressurized fluid the pressure of which is regulated by the pressure regulating portion 88 is supplied to the rear pressurizing chamber 98, so that the power piston 90 is advanced (moved in the left direction as seen in FIG. 1) by a force based on the fluid pressure in the rear pressurizing chamber 98, whereby the operating force of the brake pedal 10 is boosted by the hydraulic booster 78. The force acting on the power piston 90 in its advancing direction based on the fluid pressure in the booster chamber 98 will be referred to as an "assisting force" where appropriate.

The pressure regulating portion 88 includes a pressure regulating piston 100, a spool 102 and a reaction applying device 104. The pressure regulating piston 100 partially defines a pressure regulating chamber 106 on its front side. The spool 102 functions to establish selective communication of the pressure regulating chamber 106 with the pump device 12 or a master reservoir 108, or disconnect the pressure regulating chamber 106 from both of the pump device 12 and the master reservoir 108. As a result, the fluid pressure in the pressure regulating chamber 106 is regulated to the level corresponding to the operating force of the brake pedal 10. The spool 102 is moved together with the pressure regulating piston 100.

A return spring 110 is disposed between the spool 102 and the housing 82, and a return spring 112 is disposed between the pressure regulating piston 100 and the pressurizing piston 84. The spool 102 is normally held in its fully retracted position (rightmost position as seen in the figure)

under a biasing action of the return spring 110, while the pressurizing piston 84 is normally held in its fully retracted position under a biasing action of the return spring 112.

A preset load of the return spring 112 disposed between the pressurizing piston 84 and the pressure regulating piston 100 is larger than that of the return spring 110 disposed between the spool 102 and the housing 82, so that while a drive force acting on the pressurizing piston 84 in the advancing direction is smaller than the preset load of the return spring 112 and larger than that of the return spring 110, the pressurizing piston 84 is advanced so as to advance the pressure regulating piston 100 together with the spool 102. When the drive force acting on the pressurizing piston 84 becomes larger than the preset load of the return spring 112, the pressurizing piston 84 is advanced relative to the pressure regulating piston 100, so that the volume of the pressurizing chamber 86 is reduced.

The housing 82 has a plurality of ports 114–118 formed therein. Namely, the housing 82 has a high-pressure port 114 connected to the pump device 12, two low-pressure ports 115, 116 connected to the master reservoir 108, a brake-cylinder port 117 communicating with the booster chamber 98 and connected to the rear wheel brake cylinders 28, and a brake-cylinder port 118 communicating with the pressurizing chamber 86 and connected to the front wheel brake cylinders 20. The pressure regulating chamber 106 is connected through a fluid passage 120 to the booster chamber 98, so that the pressurized fluid which is delivered from the pump device 12 and the pressure of which is regulated by the pressure regulating portion 88 is supplied to the rear wheel brake cylinders 28 through the booster chamber 98. The pressurized fluid delivered from the pressurizing chamber 86 in response to an advancing movement of the pressurizing piston 84 is supplied to the front wheel brake cylinders 20. It will thus be understood that the present braking system has a front sub-system including the front wheel brake cylinders 20, and a rear sub-system including the rear wheel brake cylinders 28. The rear wheel brake cylinders 28 serve as first brake cylinders, while the front wheel brake cylinders 20 serve as second brake cylinders.

A pressure chamber 122 is provided in communication with the fluid passage 120. As described below, the reaction-force applying device 104 is activated with the fluid pressure in the pressure chamber 122.

When the spool 102 is placed in its fully retracted position, the pressure regulating chamber 106 in front of the pressure regulating piston 100 is held in communication with the master reservoir 108 through the low-pressure port 115, so that the fluid pressure in the pressure regulating chamber 106 is at the atmospheric level, and the fluid pressure in the booster chamber 98 is accordingly at the atmospheric level.

When the spool 102 is advanced with an advancing movement of the pressure regulating piston 100, the pressure regulating chamber 106 is disconnected from the master reservoir 108 and communicated with the pump device 12 through the high-pressure port 114. As a result, the fluid pressure in the pressure regulating chamber 106 is raised, and the thus pressurized fluid is delivered from the pressure regulating chamber 106 to the booster chamber 98 through the fluid passage 120. Accordingly, the power piston 90 receives the assisting force in addition to the drive force based on the operating force of the brake pedal 10, and is advanced to advance the pressurizing piston 84. Thus, the operating force of the brake pedal 10 is boosted by the hydraulic booster 78, and the fluid pressure in the pressurizing chamber 86 is pressurized to a level corresponding to the boosted force (sum of the drive force and the assisting force). The pressure regulating piston 100 is eventually held at a position of equilibrium between a force which acts on the piston 100 in the advancing direction based on the fluid pressure in the pressurizing chamber 86, and a sum of a force which acts on the piston 100 in the retracting direction based on the fluid pressure in the pressure regulating chamber 106 and the biasing force of the return spring 110 (which acts in the advancing direction). Accordingly, the position of the spool 102 is determined, and the fluid pressure in the pressure regulating chamber 106 is regulated to a level corresponding to or determined by the operating force of the brake pedal 10 (hereinafter referred to as a "brake operating force" where appropriate).

As the force acting on the pressure regulating piston 100 in the advancing direction is increased, the fluid pressure in the pressure regulating chamber 106 is raised or increased, and the fluid pressure in the pressure chamber 122 is accordingly raised. As a result, a force based on the fluid pressure in the pressure chamber 122 acts on a reaction disc 124 of the reaction-force applying device 104 in the retracting direction, so that a reaction force is applied from the reaction disc 124 to the spool 102 through a reaction rod 126, and to the brake pedal 10 through the pressure regulating piston 100 and the pressurizing piston 84. As the brake operating force is increased, the reaction force received by the brake pedal 10 is accordingly increased, and the boosting ratio of the hydraulic booster 78 is reduced.

The pump device 12 includes an accumulator 134, a pump 136, an electric motor 138 for driving the ump 134, and a check valve 139. The pressurized fluid delivered from the pump device 12 is detected by a hydraulic pressure sensor 140. Namely, the pressure of the pressurized fluid stored in the accumulator 134 can be detected by the pressure sensor 140. In this embodiment, the electric motor 138 is controlled so as to hold the fluid pressure in the accumulator 134 within a predetermined range, so that the pressure in the accumulator 134 is held substantially within the predetermined range. In the present embodiment, the pump 136 is a plunger pump. However, the plunger pump 136 may be replaced by a gear pump.

A pressure relief valve 142 is provided in a fluid passage connecting the delivery and suction sides (high-pressure and low-pressure sides) of the pump 136. The pressure relief valve 142 functions to prevent an excessive rise of the pressure of the pressurized fluid delivered from the pump 136, that is, an excessive rise of the delivery pressure of the pump 136.

The second hydraulic pressure source 14 is arranged to deliver a pressurized fluid when the brake pedal 10 is operated or depressed. As the operating amount of the brake pedal 10 is increased, the power piston 90 and the pressurizing piston 84 are advanced to advance the pressure regulating piston 100 and the spool 102, so that the fluid pressure in the pressure regulating chamber 106 is increased by the pressurized fluid received from the pump device 12, and is regulated by the pressure regulating portion 88, to a level corresponding to the brake operating force. The pressurized fluid having the thus regulated pressure is supplied to the booster chamber 98. As a result, the pressurizing piston 84 is advanced by both the brake operating force and the assisting force based in the fluid pressure in the booster chamber 98, so that the fluid pressure in the pressurizing chamber 86 is increased. The fluid pressurized in the booster chamber 98 is supplied to the rear wheel brake cylinders 28, while the fluid pressurized in the pressurizing chamber 86 is supplied to the front wheel brake cylinders 20.

When the brake pedal 10 is released toward its non-operated position, the brake operating force acting on the pressurizing piston 84 is reduced, and the fluid pressure in the pressurizing chamber 86 is lowered. As a result, the pressure regulating piston 100 is retracted with the spool 102, and the pressure regulating chamber 106 is eventually communicated with the master reservoir 108, so that the fluid pressure in the chamber 106 is lowered. The fluid discharged from the front wheel brake cylinders 20 is returned to the master reservoir 108 through the pressurizing chamber 86, a center valve 144 and the low-pressure port 116.

To the pressurizing chamber 86, there are connected the front wheel brake cylinders 20 through a fluid passage 150. A solenoid-operated shut-off valve 152 (hereinafter referred to as a "master-cylinder shut-off valve 152", and represented by SMCF in the drawings) is provided in the fluid passage 150. The two front wheel brake cylinders 20 are connected to each other through a connecting passage 153 in which is provided a solenoid-operated shut-off valve 154 (hereinafter referred to as a "front communicating valve 154", and represented by SCF in the drawings). The fluid passage 150 serves as a main fluid passage, while the connecting passage 153 serves as a passage for connecting the two front wheel brake cylinders 20. To a portion of the fluid passage 150 between the master-cylinder shut-off valve 152 and the brake-cylinder port 118, there is connected a stroke simulator 156 through a solenoid-operated shut-off valve 158 (hereinafter referred to as a "simulator shut-off valve 158", and represented by SCSS in the drawings). The stroke simulator 156 and the simulator shut-off valve 158 constitute a stroke simulator device 159.

To the booster chamber 98, there are connected the rear wheel brake cylinders 28 through a fluid passage 160. A solenoid-operated shut-off valve 162 (hereinafter referred to as a "master-cylinder shut-off valve 162", and represented by SMCR in the drawings) is provided in the fluid passage 160. The two rear wheel brake cylinders 28 are connected to each other through a connecting passage 163 in which is provided a solenoid-operated shut-off valve 164 (hereinafter referred to as a "front communicating valve 164", and represented by SCR in the drawings).

Each of the master-cylinder shut-off valves 152, 162 has a solenoid coil, and is placed in its closed state when the solenoid coil is energized. In the closed state, the corresponding wheel brake cylinder 20, 28 is disconnected from the second hydraulic pressure source 14. When the solenoid coil is de-energized, the master-cylinder shut-off valve 152, 162 is placed in its open state in which the corresponding wheel brake cylinder 20, 28 is communicated with the second hydraulic pressure source 14. The master-cylinder shut-off valves 152, 162 and the front and rear communicating valves 154, 164 are normally open valves, while the simulator shut-off valve is a normally closed valve.

To the pump device 12, there are connected the wheel brake cylinders 20, 28 through a fluid passage 170 in which is provided a pressure-increasing linear valve 172. Further, a pressure-reducing linear valve 176 is provided in a fluid passage 174 connecting the wheel brake cylinders 20, 28 and the master reservoir 108. These pressure-increasing and pressure-reducing linear valves 172, 1766 constitute the linear valve device 30.

Figure 2:
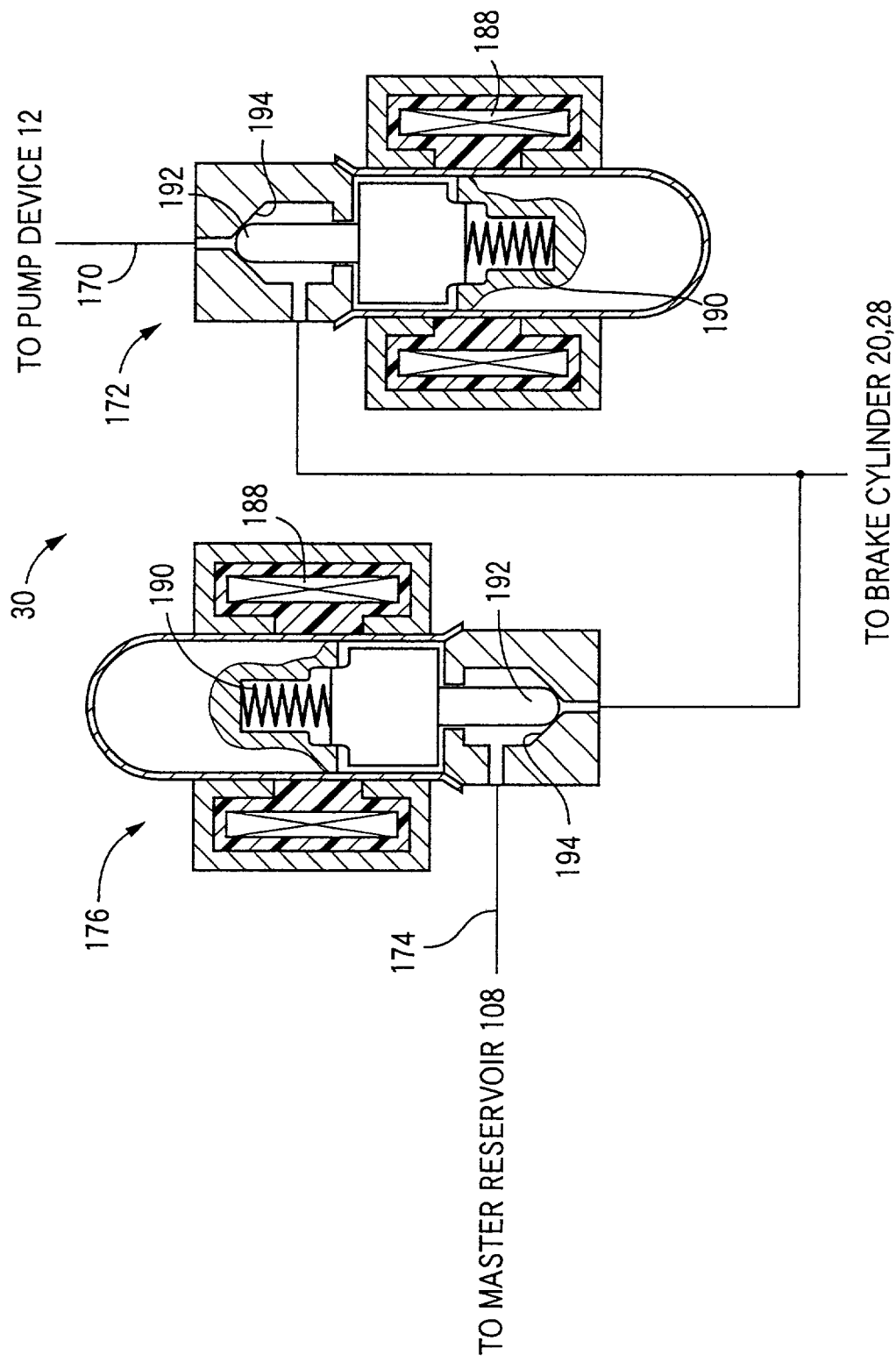
FIG. 2 is an elevational view partly in cross section of a linear valve device included in the braking pressure control apparatus of FIG. 1.

As shown in FIG. 2, the pressure-increasing and pressure-reducing linear valves 172, 176 are both normally closed valves, each of which is a seating valve including a solenoid having a coil 188, a spring 190, a valve member 192, and a valve seat 194.

When the coil 188 of the seating valve is in a de-energized state, a biasing force of the spring 190 acts on the valve member 192 in a valve-closing direction that causes the valve member 192 to be seated on the valve seat 194, while at the same time a force based on a pressure difference across the linear valve 172, 174 acts on the valve member 192 in a valve-opening direction that causes the valve member 192 to be moved away from the valve seat 194. When the force based on the pressure difference is larger than the biasing force of the spring 190, the valve member 192 is held apart from the valve seat 194, that is, the linear valve 172, 176 is placed in the open position.

When the coil 188 is energized with an electric current, an electromagnetic drive force acts on the valve member 192 in the valve-opening direction. A sum of this electromagnetic drive force and the force based on the pressure difference (hereinafter referred to as a "pressure-difference force") acts on the valve member 192 in the valve opening direction while the biasing force of the spring 190 acts on the valve member 192 in the valve-closing direction. The position of the valve member 192 relative to the valve seat 194 is determined by a relationship between the above-indicated sum and the biasing force of the spring 190. The electromagnetic force is increased with an increase in the amount of electric current to be applied to the coil 188.

When the electromagnetic force is increased with an increase of the amount of electric current applied to the coil 188, the force by which the valve member 192 has been forced against the valve seat 194 is reduced, so that the pressure-difference force required to move the valve member 192 from the valve seat 194 is accordingly reduced. The valve member 192 is moved apart from the valve seat 194 when the sum of the pressure-difference force and the electromagnetic force becomes larger than the biasing force of the spring 190. The lower limit of the pressure difference across the linear valve 172, 176 above which the valve member 192 is moved apart from the valve seat 194 is referred to as a "valve-opening pressure difference". The valve-opening pressure difference is reduced with an increase in the electromagnetic force, that is, with an increase in the amount of electric current to be applied to the coil 188. In the pressure-increasing linear valve 172, the pressure-difference force corresponds to a difference between the pressure of the pressurized fluid delivered from the pump device 12 (pressure in the accumulator 134) and the fluid pressure in the wheel brake cylinder 20, 28. In the pressure-reducing valve 176, the pressure-difference force corresponds to a difference between the fluid pressure in the master reservoir 108 and the fluid pressure in the wheel brake cylinder 20, 28. In both of the pressure-increasing and pressure-reducing linear valves 172, 176, the pressures of the fluid to be delivered to the wheel brake cylinders 20, 28 can be controlled by controlling the electromagnetic forces generated by the respective linear valves 172, 176, that is, by controlling the amounts of electric current to be applied to the coils 188 of the respective linear valves 172, 176.

To a portion of the fluid passage 170 between the pressure-increasing linear valve 172 and the pump device 12, there is connected a hydraulic pressure sensor 196 provided for detecting the pressure of the pressurized fluid to be supplied to the pressure-increasing linear valve 172. The output signal of this pressure sensor 196 more accurately represents the pressure of the fluid as supplied to the linear valve 172, than that of the pressure sensor 140, since the pressure detected by the pressure sensor 196 reflects a pressure loss between the pump device 12 and the linear valve 172. Accordingly, the use of the output signal of the pressure sensor 196 assures improved accuracy of control of the linear valve device 30. However, the output signal of the pressure sensor 140 may be used to detect the pressure of the fluid as supplied to the pressure-increasing valve 172.

It will be understood that the first hydraulic pressure source 31 including the pump device 12 and the linear valve devices 30, the fluid passage 170 and wheel brake cylinders 20, 28 cooperate to constitute a major portion of a dynamic pressurizing system, while the second hydraulic pressure source 14, fluid passages 150, 160 and the wheel brake cylinders 20, 28 cooperate to constitute a static pressurizing system. The dynamic pressurizing system is arranged to pressurize the fluid without an operation of the brake pedal 10, to a predetermined level. The static pressurizing system is arranged to pressurize the fluid in response to an operation of the brake pedal. The operating state of the braking system in which the wheel brakes 18, 26 are operated by the dynamic pressurizing system is referred to as a first operating state, while that in which the wheel brakes 18, 26 are operated by the static pressurizing system is referred to as a second operating state.

To the operating rod 94, there is connected a stroke simulator 200, which includes a spring 206 through which a pedal-side rod 202 and a booster-side rod 204 of the operating rod 94 engage each other such that the pedal-side rod 202 is movable relative to the booster-side rod 204.

In the present hydraulically operated braking system, the stroke simulator 156 is provided in the fluid passage 150, in addition to the stroke simulator 200. The stroke simulator 156 is a wet-type stroke simulator, as distinguished from the stroke simulator 200 which is a dry-type stroke simulator.

In the present hydraulically operated braking system, hydraulic pressure sensors 210 and 211 are provided for detecting the fluid pressures in the pressurizing chamber 86 and the booster chamber 98 of the second hydraulic pressure source 14, respectively, and hydraulic pressure sensors 212, 214, 216 and 218 are provided for detecting the fluid pressures in the respective wheel brake cylinders 20, 28. Two stroke sensors 220, 221 are provided for detecting the operating amount of the brake pedal 10, more specifically, the operating stroke of the brake pedal 10. A desired braking torque which is a total vehicle braking torque desired by the vehicle operator is obtained on the basis of the output signals of the stroke sensors 220, 221 and the hydraulic pressure sensors 210, 211. Described in detail, the desired braking torque is obtained on the basis of the output signals of the stroke sensors 210, 211 during an initial period of an operation of the brake pedal 10, and is obtained on the basis of the output signals of the hydraulic pressure sensors 210, 211 in the subsequent period of the operation of the brake pedal 10. In the initial period of the operation of the brake pedal 10, an increase in the pressure of the fluid pressurized by the second hydraulic pressure source 14 is delayed with respect to an increase in the brake operating stroke. The use of the output signals of the stroke sensors 220, 221 in the initial period permits the desired braking torque to be obtained without the above-indicated delay. Although the provision of the two stroke sensors 220, 221 is not essential, it assures an improved degree of accuracy of detection of the operating stroke of the brake pedal 10. It is also noted that the fluid pressures detected by the hydraulic pressure sensors 210, 211 (the fluid pressure in the pressurizing chamber 86 and the fluid pressure in the booster chamber 98) are not necessarily exactly equal to each other, but both of these pressures correspond to the operating force of the brake pedal 10.

The output signals of the four sensors, namely, the master-cylinder pressure 210, booster pressure sensor 211 and the two stroke sensors 220, 221 are used to obtain a desired vehicle braking torque or force. However, the use of these four sensors is not essential, and the desired vehicle braking torque may be obtained on the basis of the output signal of a single pedal force sensor providing for detecting the operating force of the brake pedal 10. The desired total vehicle braking torque may be obtained on the basis of both the brake operating stroke and the fluid pressure corresponding to the brake operating force.

The present braking system further uses: a brake switch or stop switch 224 for detecting an operation or a depressing action of the brake pedal 10; wheel speed sensors 226 for detecting the rotating speeds of the wheels 16, 24; an operating-state detecting device 228 for detecting the operating states of manually operated members provided on a control panel, for instance; a vehicle speed sensor 230 for detecting the running speed of the vehicle; and an ignition switch 230.

The slipping state or tendency of each wheel 16, 24 can be detected on the basis of the output signal of the corresponding wheel speed sensor 226. The operating states of the manually operated members on the control panel can be detected by the output signals of the operating-state detecting device 228. The manually operated members include a braking-effect control selector switch which is turned on by the vehicle operator when the operator desires to control the braking system in a braking-effect control mode in which the vehicle braking force is controlled on the basis of a detected actual braking effect, which may be represented by the detected deceleration value of the vehicle, for example.

The present braking system is controlled by the ECU 32, which is principally constituted by a computer incorporating a central processing unit (CPU) 240, a random-access memory (RAM) 242, a read-only memory (ROM) 244, an input portion 246 and an output portion 248. To the input portion 246, there are connected the above-indicated hydraulic pressure sensors 140, 196, 210, 211, 212–218, stroke sensors 220, 221, stop switch 224, wheel speed sensors 226 and operating-state detecting device 228. To the output portion 248, there are connected driver circuits for controlling the solenoid coils of the above-indicated solenoid-operated shut-off valves 152, 154, 158, 162, 164 and the solenoid coils 188 of the linear valve devices 30. The ROM 244 stores various control programs and data tables or maps, which includes: a control program for executing a control routine for controlling the master-cylinder shut-off valves 152, 163, as illustrated in the flow chart of FIG. 3; a control program for executing a control routine for controlling the linear valve devices 30 while the braking system is placed in the first operating state; a control program for executing a control routine for selectively establishing the first and second states; a control program for executing an anti-lock braking pressure control routine; a control program for executing vehicle turning stability control routine; and a control program for executing a cooperative braking control routine. The linear valve devices 30 are feedback-controlled on the basis of the detected actual values of the wheel brake cylinder pressure so that the actual values of the fluid pressures in the wheel brake cylinders 20, 28 coincide with the desired values. In the cooperative braking control, the vehicle is braked by a regenerative braking torque generated by a motor generator (not shown), as well as a hydraulic braking torque generated by the present braking system.

An operation of the hydraulically operated braking system constructed as described above will be described.

In the first operating state of the braking system, the master-cylinder shut-off valves 152, 162 are placed in the closed state, so that the wheel brake cylinders 20, 28 are disconnected from the second hydraulic pressure source 14. Further, the front and rear communicating valves 154, 164 are placed in the closed sate, while the simulator shut-off valve 158 is placed in the open state. In this first operating state, the amounts of electric current to be applied to the coils 188 of each linear valve device 30 are controlled to control the pressure of the pressurized fluid delivered from the pump 12, for thereby controlling the fluid pressure in each wheel brake cylinder 20, 28.

In the second operating state of the braking system, the master-cylinder shut-off valves 152, 162 are placed in the open state, while the front and rear communicating valves 154, 164 are placed in the open state, so that the wheel brake cylinders 20, 28 are communicated with the second hydraulic pressure source 14. In this second operating state, a pressurized fluid is delivered from the second hydraulic pressure source 14 to the wheel brake cylinders 20, 24 of the brakes 18, 26, in response to an operation of the brake pedal 10.

In the second operating state, the simulator shut-off valve 158 is placed in the closed state, so that the stroke simulator 156 is disconnected from the second hydraulic pressure source 14, to prevent an unnecessary flow of the pressurized fluid into the stroke simulator 156, for thereby avoiding an unnecessary consumption of the pressurized fluid delivered from the second hydraulic pressure source 14. In addition, the coils 188 of the linear valve devices 30 are held in the de-energized state, and the pressure-increasing and pressure-reducing valves 172, 176 of each linear valve device 30 are held in the closed state, so that the wheel brake cylinders 20, 28 are disconnected from the pump device 12. In the present embodiment, the linear valve devices 30 constitute a part of a switching device for selectively establishing the first and second operating states. Namely, the wheel brake cylinders 20, 28 are disconnected from the first hydraulic pressure source 31 (pump device 12) when the pressure-increasing linear valves 172 are brought to the closed state.

In the second hydraulic pressure source 14 of the braking system placed in the second operating state, the hydraulic booster 78 is activated with the pressurized fluid delivered from the pump device 12. If the pressurized fluid is not supplied from the pump device 12 to the hydraulic booster 78 due to any abnormality or defect of the pump device 12, for instance, the hydraulic booster 78 is not operable. In this event, the second hydraulic pressure source 14 functions simply as the master cylinder 80. Namely, the pressurizing piston 84 is advanced by only the brake operating force received from the brake pedal 10, without the assisting force acting on the pressurizing piston 84. The fluid pressurized in the pressurizing chamber 86 is delivered to the front wheel brake cylinders 20 for activating the front brakes 18.

The braking system is selectively placed in the first and second operating states, according to a predetermined switching control program.

The braking system is placed in the second operating state during a normal braking operation. The braking system is switched to the first operating state if a predetermined initiating condition for initiating the anti-lock braking pressure control or the vehicle turning stability control is satisfied during an operation of the braking system in the second operating state. For instance, the initiating condition for initiating the anti-lock braking pressure control is satisfied when the amount of slipping or locking of any wheel of the vehicle being braked has exceeded a predetermined upper limit, and the initiating condition for initiating the vehicle turning stability control is satisfied when the degree of turning stability of the vehicle has been lowered to a predetermined lower limit. The braking system is restored to the second operating state when a predetermined terminating condition for terminating the anti-lock braking pressure control or the vehicle turning stability control is satisfied. For instance, the terminating condition for terminating the anti-lock braking pressure control is satisfied when the vehicle running speed has been lowered to a predetermined value close to zero, and the terminating condition for terminating the vehicle turning stability control is satisfied when the degree of turning stability of the vehicle has been increased to a predetermined high value.

In the anti-lock braking pressure control in the first operating state of the braking system, the amount of electric current to be applied to the coil 188 of the linear valve device 30 corresponding to each excessively slipping or locking wheel 16, 24 is controlled for controlling the fluid pressure in the corresponding wheel brake cylinder 20, 28, so as to hold the slipping amount of the wheel 16, 24 in a predetermined optimum range. In the vehicle turning stability control, the appropriate linear valve device or devices 30 is/are controlled for controlling the corresponding wheel brake cylinder or cylinders 20, 28, so as to improve the turning stability of the vehicle, such that a difference between the braking forces applied to the left and right wheels 16, 24 generates a yaw rate suitable for holding the degree of turning stability of the vehicle in an optimum range.

The braking system may be switched from the second operating state to the first operating state when the vehicle braking force based on the fluid pressure generated by the second hydraulic pressure source 14 is not sufficient to meet the operator's desired value as represented by the operating force of the brake pedal 10. For instance, the braking system is switched to the first operating state when a predetermined initiating condition for initiating an abrupt braking control is satisfied. The braking system is restored to the second operating state when a predetermined terminating condition for terminating the abrupt braking control is satisfied, or when the vehicle has been stopped. The braking system may be switched from the second operating state to the first operating state when an automatic braking control is required without an operation of the brake pedal 10. For instance, the automatic braking control is initiated when the distance between the vehicle equipped with the present braking system and a vehicle running just in front of the vehicle in question has been reduced to a predetermined threshold.

The braking system is switched to the second operating state also when any abnormality or defect of the dynamic pressurizing system including the pump device 12 and the linear valve devices 30 is detected, and is switched to the first operating state when any abnormality or defect of the static pressurizing system including the second hydraulic pressure source 14 is detected. The abnormalities of the pump device 12 include a defect of the accumulator 134, and defects of the pump 136 and the pump motor 138, and the abnormalities of the second hydraulic pressure source 14 include an abnormality of the pressure regulating portion 88 (e.g., a failure or sticking of the spool 103). For example, the hydraulic booster 78 (static pressurizing system) including the pressure regulating portion 88 is found defective where the fluid pressure in the booster chamber 98 is lower than a predetermined lower limit, and the first hydraulic pressure source 31 (dynamic pressurizing system) is found detective where the fluid pressure in the accumulator 134 is lower than a predetermined lower limit. These pump 12, linear valve devices 30 and second hydraulic pressure source 14 are diagnosed for any abnormality at an appropriate opportunity, for instance, when the ignition switch of the vehicle is turned on or when the vehicle has been brought to a stop.

The braking system can be switched between the first and second operating state, by the vehicle operator, with a suitable manually operable member provided on an instrumental panel, for instance. In the first operating state, the operator's desired vehicle braking force is determined on the basis of the output signals of the stroke sensors 220, 221 and the master-cylinder pressure sensors 210, 211, and the braking effect control is performed by controlling the amount of electric current to be applied to the coils 188 of the linear valve devices 30, so that the actual fluid pressure in the wheel brake cylinders 20, 28 coincides with a desired value corresponding to the determined operator's desired vehicle braking force. The manually operable member indicated above is operated to an ON state by the operator when the operator desires to perform the braking effect control. When this operation of the manually operable member is detected by the operating-state detecting 228, the braking system is switched to the first operating state. When the manually operable member is not in the ON state, the braking system is placed in the second operating state.

The braking system may be switched from the first operating state to the second operating state when the load acting on the linear valve devices 30 during the braking effect control has exceeded or is expected to exceed a predetermined upper limit. For instance, the braking system is switched to the second operating state when the amount of electric current applied to the linear valve devices 30 is kept larger than a predetermined upper limit for more than a predetermined time.

The cooperative braking control may be performed where the drive power source of the vehicle equipped with the present braking system includes an electric motor. In the cooperative braking control, the fluid pressure in the wheel brake cylinders 20, 28 is controlled such that a sum of the regenerative braking force generated by the electric motor and the hydraulic braking force generated by the wheel brake cylinders 20, 28 coincides with the operator's desired vehicle braking force. The cooperative braking control is initiated when the operating speed of the electric motor is higher than a predetermined threshold while the amount of electric energy presently stored in a battery used for the electric motor is smaller than a predetermined upper limit, namely, while the amount of electric energy that can be stored in the battery is larger than a predetermined lower limit. The cooperative braking control is terminated when the operating speed of the electric motor has been lowered below a predetermined threshold, or when the amount of electric energy that can be stored in the battery is not larger than the lower limit, that is, when the battery is expected to be overcharged during the cooperative braking control. The cooperative braking control is effected in the first operating state of the braking system. When a predetermined condition for terminating the cooperative braking control is satisfied, the braking system is switched from the first operating state to the second operating state.

The braking system is switched from the first operating state to the second operating state when a first switching condition is satisfied, and from the second operating state to the first operating state when a second switching condition is satisfied. The second switching condition is satisfied when one of the initiating conditions for initiating the anti-lock braking pressure control and the vehicle turning stability control is satisfied, or when any abnormality of the static pressurizing system is detected. The first switching condition is satisfied when one of the terminating conditions for terminating the anti-lock braking pressure control and the vehicle turning stability control is satisfied, or when an abnormality of the dynamic pressurizing system is detected. Further, the second switching condition is satisfied when the ON state of the manually operable member to effect the braking effect control is detected by the operating-state detecting device 228, and the first switching condition is satisfied when the OFF state is detected. The first switching condition is also satisfied when the terminating condition for terminating the cooperative braking control is satisfied.

When the first switching condition is satisfied, a first switching flag is set to "1". The first switching flag is reset to "0" when the braking system has been switched from the first operating state to the second operating state. Similarly, a second switching flag is set to "1" when the second switching condition is satisfied, and is reset to "0" when the braking system has been switched from the second operating state to the first operating state.

As described above, the braking system is switched between the first and second operating states. A switching of the operating state will cause a change in the operating state of the brake pedal 10, and a consequent change in the fluid pressure in the wheel brake cylinders 20, 28. The present braking pressure control apparatus is adapted to effect operations for reducing these changes upon switching of the braking system between the first and second operating states. These operations will be described.

Initially, the operation upon switching from the first operating state to the second operating state will be described.

In the present embodiment, the wheel brake cylinders 20 for the front wheels 16 are connected to the pressurizing chamber 86, while the wheel brake cylinders 28 for the rear wheels 24 are connected to the booster chamber 98, as described above. In this arrangement, the fluid pressure in the wheel brake cylinders 28 for the rear wheels 24 has a higher degree of response to a change in the pressure of the fluid pressurized by the second hydraulic pressure source 14, than that in the wheel brake cylinders 20 for the front wheels 16. Namely, the fluid pressure in the wheel brake cylinders 28 for the rear wheels 24 is increased immediately after the master-cylinder shut-off valve 162 has been switched from the closed state to the open state. That is, the fluid pressure in the wheel brake cylinders 28 is relatively rapidly increased to the level of the fluid pressure in the booster chamber 98. In this respect, it is noted that the booster chamber 98 is supplied with the pressurized fluid which is delivered from the accumulator 134 and whose pressure is controlled by the pressure regulating portion 88 of the hydraulic booster 78. This arrangement permits a relatively higher rate of flow of the pressurized fluid from the booster chamber 98 to the wheel brake cylinders 28. On the other hand, the wheel brake cylinders 20 for the front wheels 16 are supplied with the fluid which is pressurized in the pressurizing chamber 86 as a result of the advancing movement of the pressurizing piston 84, so that the fluid pressure in the wheel brake cylinders 20 has a lower degree of response to a change of the pressure of the second hydraulic pressure source 14, than that in the wheel brake cylinders 28, and the fluid pressure in the wheel brake cylinders 20 is raised at a comparatively low rate.

Figure 4A:
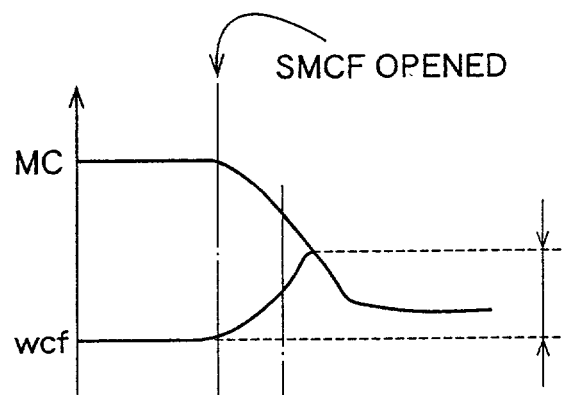
FIGS. 4A, 4B, 4C and 4D are graphs indicating changes in fluid pressures in front and rear wheel brake cylinders when the fluid pressures are controlled by the braking pressure control apparatus.
Figure 4B:
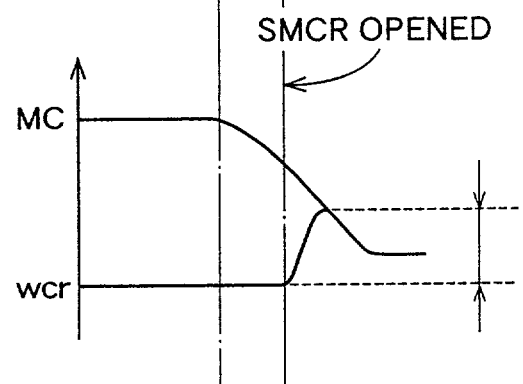
Figure 4C:
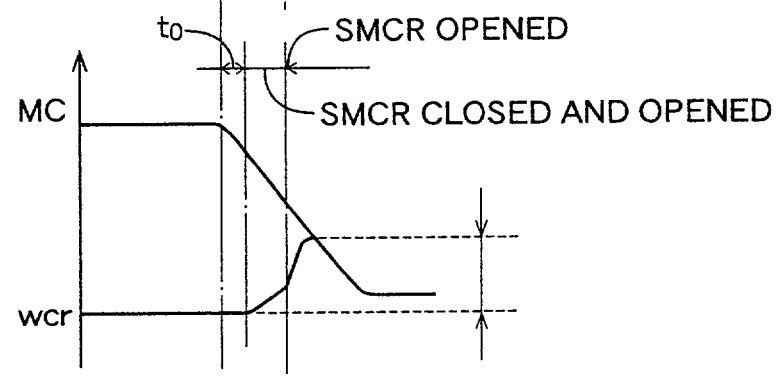
Figure 4D:
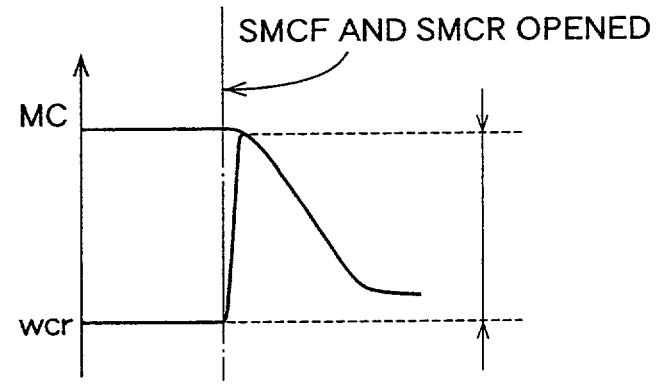

The fluid pressure in the wheel brake cylinders 28 for the rear wheels 24 is rapidly increased immediately after the master-cylinder shut-off valve 162 (SMCR) is commanded to be opened, as indicated in FIG. 4D, but the fluid pressure in the wheel brake cylinders 20 for the front wheels 16 is slowly increased during the opening action of the master-cylinder shut-off valve 152 (SMCF), as indicated in FIG. 4A. As a result, there arises a difference between the fluid pressure in the wheel brake cylinders 20 and the fluid pressure in the wheel brake cylinders 28, when the braking system is switched from the first operating state to the second operating state. This pressure difference is not desirable. In view of this drawback, the present braking pressure control apparatus is arranged to initiate the opening action of the master-cylinder shut-off valve 152 (SMCF) prior to the opening action of the master-cylinder shut-off valve 162 (SMCR), as indicated in FIGS. 4A–4C, so that the master-cylinder shut-off valve 162 has been brought to the fully open state when a pressure difference between the fluid pressure in the booster chamber 98 and the fluid pressure in the wheel brake cylinders 24 has been considerably reduced. This arrangement permits a reduced difference between the fluid pressure in the wheel brake cylinders 28 and the pressure of the fluid pressurized by the second hydraulic pressure source 14.

Figure 3:
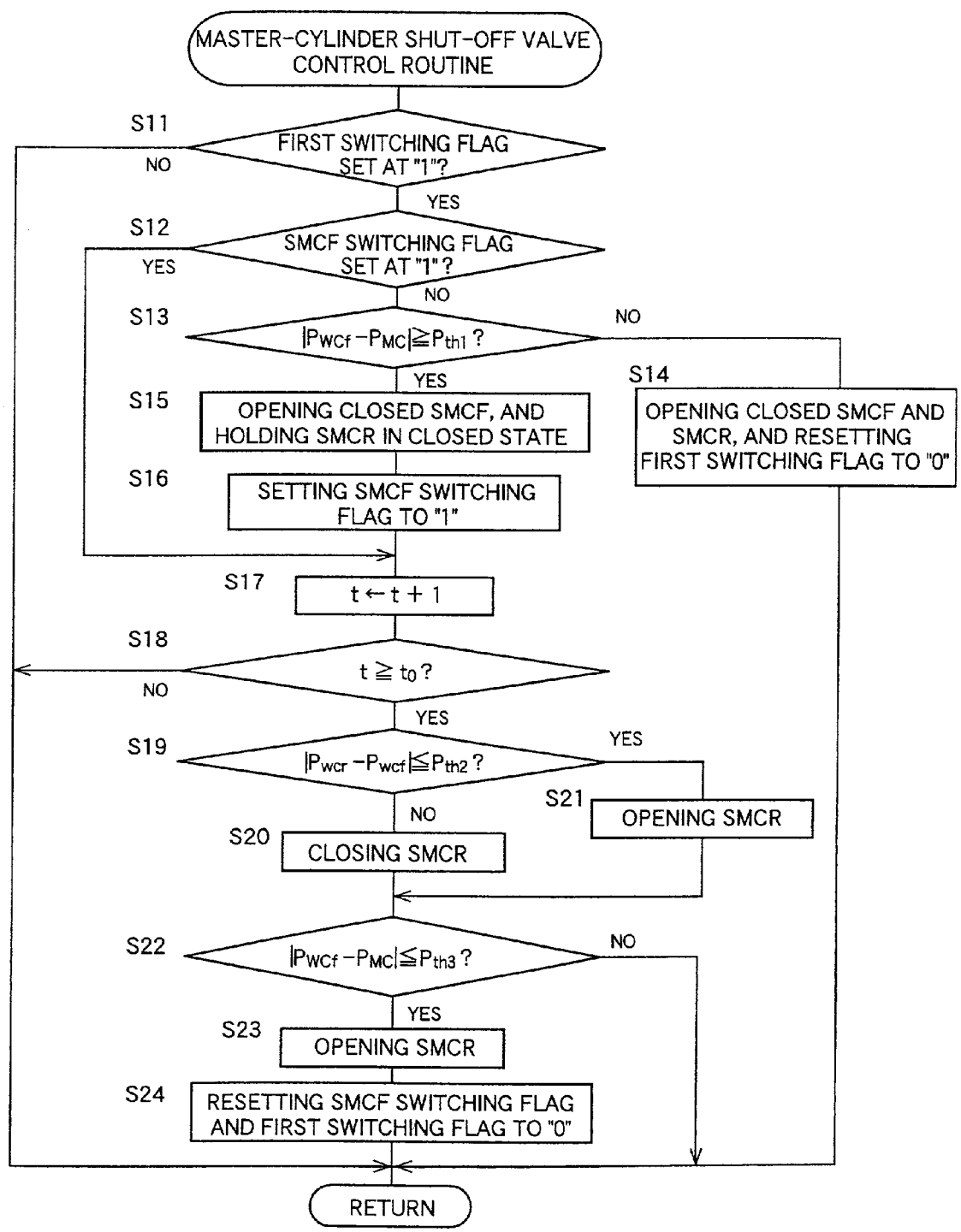
FIG. 3 is a flow chart illustrating a control routine executed according to a control program stored in a ROM of the braking pressure control apparatus, for controlling front and rear master-cylinder shut-off valves.

The opening actions of the master-cylinder shut-off valves 152, 162 are controlled according to a master-cylinder shut-off valve control routine illustrated in the flow chart of FIG. 3. This control routine is repeatedly executed while the braking system is placed in the first operating state. The routine is initiated with step S11 to determine whether the first switch flag is set at "1". As described above, this first switching flag is set to "1" when the first switching condition is satisfied, and is held at "1" until the braking system has been switched from the first operating state to the second operating state. That is, the first switching flag is set at "1" before the second operating state has been established. If the first switching flag is set at "1", an affirmative decision (YES) is obtained in step S11, and the control flow goes to step S12 to determine whether an SMCF switching flag is set at "1". This SMCF switching flag is set to "1" when the master-cylinder shut-off valve 152 (SMCF) corresponding to the front wheels 16 has been commanded to be opened, and is reset to "0" when the braking system has been switched to the second operating state. When step S12 is implemented for the first time, the SMCF switching flag is set at "0", that is, a negative decision (NO) is obtained in step S12, and the control flow goes to step S13 to determine whether the absolute value of a difference between the fluid pressure $P_{WCf}$ in the front wheel brake cylinders 20 and the fluid pressure $P_{MC}$ in the pressurizing chamber 86 is equal to or higher than a predetermined threshold $P_{th1}$. When a negative decision (NO) is obtained in step S13, the control flow goes to step S14 in which the master-cylinder shut-off valves 152, 163 corresponding to the front and rear wheels 16, 24 are switched from the closed state to the open state, and the first switching flag is reset to "0", so that the switching to the second operating state is completed. When the absolute value of the pressure difference of the wheel brake cylinders 20 and the second hydraulic pressure source 14 is considerably small, no problem will arise even if the two master-cylinder shut-off valves 152, 162 are simultaneously opened. In step S14, the simulator shut-off valve 158 is closed, and the front and rear communicating valves 154, 164 are opened.

When the absolute value of the pressure difference indicated above is equal to or larger than the threshold value $P_{th1}$, an affirmative decision (YES) is obtained in step S15 in which only the master-cylinder shut-off valve 152 corresponding to the front wheel brake cylinders 20 is commanded to be opened, while the master-cylinder shut-off valve 162 corresponding to the rear wheel brake cylinders 28 is held in the closed state. In step S15, the simulator shut-off valve 158 is commanded to be closed. Step S15 is followed by step S16 to set the SMCF switching flag to "1".

Then, the control flow goes to step S17 to increment a time counter, for measuring a time "t" after the moment at which the master-cylinder shut-off valve 152 has been commanded to be opened. Then, step S18 is implemented to determine whether the time "t" has been increased to or exceeded a predetermined time $t_0$. If a negative decision (NO) is obtained in step S18, the control flow goes back to step S11 to initiate the next cycle of control. Since the SMCF switching flag is now set at "1", steps S11, S12, S17 and S18 are repeatedly implemented, and the master-cylinder shut-off valve 152 is held in the open state.

When the predetermined time to has passed, an affirmative decision (YES) is obtained in step S18, the control flow goes to steps S19–S21 in which the master-cylinder shut-off valve 162 (SMCR) is opened if the absolute value of the above-indicated pressure difference ($P_{WCf}-P_{MC}$) is larger than a predetermined threshold $P_{th2}$, and is closed if the absolute value is equal to or smaller than the threshold $P_{th2}$. As a result, the rate of increase in the fluid pressure in the wheel brake cylinders 28 for the rear wheels 24 is restricted to reduce the pressure difference of the front and rear wheel brake cylinders 20, 28.

Steps S20 and S21 are followed by step S22 to determine whether the absolute value of the above-indicated pressure difference ($P_{WCf}-P_{MC}$) is equal to or smaller than a predetermined threshold $P_{th3}$. When the absolute value is larger than the threshold $P_{th3}$, the control flow goes back to step S11, and repeatedly implement steps S11, S12 and S17–S21. When the absolute value is equal to or smaller than the threshold $P_{th3}$, the control flow goes to step S23 to open the master-cylinder shut-off valve 162. Thus, the switching of the braking system from the first operating state to the second operating state is completed. Step S23 is followed by step S24 to reset the SMCF switch flag and the first switching flag to "0", and reset the timer counter.

By controlling the opening actions of the master-cylinder shut-off valves 152, 162 according to the control routine of FIG. 3, the fluid pressure $P_{WCr}$ in the wheel brake cylinders 28 for the rear wheels 24 changes as indicated in FIG. 4C. Where the master-cylinder shut-off valve 162 is controlled as indicated in FIG. 4C, the difference between the fluid pressure $P_{WCr}$ in the wheel brake cylinders 28 and the fluid pressure $P_{MC}$ of the second hydraulic pressure source 14 when the shut-off valve 162 is opened is significantly smaller than where the master-cylinder shut-off valve 162 is opened simultaneously with the master-cylinder shut-off valve 152 as indicated in FIG. 4D. Accordingly, the amount of increase of the fluid pressure $P_{WCr}$ is reduced. Further, the difference between the fluid pressures $P_{WCf}$ and $P_{WCr}$ in the front and rear wheel brake cylinders 20, 28 is smaller in the case of FIGS. 4A and 4C, than in the case of FIGS. 4A and 4D. In the examples of FIGS. 4A–4D, the operating force of the brake pedal 10 is reduced after the braking system has been switched to the second operating state response.

As described above, the present braking pressure control apparatus included in the braking system is arranged to delay the opening action of the master-cylinder shut-off valve 162, upon switching of the braking system from the first operating state to the second operating state, so that the pressure difference between the wheel brake cylinders 28 for the rear wheels 24 and the second hydraulic pressure source 14 can be reduced. Accordingly, the rate of change of the fluid pressure in the wheel brake cylinders 28 can be restricted, and the pressure difference between the front and rear wheel brake cylinders 20, 28 can be reduced. This arrangement is effective to reduce the deterioration of the vehicle braking stability upon switching of the operating state of the braking system. Since the master-cylinder shut-off valve 162 is closed and opened in steps S19–S21, the rate of increase of the fluid pressure in the wheel brake cylinders 28 can be restricted. In the present embodiment, the master-cylinder shut-off valve 162 is closed and opened in steps S19–S21 (as indicated in FIG. 4C) after the predetermined time to has passed after the moment at which the master-cylinder shut-off valve 152 has been commanded to be opened. However, the master-cylinder shut-off valve 162 may be simply opened after the predetermined time has passed. In this case, the fluid pressure in the wheel brake cylinders 28 changes as indicated in FIG. 4B. In this case of FIG. 4B, the pressure difference between the wheel brake cylinders 28 and the second hydraulic pressure source 14 can be made smaller than in the case of FIG. 4D.

In the embodiment of FIG. 3, steps S19–S21 are implemented only after the predetermined time t0 has passed after the moment at which the master-cylinder shut-off valve 152 corresponding to the front wheel brake cylinders 20 has been commanded to be opened. However, this arrangement is not essential, and steps S19–21 are implemented immediately after the shut-off valve 152 has been opened. This modification has a similar advantage. In steps S13, S19 and S22, the fluid pressure $P_{MC}$ in the pressurizing chamber 86 (the pressure as detected by the master-cylinder pressure sensor 210) is used as the pressure of the second hydraulic pressure source 14, while the fluid pressure $P_{WCf}$ in the front wheel brake cylinders 20 (the pressure as detected by one of the two front wheel brake cylinder pressure sensors 212, 214 or as represented by an average of the outputs of these two pressure sensors) is used as the fluid pressure of the wheel brake cylinders 20, 28. However, the fluid pressure in the booster chamber 98 and the fluid pressure $P_{WCr}$ in the rear wheel brake cylinders 28 may be used in step S19, and the fluid pressure as represented by an average of the outputs of the two master-cylinder pressure sensors 210, 211 and the fluid pressure as represented by an average of the outputs of the four wheel brake cylinder pressure sensors 212, 214, 216 and 218 may be used in step S13. Further, the fluid pressure $P_{WCr}$ in the rear wheel brake cylinders 28 and the fluid pressure in the booster chamber 98 may be used in step S22. Thus, the difference between the fluid pressure of the second hydraulic pressure source 14 and the wheel brake cylinder pressure may be suitably obtained on the basis of the outputs of the various pressure sensors.

In the present embodiment, the simulator shut-off valve 158 (SCSS) is closed at the time when the master-cylinder shut-off valve 152 is opened. However, the shut-off valves 158 and 152 may be closed and opened, respectively, at different times.

For instance, the master-cylinder shut-off valve 152 is first opened, and the simulator shut-off valve 158 is then closed, according to a second embodiment of this invention. In this embodiment wherein the simulator shut-off valve 158 is held open for a given time even after the shut-off valve 152 has been operated, it is possible to reduce the amounts of fluid flows to and from the pressurizing chamber 86 upon switching of the operating state of the braking system from the first operating state to the second operating state. Described more specifically, the fluid flow into the stroke simulator 156 through the open shut-off valve 158 results in a reduction of the amount of flow of the fluid into the pressurizing chamber 86, while the fluid flow from the stroke simulator 156 into the wheel brake cylinders 20 through the shut-off valve 158 results in a reduction of the amount of flow of the fluid from the pressurizing chamber 86. In this case, therefore, the stroke simulator 156 is utilized as an reservoir and an accumulator.

Figure 5:
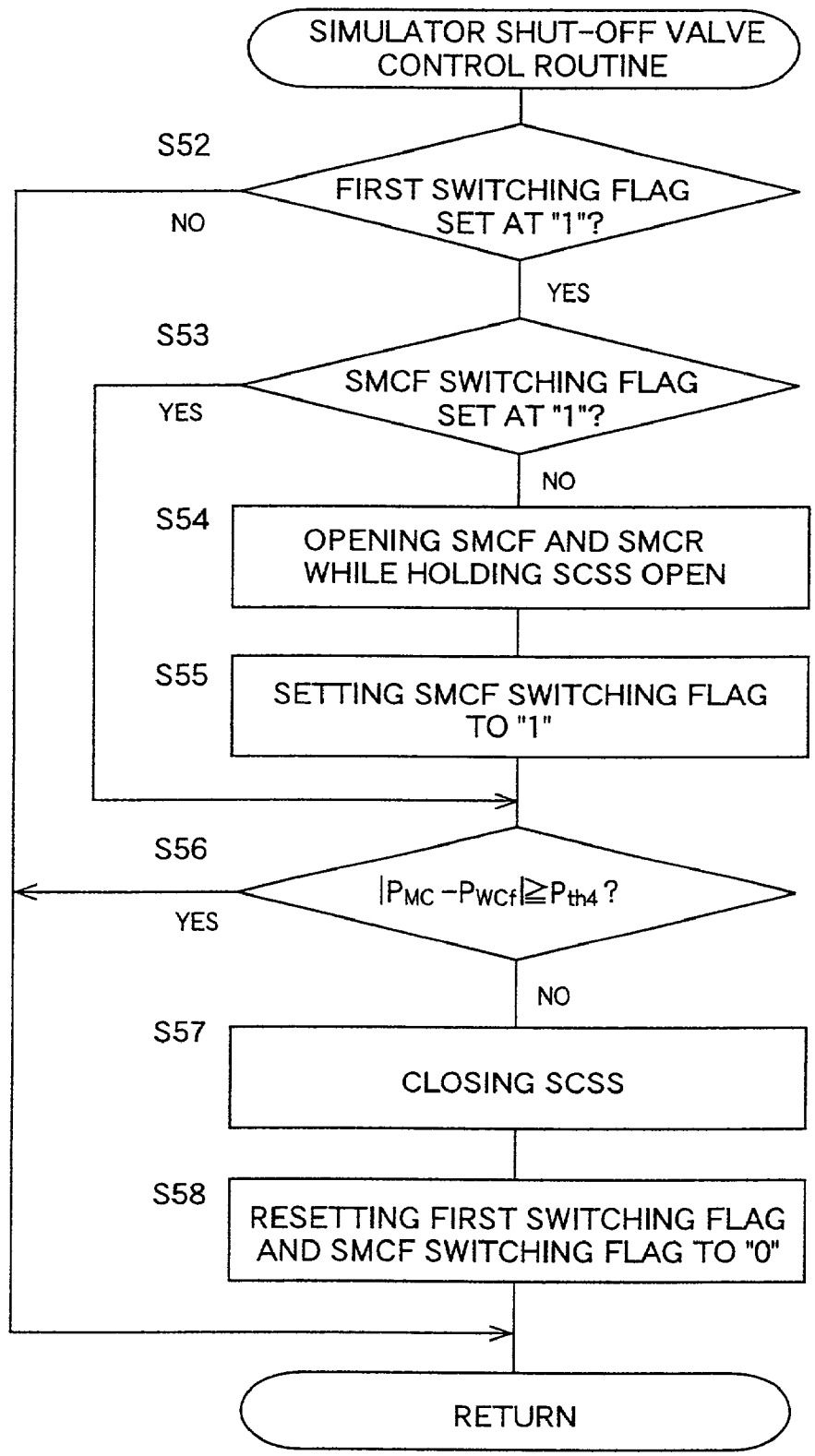
FIG. 5 is a flow chart illustrating a control routine executed according to a control program stored in the ROM of a braking pressure control apparatus according to a second embodiment of this invention, for controlling a simulator shut-off valve of a stroke simulator.

In the second embodiment indicated above, the simulator shut-off valve 158 as well as the master-cylinder shut-off valves 152, 162 is controlled according to a simulator shut-off valve control routine illustrated in the flow chart of FIG. 5. This control routine is also repeatedly executed while the braking system is placed in the first operating state. The control routine is initiated with step S52 to determine whether the first switching flag is set at "1". When an affirmative decision (YES) is obtained in step S52, the control flow goes to step S53 to determine whether the SMCF switching flag is set at "1". When the first switching condition is satisfied but the switching to the second operating state is not completed, and when the SMCF switching flag is not set at "1", the control flow goes to step S54 to open the master-cylinder shut-off valves 152, 162 while holding the simulator shut-off valve 158 in the open state. Step S54 is followed by step S55 to set the SMCF switching flag to "1", and step S56 to determine whether the absolute value of the difference between the fluid pressure of the second hydraulic pressure source 14 and the fluid pressure in the rear wheel brake cylinders 28 is equal to or higher than a predetermined threshold $P_{th4}$. If an affirmative decision (YES) is obtained in step S56, the control flow goes back to step S52, and repeatedly implement steps S52–S56 until a negative decision (NO) is obtained in step S56, that is, the absolute value of the above indicated pressure difference is smaller than the threshold Pth4. When the negative decision is obtained in step S56, the control flow goes to step S57 to close the simulator shut-off valve 158, and then to step S58 to reset the first switching flag and the SMC switching flag. Thus, the braking system has been switched to the second operating state.

There will be described the switching of the master-cylinder shut-off valve 152 to the open state while the fluid pressure in the pressurizing chamber 86 is higher than that in the wheel brake cylinders 20 for the front wheels 16. In this case, the pressurized fluid is delivered to the wheel brake cylinders 20 from not only the pressurizing chamber 86 but also the stroke simulator 156, as shown in FIG. 6. The fluid pressure in the fluid passage 150 is lower than the fluid pressure in the stroke simulator 156 when the master-cylinder shut-off valve 152 is open. That is, the fluid pressure in the stroke simulator 156 which is equal to that in the pressurizing chamber 86 is higher than that in the fluid passage 150. Accordingly, the pressurized fluid is delivered from the stroke simulator 156 to the wheel brake cylinders 20 through the fluid passage 150. Since the wheel brake cylinders 20 is supplied with the pressurized fluid delivered from the stroke simulator 156, the amount of the pressurized fluid that is delivered from the pressurizing chamber 86 to the wheel brake cylinders 20 is accordingly reduced, so that the fluid flow into the wheel brake cylinders 20 has a reduced influence on the operating state of the brake pedal 10. In the present embodiment wherein the stroke simulator 156 assists the master cylinder 80, the amount of increase of the operating stroke of the brake pedal 10 (so-called "brake pedal sink" which is an ineffective portion of the overall brake operating stroke) and the amount of change of the reaction force acting on the brake pedal 10 are made significantly smaller than in the prior art arrangement, as shown in FIG. 6. In the example of FIG. 6, the operating force applied to the brake pedal 10 by the vehicle operator is held constant.

Figure 7:
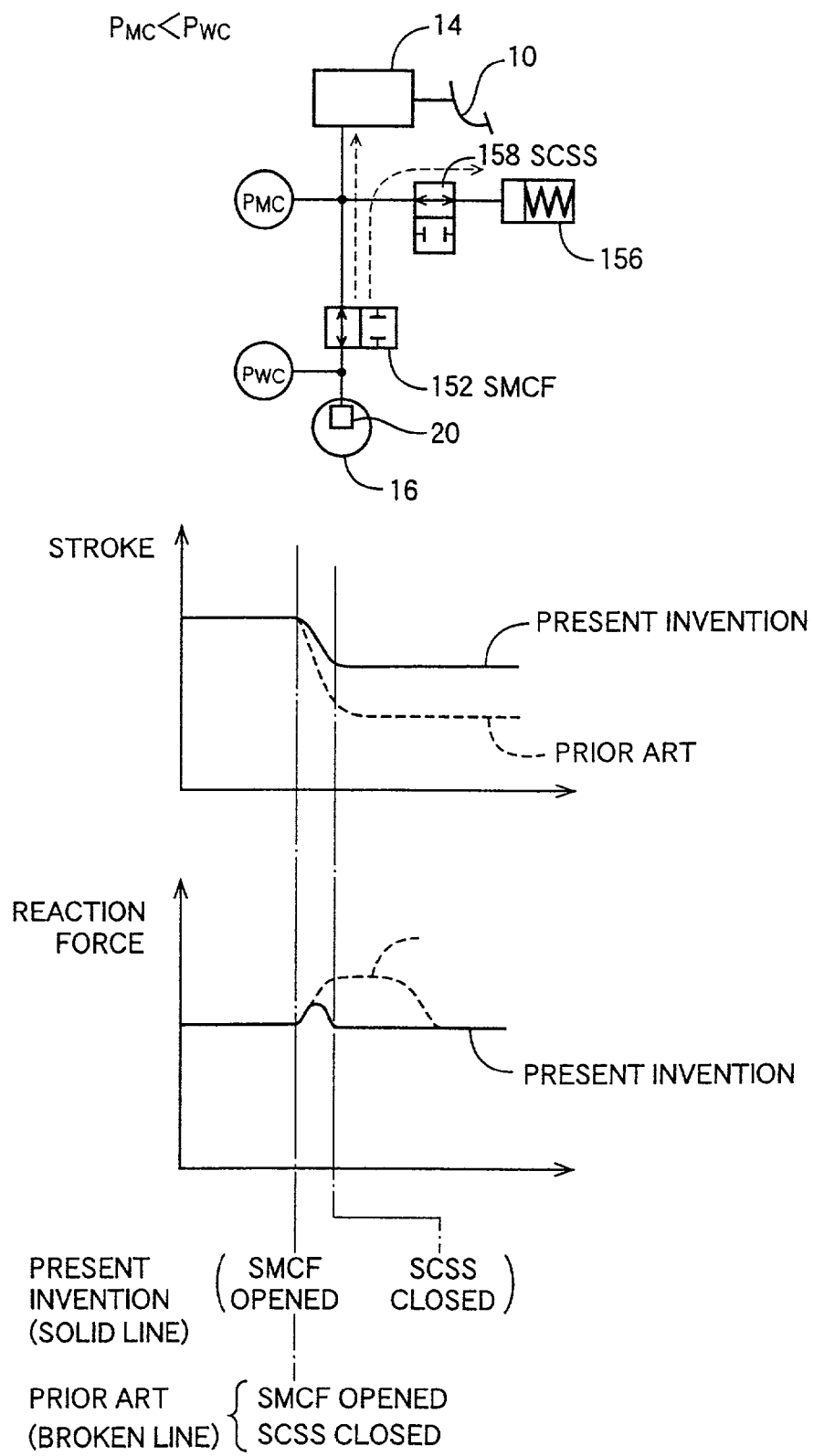
FIG. 7 is a view indicating fluid flows from the wheel brake cylinder toward the master cylinder and stroke simulator when the simulator shut-off valve is controlled by the braking pressure control apparatus while the wheel brake cylinder pressure is higher than the master cylinder pressure.

Referring next to FIG. 7, there will be described the switching of the master-cylinder shut-off valve 152 to the open state while the fluid pressure in the front wheel brake cylinders 20 is higher than that in the pressurizing chamber 86. In this case, the pressurized fluid is discharged from the wheel brake cylinders 20 to the pressurizing chamber 86 and the stroke simulator 156. Since the fluid pressure in the fluid passage 150 is higher than that in the stroke simulator 156, the pressurized fluid is delivered from the wheel brake cylinders 20 to the stroke simulator 156 through the fluid passage 150. Accordingly, the amount of the fluid flow into the pressurizing chamber 86 is made smaller while the simulator shut-off valve 158 is open, than when the shut-off valve 158 is closed. In the present arrangement, the amount of decrease of the operating stroke of the brake pedal 10 (so-called "brake pedal kick-back") and the amount of change of the reaction force are made significantly smaller than in the prior art, as indicated in FIG. 7.

As described above, the second embodiment of FIG. 5 is adapted to reduce a change of the operating state of the brake pedal 10, which would take place unexpectedly to the vehicle operator, upon switching of the braking system from the first operating state to the second operating state, which switching is automatically effected when the cooperative braking control is replaced by the normal braking control, for instance, Although the fluid pressure in the pressurizing chamber 86 and the fluid pressure in the front wheel brake cylinders 20 are used in step S56, the other fluid pressures may be used in step S56 to determine the moment at which the simulator shut-off valve 158 is closed.

In the second embodiment described above, the simulator shut-off valve 158 is kept in the open state until the difference between the pressure of the second hydraulic pressure source 14 and the wheel brake cylinder pressure becomes smaller than the threshold $P_{th4}$. However, this arrangement is not essential. For instance, the simulator shut-off valve 158 may be kept open for a predetermined length of time after the shut-off valves 152, 162 have been opened. Further, the simulator shut-off valve 158 may be held open even while the difference between the pressure of the second hydraulic pressure source 14 and the wheel brake cylinder pressure is larger than a predetermined threshold.

In the first and second embodiments of FIGS. 3 and 5, the simulator shut-off 158 and the master-cylinder shut-off valve 152 are switched from the closed state to the open state, these shut-off valves 158, 152 may be alternately opened and closed at a controlled duty ratio or cycle.

Figure 8:
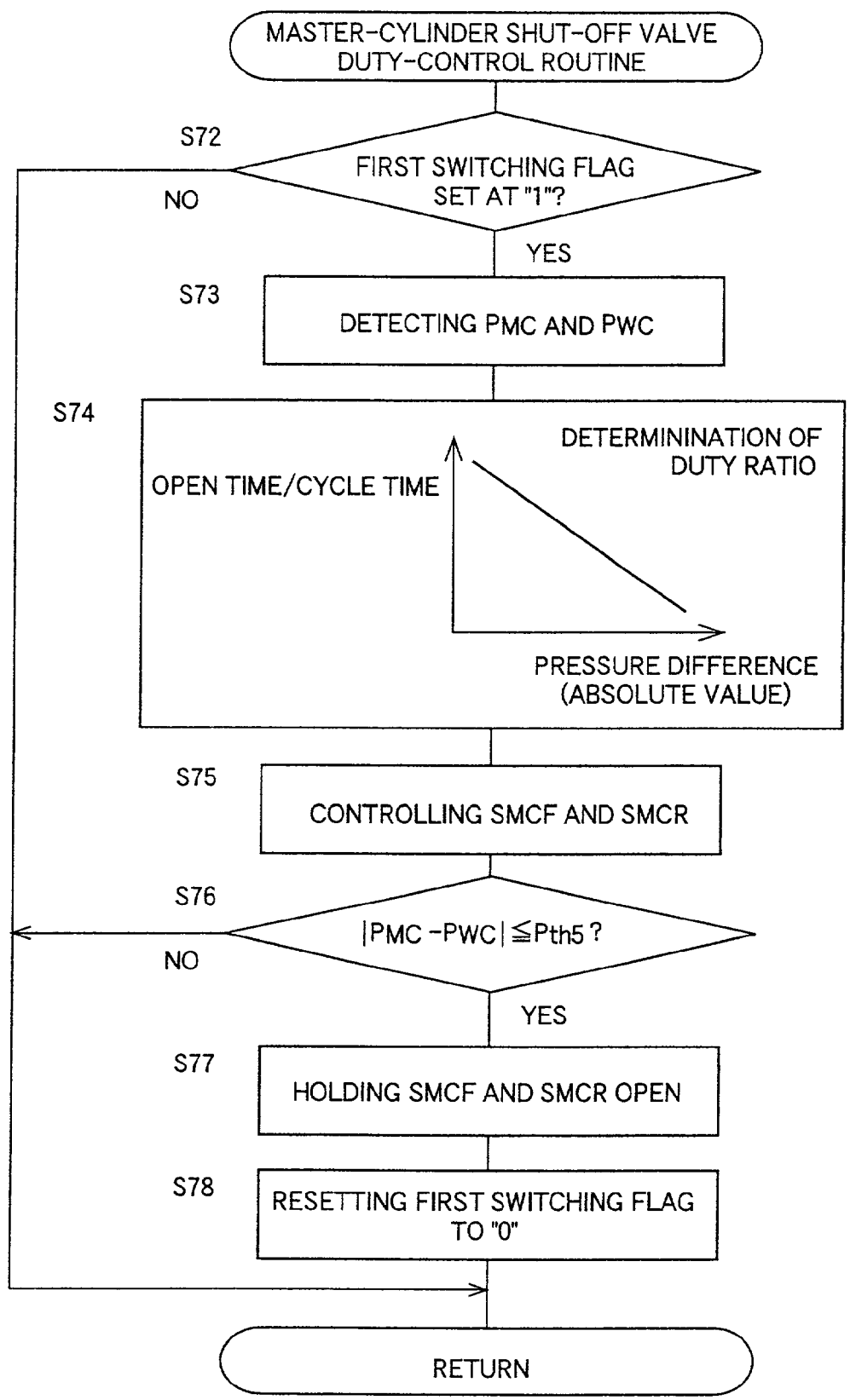
FIG. 8 is a flow chart illustrating a control routine executed according to a control program stored in the ROM according to a third embodiment of this invention, for controlling the master-cylinder shut-off valves.

For instance, the master-cylinder shut-off valves 152, 1162 are controlled according to a duty-control routine illustrated in the flow chart of FIG. 8 according to a third embodiment of this invention.

The master-cylinder shut-off valve duty-control routine of FIG. 8 is initiated with step S72 to determine whether the first switching flag is set at "1". As in the preceding embodiments, the affirmative decision (YES) is obtained in step S72, when the first switching condition is satisfied but before the switching to the second operating state is not completed. In this case, the control flow goes to step S72 to detect the master cylinder pressure $P_{MC}$ (pressure in the pressurizing chamber 86) and the wheel brake cylinder pressure $P_{WC}$. Step S73 is followed by step S74 in which the duty ratio of the shut-off valves 152, 162 is determined on the basis of the absolute value of a difference between the master cylinder pressure $P_{MC}$ and the wheel brake cylinder pressure $P_{WC}$, and according to a predetermined relationship between the absolute value of the pressure difference and the duty ratio. A data table representing this relationship is stored in the ROM 244 of the brake control unit 32. The relationship is formulated such that the duty ratio decreases with an increase in the absolute value of the above-indicated pressure difference. Step S74 is followed by step S75 in which the master-cylinder shut-off valves 152, 162 are alternately closed and opened at the determined duty ratio. Then, the control flow goes to step S76 to determine whether the absolute value of the above-indicated pressure difference is equal to or smaller than a predetermined threshold $P_{th5}$. If an affirmative decision (YES) is obtained in step S76, the control flow goes to step S77 to hold the shut-off valves 152, 162 in the open state, and step S78 to reset the first switching flag to "0".

In the present third embodiment wherein the duty ratio or cycle of each master-cylinder shut-off valve 152, 162 is controlled as described above, the rate of change of the wheel brake cylinder pressure can be made lower than in the case where the shut-off valve 152, 162 is opened immediately after the first switching condition is satisfied. Further, the difference between the master cylinder pressure and the wheel brake cylinder pressure upon opening of the master-cylinder shut-off valves 152, 162 can reduced. It is further noted that the duty ratio of the shut-off valves 152, 162 is determined depending upon the above-indicated pressure difference, the wheel brake cylinder pressure can be increased at a substantially constant rate, irrespective of a change in the pressure difference.

However, the determination of the duty ratio on the basis of the pressure difference between the master cylinder 80 and the wheel brake cylinders 20, 28 is not essential. For instance, the duty ratio may be determined on the basis of the time which has passed after the moment at which the first switching condition for switching the braking system from the first operating state to the second operating state is satisfied. Where the operating force of the brake pedal 10 is held constant, the absolute value of the above-indicated pressure difference decreases with the time lapse, so that the duty ratio decreases with the time. Further, the duty ratio may be kept constant. It is also noted that both of the master-cylinder shut-off valves 152, 162 need not be controlled of their duty ratio. That is, only one of the two shut-off valves 152, 162 may be duty-controlled.

Figure 9:
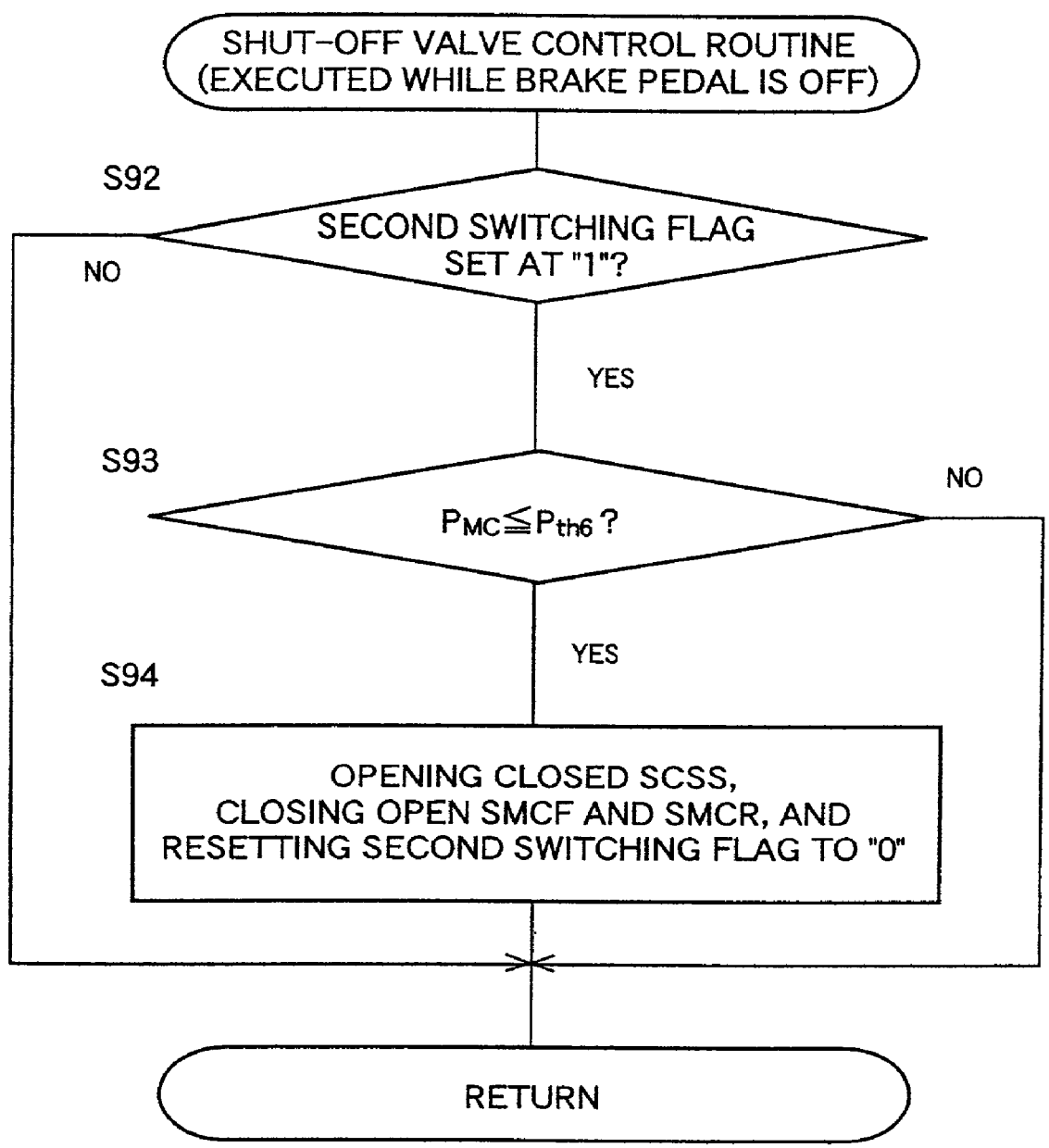
FIG. 9 is a flow chart illustrating a control routine executed according to a control program stored in the ROM of a braking pressure control apparatus according to a fourth embodiment of this invention, for controlling the simulator shut-off valve and the master-cylinder shut-off valves while a brake pedal is not in operation.

There will next be described the switching of the braking system from the second operating state to the first operating state. A braking pressure control apparatus according to a fourth embodiment of the present invention which will be described by reference to the flow chart of FIG. 9 is arranged such that when the second switching condition is satisfied, the braking system is switched from the second operating state to the first operating state while the brake pedal 10 is not in operation. Upon switching of the braking system from the second operating state to the first operating state, the simulator shut-off valve 158 is switched from the closed state to the open state. If this opening action of the simulator shut-off valve 158 were effected while the brake pedal 10 is in operation, the pressurized fluid delivered from the pressurizing chamber 86 of the master cylinder 80 would be accommodated in the stroke simulator 156, with a result of an undesirable movement of the brake pedal 10 from the non-operated position. In the present embodiment wherein the simulator shut-off valve 158 is opened while the brake pedal 10 is not in operation, such an undesirable movement of the brake pedal can be avoided.

In the fourth embodiment of this invention, the switching of the braking system from the second operating condition to the first operating condition is effected according to a shut-off valve control routine illustrated in the flow chart of FIG. 9. This fourth embodiment is compatible with any one of the first, second and third embodiments of FIGS. 3, 5 and 8 in which the master-cylinder and simulator shut-off valves 152, 162, 158 are controlled in different manners when the braking system is switched from the first operating state to the second operating state.

The control routine of FIG. 9 is initiated with step S92 to determine whether the second switching flag is set at "1". If an affirmative decision (YES) is obtained in step S92, the control flow goes to step S93 to determine whether the master cylinder pressure $P_{MC}$ is equal to or lower than a predetermined threshold $P_{th6}$. If an affirmative decision (YES) is obtained in step S93, it means that the brake pedal 10 is not in operation. In this case, the control flow goes to step S94 to open the simulator shut-off valve 158, close the master-cylinder shut-off valves 152, 162, and reset the second switching flag to "0".

Thus, the present embodiment of FIG. 9 is arranged to switch the braking system from the second operating state to the first operating state only while the brake pedal 10 is off or only after the brake pedal 10 is turned off. Accordingly, the present arrangement is preferably employed under a condition that permits a slow switching of the braking system to the first operating state.

In the present embodiment wherein the braking system is switched from the second operating state to the first operating state while the brake pedal 10 is not in operation, the vehicle operator will not feel this switching through the brake pedal 10.

A similar control may apply to the switching from the first operating state to the second operating state. That is, the braking system may be switched from the first operating state to the second operating state while the brake pedal 10 is not in operation.

Further, the switching from the second operating state to the first operating state may be effected such that the simulator shut-off valve 158 is opened only after its duty ratio is controlled for a predetermined time after the second switching condition is satisfied. The duty control of the simulator shut-off valve 158 reduces the amount of an undesirable movement of the brake pedal 10 from its non-operated position due to a flow of the pressurized fluid from the pressurizing chamber 86 into the stroke simulator 156 through the shut-off valve 158, so that the vehicle operator is less likely to feel this unintended movement of the brake pedal 10. The duty ratio may be kept constant, or may be changed such that the open time of the shut-off valve 158 increases with the time lapse.

Further alternatively, the simulator shut-off valve 158 may be opened and closed according to a change in the operating stroke of the brake pedal 10 after the second switching condition is satisfied, until the first switching condition for switching from the first operating state to the second operating state is subsequently satisfied. In this case, the simulator shut-off valve 158 is opened when the operating stroke of the brake pedal 10 is increased or reduced, and is held closed while the operating stroke is held constant. This arrangement is effective to reduce the overall amount of change of the operating state of the brake pedal 10 due to the switching of the braking system from the second operating state to the first operating state. The above-indicated control of the shut-off valve 158 may be effected for a predetermined time after the moment when the second switching condition is satisfied, so that the shut-off valve 158 is opened when the predetermined time has expired.

The closing action of the master-cylinder shut-off valve 152 and the opening action of the simulator shut-off valve 158 may take place at different times, as in the simulator shut-off valve control routine illustrated in the flow chart of FIG. 5. In this case, the simulator shut-off valve 158 and the master-cylinder shut-off valve 152 are both held in the open state when the second switching condition is satisfied. As a result, the pressurized fluid discharged from the wheel brake cylinders 20 is accommodated in the stroke simulator 156, so that the amount of flow of the fluid from the pressurizing chamber 86 is reduced, resulting in reducing the amount of change of the operating state of the brake pedal 10 upon switching to the first operating state. This modified arrangement is effective, particularly when the braking system is switched from the second operating state to the first operating state, for the purpose of effecting the anti-lock braking pressure control, that is, when the condition for initiating the anti-lock braking pressure control is satisfied.

There will next be described operations to control the braking system which are performed upon both the switching from the first operating state to the second operating state and the switching from the second operating state to the first operating state.

The control characteristic of the wheel brake cylinder pressure in the first operating state and that in the second operating state are different from each other. Therefore, the control characteristic changes upon switching of the braking system between the first and second operating states. According to a fifth embodiment of this invention, an abrupt or sudden change in the control characteristic upon switching of the operating state is avoided according to a control-characteristic gradually changing routine illustrated in the flow chart of FIG. 10. This routine is repeatedly executed during an operation of the braking system.

Upon switching of the braking system from the first operating state to the second operating state, the master-cylinder shut-off valves 152, 162 are not opened immediately after the first switching condition is satisfied, but the fluid pressure in the wheel brake cylinders 20, 28 is controlled by controlling the linear valve devices 30 such that the control characteristic is intermediate between the two different characteristics of the first and second operating states, more precisely, such that the control characteristic gradually changes from that of the first operating state toward that of the second operating state. Even when the braking system is switched from the first operating state to the second operating state due to an abnormality of the pump device 12, the wheel brake cylinder pressure can be controlled by the linear valve devices 30 as long as the pressurized fluid is stored in the accumulator 134.

Upon switching from the second operating state to the first operating state, the master-cylinder shut-off valves 152, 162 are switched to the closed state, but the wheel brake cylinder pressure is not controlled with the control characteristic of the first operating state, but is controlled with the control characteristic intermediate between those of the first and second operating states, such that the control characteristic gradually changes toward that of the first operating state.

Figure 10:
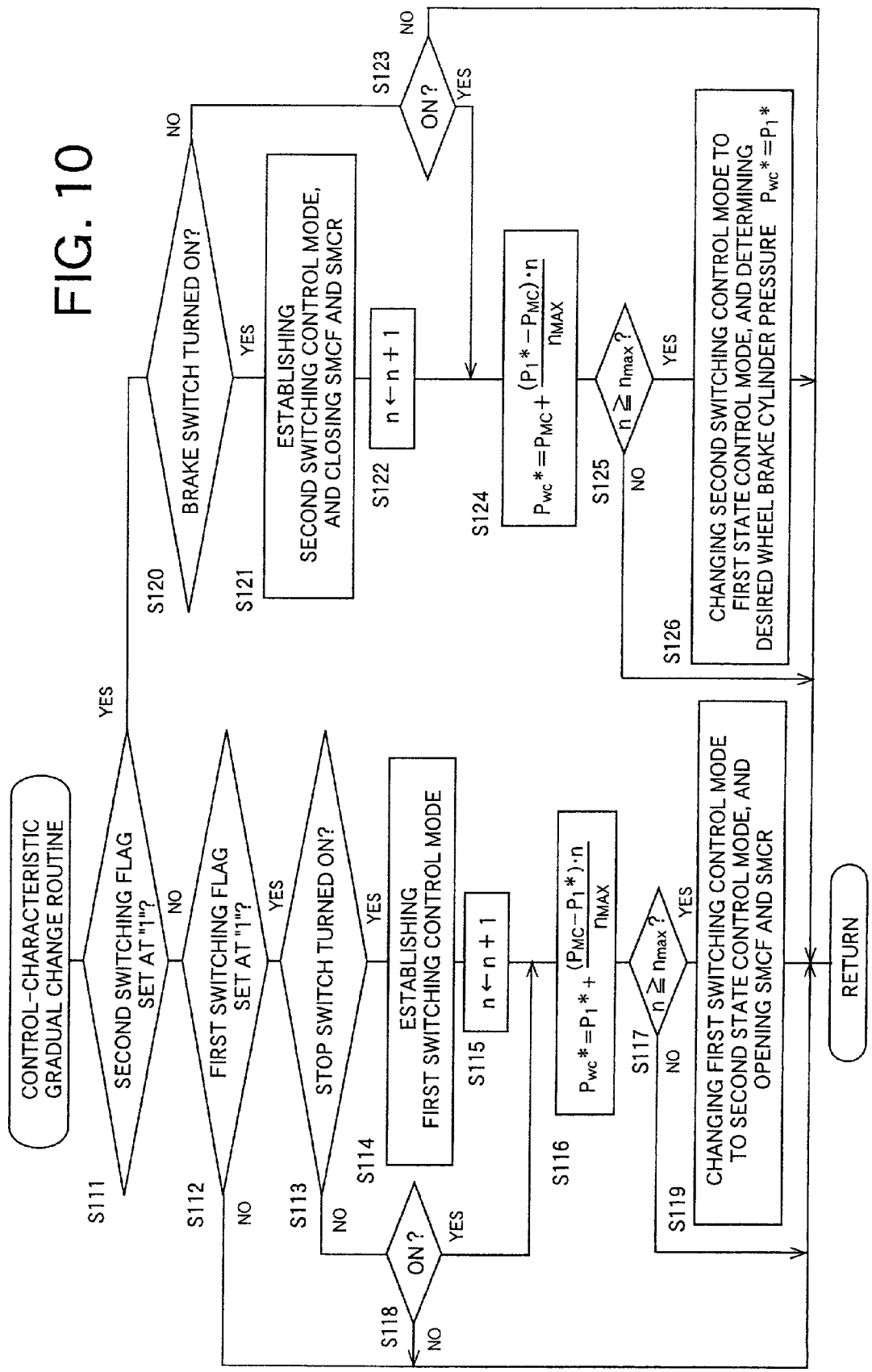
FIG. 10 is a flow chart illustrating a control routine executed according to a control program stored in the ROM according to a fifth embodiment of the invention, for avoiding an abrupt change in the control characteristic of the braking system.

The routine of FIG. 10 is initiated with step S111 to determine whether the second switching flag for switching the braking system from the second operating state to the first operating state is set at "1". If a negative decision (NO) is obtained in step S111, the control flow goes to step S112 to determine whether the first switching flag for switching from the first operating state to the second operating state is set at "1". If an affirmative decision (YES) is obtained in step S112, the control flow goes to step 113 to determine whether the brake switch or stop switch 334 has been turned on (whether the state of the switch 334 is changed from the OFF state to the ON state), that is, whether the brake pedal 10 has been operated from the non-operated position to an operated position. If an affirmative decision (YES) is obtained in step S113, the control flow goes to step S114 to establish a first switching control mode, and then to step S115 to increment the content "n" of a brake counter, Step S115 is followed by step S116 to calculate the desired wheel brake cylinder pressure $P^*_{WC}$ according to the following equation:

$$P^*_{WC}=P^*_1+n\cdot(P_{MC}-P^*_1)/n_{MAX}$$

In the above equation, "$P^*_1$" represents the desired wheel brake cylinder pressure, and "$P_{MC}$" represents the actual master cylinder pressure. The value "n" represents the content of the brake counter (See step S115), which in turn represents the number of operations of the brake pedal 10.

The linear valve devices 30 are controlled so that the actual wheel brake cylinder pressure $P_{WC}$ coincides with the calculated desired value $P^*_{WC}$. That is, the amount of electric current to be applied to the coils 188 of the linear valve devices 30 is determined according to the calculated desired value $P^*_{WC}$.

Step S116 is followed by step S117 to determine whether the number "n" of operations of the brake pedal 10 has reached a predetermined number nMAX. If a negative decision (NO) is obtained in step S117, the control flow goes back to step S111. If the stop switch 224 remains in the ON state, that is, the stop switch 224 has not been turned on, a negative decision (NO) is obtained in step S113, and an affirmative decision (YES) is obtained in step S118, so that the control flow goes to step S116 again. As long as the present operation of the brake pedal 10 is continued, namely, until the brake pedal 10 is returned to the non-operated position, the content "n" of the brake remains unchanged, so that the calculated desired wheel brake cylinder pressure remains constant, that is, the control characteristic of the wheel brake cylinder pressure remains unchanged. When the brake pedal 10 is returned to the non-operated position, a negative decision (NO) is obtained in step S118.

When the brake pedal 10 is operated for the first time after the first switching flag is set to "1", that is, after the first switching condition is satisfied, the content "n" is equal to "1", and the desired wheel brake cylinder pressure $P^*_{WC}$ is calculated according to the following equation:

$$P^*_{WC}=P^*_1+(P_{MC}-P^*_1)/n_{MAX}$$

When a second operation of the brake pedal 10 is performed after the completion of the first operation, the content "n" of the brake counter is incremented to "2", and the desired wheel brake cylinder pressure $P^*_{WC}$ is calculated according to the following equation:

$$P^*_{WC}=P^*_1+2\cdot(P_{MC}-P^*_1)/n_{MAX}$$

Thus, the desired wheel brake cylinder pressure $P^*_{WC}$ gradually changes to approach the master cylinder pressure $P_{MC}$, and the control characteristic (braking effect characteristic) approaches to the control characteristic of the second operating state.

When the number "n" of operations of the brake pedal 10 has increased to the predetermined value $n_{MAX}$, an affirmative decision (YES) is obtained in step S117, and the control flow goes to step S119 to cancel the first switching control mode and establish a second state control mode in which the master-cylinder shut-off valves 152, 162 are opened and the first switching flag is reset to "0".

When the second switching flag for switching the braking system from the second operating state to the first operating state is satisfied, a negative decision (NO) is obtained in step S111, and the control flow goes to steps S120, S121, S122, S123, S124, S125 and S126 which correspond to steps S113, S114, S115, S118, S116, S117 and S119, respectively. In step S121, that is, immediately after the second switch condition is satisfied, however, there is established a second switching control mode in which the master-cylinder shut-off valves 152, 162 are closed, and the wheel brake cylinder pressure is controlled by controlling the linear valve devices 30. In step S124, the desired wheel brake cylinder pressure P*WC is calculated according to the following equation:

$$P^*_{WC}=P^*_{MC}+n\cdot(P^*_1-P_{MC})/n_{MAX}$$

As is apparent from the above equation, the desired wheel brake cylinder pressure $P^*_{WC}$ gradually changes to approach the desired value $P^*_1$ in the first operating state.

When the number "n" of operations of the brake pedal 10 has increased to the predetermined value $n_{MAX}$, an affirmative decision (YES) is obtained in step S125, and the control flow goes to step S126 to change the second switching control mode to a first state control mode in which the desired wheel brake cylinder pressure $P^*_{WC}$ is equal to $P^*_1$.

In the present embodiment of FIG. 10, the control characteristic gradually changes with an increase in the number of operations of the brake pedal 10, so that the vehicle operator is less likely to feel a change in the control characteristic upon switching of the braking system between the first and second operating states. Since the switching proceeds relatively slowly, the present embodiment is desirably practiced under a condition that permits a slow switching of the braking system. In addition, the present embodiment requires that the linear valve devices 30 are normal.

While the fifth embodiment is arranged to gradually change the control characteristic of the wheel brake cylinder pressure with an increase in the number of operations of the brake pedal 10, this arrangement is not essential. For instance, the control characteristic may be changed even during one operation (same operation) of the brake pedal 10. Further, the control characteristic may be changed either continuously or in steps, provided an abrupt or sudden change of the control characteristic can be avoided.

While the preceding embodiments are adapted to control the braking system so as to restrict the change in the control characteristic when the first or second switching condition is satisfied, the control to restrict the change may be performed when the first or second switching condition is highly expected to be satisfied in the near future, that is, when a symptom indicating a high degree of probability that the switching condition will be satisfied in the near future is detected.

The symptom indicating a high degree of probability that the second switching condition will be satisfied in the near future is detected when any one of the following symptoms is detected: a symptom indicating that the condition for initiating the anti-lock braking pressure control is satisfied; a symptom indicting that the condition for initiating the vehicle turning stability control is satisfied: a symptom indicating the presence or occurrence of an abnormality of the static pressurizing system; and a symptom indicating that the condition for initiating the cooperative braking condition is satisfied. These symptoms are referred to as "second switching symptoms".

The symptom indicating a high degree of probability that the first switching condition will be satisfied in the near future is detected when any one of the following symptoms is detected: a symptom indicating that the condition for terminating the anti-lock braking control is satisfied; a symptom indicating that the condition for terminating the vehicle turning stability control is satisfied; a symptom indicating the presence or occurrence of an abnormality of the dynamic pressurizing system; and a symptom indicating that the condition for terminating the cooperative braking condition is satisfied. These symptoms are referred to as "first switching symptoms".

The symptom indicating the high probability that the condition for initiating the anti-lock braking pressure control is satisfied is detected when the amount of slipping or locking of any wheel of the vehicle being braked has exceeded a predetermined upper limit smaller than the upper limit used for initiating the anti-lock braking pressure control, and when the slipping or locking amount is being increased. The symptom indicating the high probability that the condition for initiating the vehicle turning stability control is satisfied is detected when the degree of turning stability of the vehicle has been lowered to a predetermined lower limit higher than the lower limit used for initiating the vehicle turning stability control, and when the degree of turning stability is being reduced. The symptom indicating the presence or occurrence of an abnormality of the static pressurizing system is detected when the fluid pressure in the booster chamber 98 is lower than a lower limit higher than the lower limit used for detecting the abnormality, and when the fluid pressure is being lowered.

The symptom indicating the high probability that the condition for terminating the anti-lock braking pressure control is satisfied, and the symptom indicating the high probability that the condition for terminating the vehicle turning stability control is satisfied, are detected in substantially the same manners as described above with respect to the symptoms indicating the high probability that the conditions for initiating the anti-lock braking pressure control and the vehicle turning stability control. The symptom indicating the presence or absence of an abnormality of the dynamic pressurizing system is detected, for instance, when the fluid pressure in the accumulator 134 is lower than a predetermined lower limit higher than the lower limit used for detecting the abnormality, and when the fluid pressure is being lowered. The symptom indicating the high probability that the condition for terminating the cooperative braking control is satisfied is detected when the operating speed of the electric motor is lower than a predetermined lower limit higher than the lower limit used for terminating the cooperative braking control, and when the operating speed is being lowered, or alternatively when the amount of electric energy that can be stored in the battery is smaller than a predetermined lower limit larger than the lower limit used for terminating the cooperative braking control, and when the amount of electric energy that can be stored is being reduced.

The detection of any one of the first and second switching symptoms indicated above is effected according to a suitable switching control program. A first switching symptom flag is set to "1" when any first switching symptom is detected, and a second switching symptom flag is set to "1" when any second switching symptom is detected. These first and second switching symptom flags are reset to "0" when the corresponding first or second switching flag described above with respect to the preceding embodiments is set to "1", or when a predetermined time has passed after the symptom flag is set to "1".

Referring to the flow chart of FIG. 11, there will be described a control routine executed by a forecasting-type change restricting device according to a sixth embodiment of the invention, for effecting the duty ratio control of the master-cylinder shut-off valves 152, 162, so as to restrict the change in the control characteristic, when the first switching symptom is detected.

Figure 11:
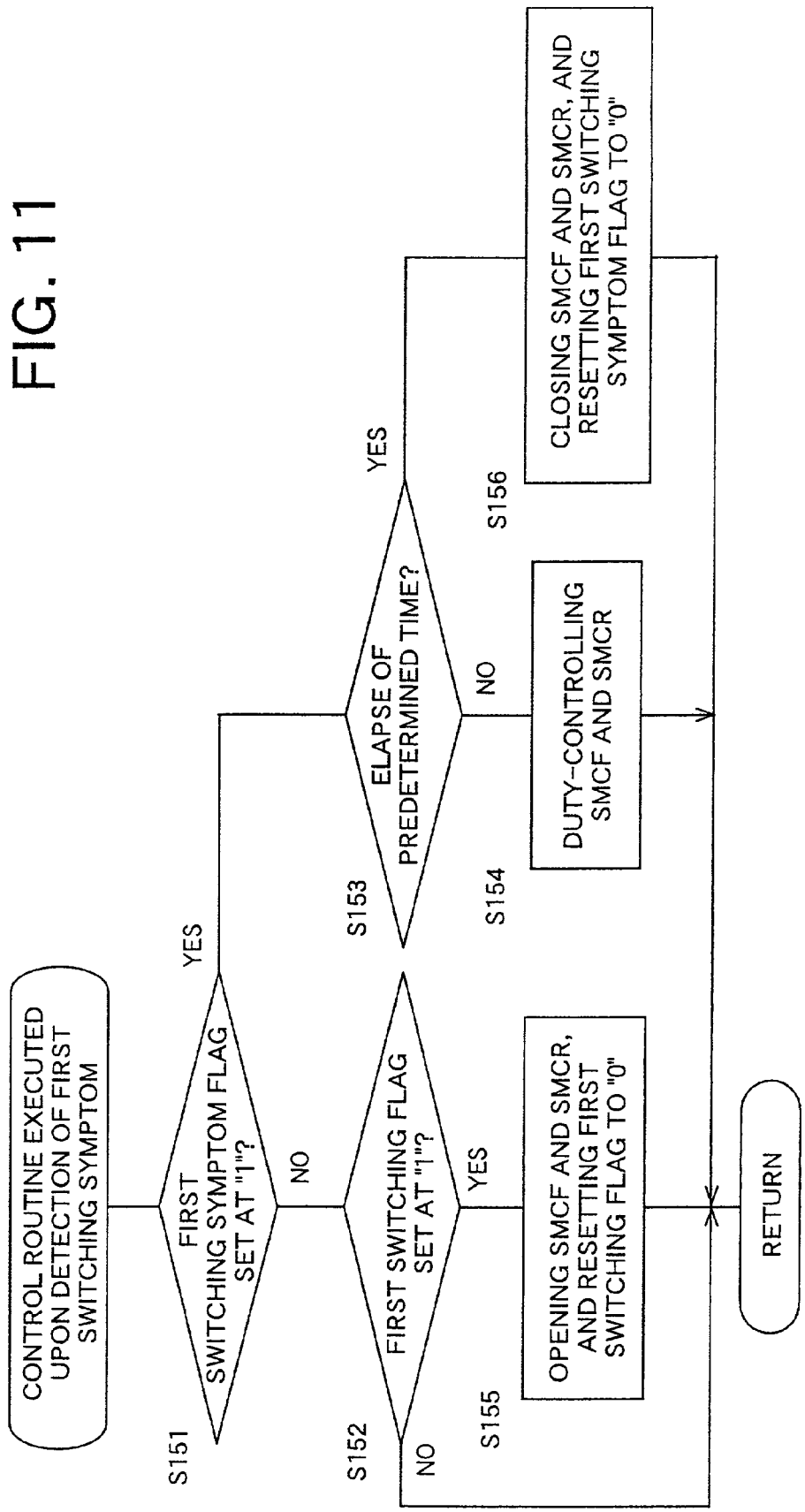
FIG. 11 is a flow chart illustrating a control routine executed according to a control program stored in the ROM according to a sixth embodiment of the invention, for controlling the master-cylinder shut-off valves upon detection of a first switching symptom indicative of high probability of switching from the first operating state to the second operating state.

The control routine of FIG. 11 is initiated with step S151 to determine whether the first switching symptom flag is set at "1". If a negative decision (NO) is obtained in step S151, the control flow goes to step S152 to determine whether the first switching flag is set at "1". If an affirmative decision (YES) is obtained in step S151, the control flow goes to step S153 to determine whether a predetermined time has passed after the first switching symptom flag has been set to "1". If a negative decision (NO) is obtained in step S153, the control flow goes to step S154 in which the duty-ratio or cycle of the master-cylinder shut-off valves 152, 162 is controlled. Thus, the duty control of these shut-off valves 152, 162 is effected for the predetermined time. If the first switching flag is set to "1" during the predetermined time, the first switching symptom flag is reset to "0", and the first switching flag is set to "1", so that the control flow goes to step S155 to open the master-cylinder shut-off valves 152, 162, reset a timer used to measure the above-indicated predetermined time, and reset the first switching flag to "0".

If the predetermined time has passed after the first switching symptom has been detected and before the first switching condition has been satisfied, an affirmative decision (YES) is obtained in step S153, and the control flow goes to step S156 to close the master-cylinder shut-off valves 152, 162, reset the first switching symptom flag to "0" and reset the above-indicated timer. Namely, the shut-off valves 152, 162 are returned to the closed state to establish the first operating state, since the first switching condition is not satisfied within the predetermined time after the first switching symptom has been detected.

As described above, the sixth embodiment is arranged to control the duty ratio of the master-cylinder shut-off valves 152, 162 for the predetermined time after detection of the first switching symptom, and then open the shut-off valves 152, 162 when the first switching condition is satisfied, so that the change in the wheel brake cylinder pressure upon switching of the braking system from the first operating state to the second operating state can be restricted, making it possible to effect a smooth transition to the second operating state.

Figure 12:
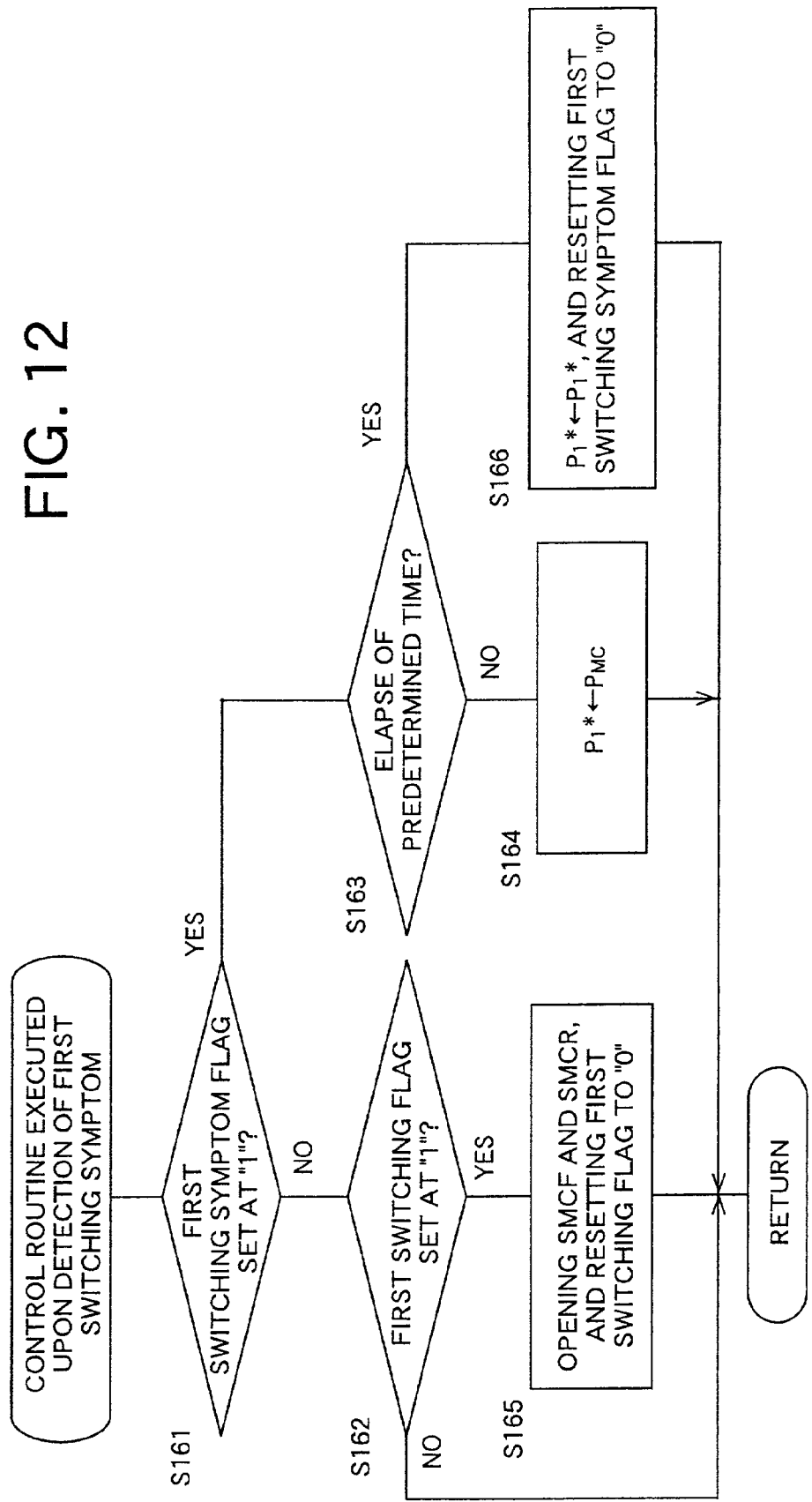
FIG. 12 is a flow chart illustrating a control routine alternative to that of FIG. 11, which is executed according to a control program stored in the ROM according to a seventh embodiment of the invention.

The control routine of FIG. 11 for duty-controlling the shut-off valves 152, 162 upon detection of the first switching symptom may be replaced by a control routine illustrated in the flow chart of FIG. 12 which is adapted to control the linear valve devices 30 with the master-cylinder shut-off valves 152, 162 held in the closed state, upon detection of the first switching symptom, such that the wheel brake cylinder pressure coincides with the master cylinder pressure.

When the first switching symptom flag is set at "1", namely, when the affirmative decision (YES) is obtained in step S161, the control flow goes to step S163 to determine whether the predetermined time has passed. If not, the control flow goes to step S164 in which the master cylinder pressure $P_{MC}$ is determined as the desired wheel brake cylinder pressure $P_1^*$, so that the actual wheel brake cylinder pressure $P_{WC}$ is controlled to the desired value $P_1^*=P_{MC}$, by controlling the linear valve devices 30, while the shut-off valves 152, 162 are held in the closed state. When the first switching condition is satisfied before the predetermined time has passed, an affirmative decision (YES) is obtained in step S162, and the control flow goes to step S165 to open the shut-off valves 152, 162. If the first switching condition is not satisfied before the predetermined time has passed, the control flow goes to step S166 to restore the braking system to the first operating state in which the desired value $P_1^*$ of the wheel brake cylinder is normally determined.

As described above, the seventh embodiment is arranged to control the linear valve devices 30 for controlling the wheel brake cylinder pressure to coincide with the master cylinder pressure, before the master-cylinder shut-off valves 152, 162 are opened to establish the second operating state. This arrangement is effective to reduce the change in the control characteristic upon switching from the first operating state to the second operating state, making it possible to permit a smooth transition to the second operating state.

The seventh embodiment is desirably practiced to switch the braking system from the first operating state to the second operating state while the linear valve devices 30 are normal.

When all of the linear valve devices 30 for the four wheels 16, 24 are not normal, with one of the four linear valve devices 30 being detected abnormal, the fluid pressures of the three wheels corresponding to the three normal linear valve devices 30 may be controlled to coincide with the master cylinder pressure, as in the seventh embodiment, with the master-cylinder shut-off valves 52, 162 held closed, before the braking system is switched to the second operating state by opening the shut-off valves 152, 162. A similar control may be effected when one of the four wheel brake cylinders 20, 28 is abnormal, and also when the first switching flag (rather than the first switching symptom flag) is set to "1".

When one of the four linear valve devices 30 is abnormal, or when one of the two liner valve devices 30 for the front wheels 16 and one of the two liner valve devices 30 for the rear wheels 24 are abnormal, the similar control may be effected after the front and rear communicating valves 154, 164 are opened. With the front communicating valve 154 held open, the fluid pressures in the wheel brake cylinders 20 for the two front wheels 16 can be controlled to the same level by controlling the normal one of the two front linear valve devices 30. With the rear communicating valve 164 held open, the fluid pressure in the wheel brake cylinders 28 for the two rear wheels 24 can be controlled to the same level by controlling the normal one of the two rear linear valve devices 30. A similar control may be effected when the first switching flag is set to "1".

While the several embodiments of the braking pressure control apparatus of this invention as applied to the braking system shown in FIG. 1 have been described above, the principle of the present invention is applicable to braking systems having other constructions.

For instance, each of the master-cylinder shut-off valves 152, 162 may incorporate an orifice for restricting the fluid flows through the fluid passage, for lowering the rate of change of the wheel brake cylinder pressure.

Figure 13:
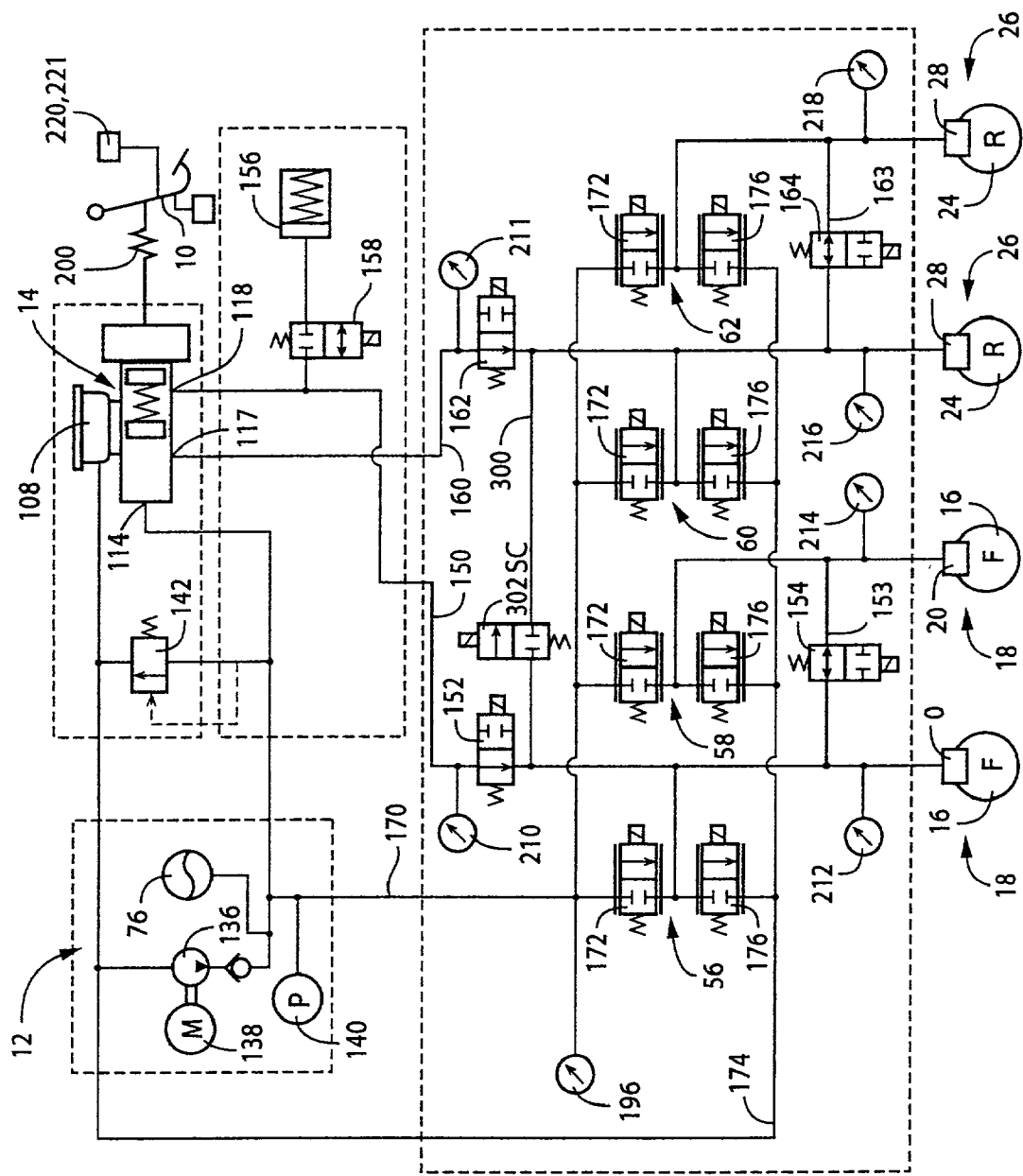
FIG. 13 is a braking system including a braking pressure control apparatus constructed according to an eighth embodiment of this invention.

Further, the principle of this invention is applicable to a braking system constructed as shown in FIG. 13. In the embodiment of FIG. 13, a connecting passage 300 is provided to connect the master reservoir 108 to a fluid passage which connects the fluid passage 160 connecting the booster chamber 88 and the rear wheel brake cylinders 28, and the fluid passage 150 connecting the pressurizing chamber 86 and the front wheel brake cylinders 20. The connecting passage 300 is connected at its one end to a portion of the fluid passage 160 between the shut-off valve 162 and the rear wheel brake cylinders 28, and at the other end to a portion of the fluid passage 150 between the shut-off valve 152 and the front wheel brake cylinders 20. A communication valve (SC) 302 is provided in the connecting passage 300. When this communication valve 302 is opened, the difference between the fluid pressures in the fluid passages 150, 160 can be reduced, for reducing the pressure difference of the front and rear wheel brake cylinders 20, 28.

Figure 14:
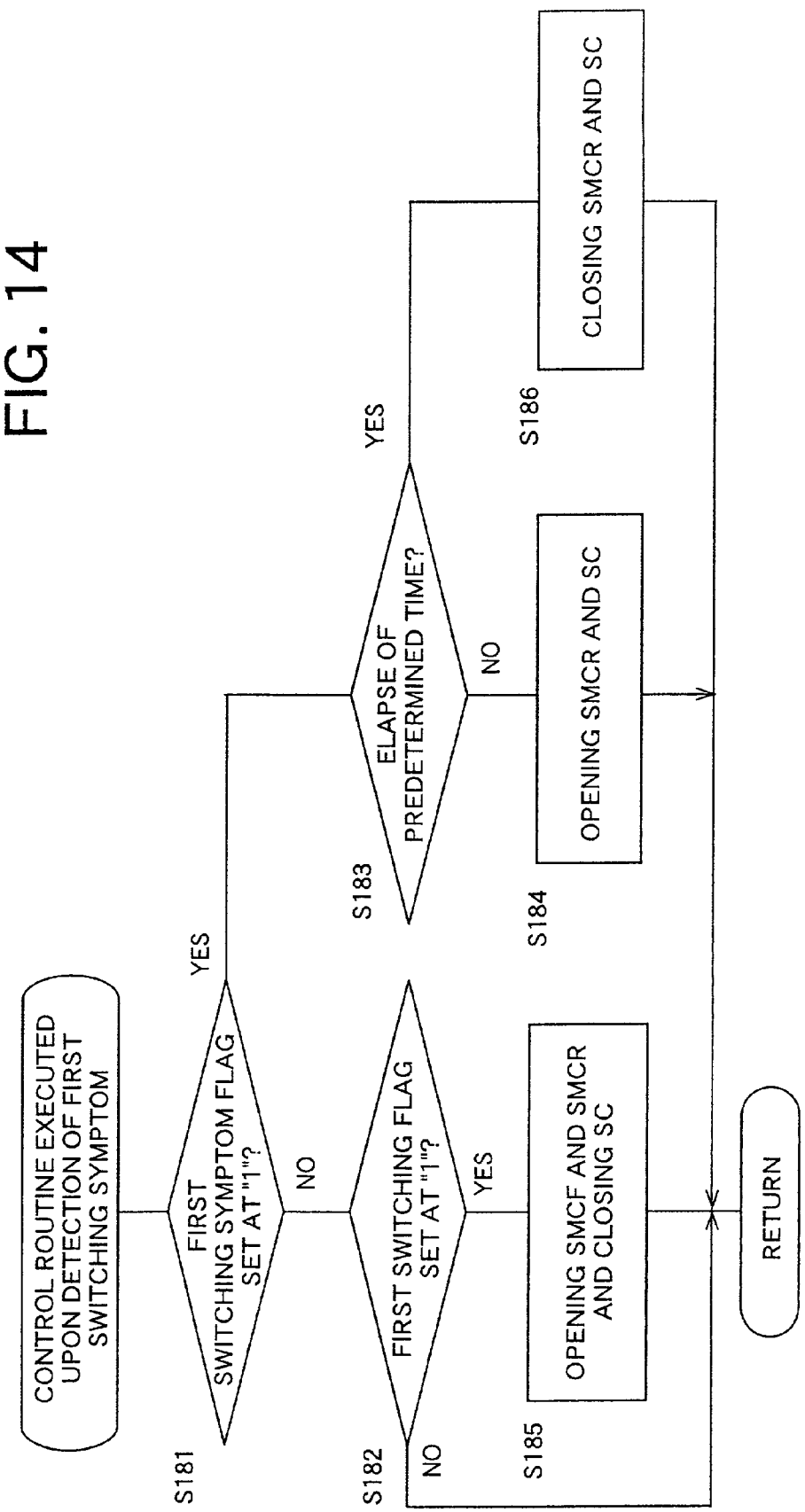
FIG. 14 is a flow chart illustrating a control routine executed according to a control program stored in the ROM of the braking pressure control apparatus of FIG. 13.

When the first switching symptom flag is set at "1" in the braking system of FIG. 13, the master-cylinder shut-off valves 152, 162 and the communication valve 302 are controlled according to a control routine illustrated in the flow chart of FIG. 14 according to an eighth embodiment of this invention. This control routine is initiated with step S181 to determine whether the first switching symptom flag is set at "1". Before the predetermined time after the first switching symptom flag has been set to "1" has expired, a negative decision (NO) is obtained in step S183, and the control flow goes to step S184 to open the master-cylinder shut-off valve 162 and the communication valve 302, while the master-cylinder shut-off valve 152 is held in the closed state. When the first switching condition is satisfied, an affirmative decision (YES) is obtained in step S182, and the control flow goes to step S185 to open the master-cylinder shut-off valve 152 and close the communication valve 302.

As described above, the eighth embodiment is arranged to open the communication valve 302 as well as the master-cylinder shut-off valve 162, for delivering the pressurized fluid from the booster chamber 98 to the four wheel brake cylinders 20, 28, so that the fluid pressures in the four wheel brake cylinders 20, 28 are controlled to substantially the same level. This arrangement makes it possible to reduce the fluid pressure difference of the wheel brake cylinders 20, 28, as compared with the above-indicated arrangement in which the two wheel brake cylinders 20, 28 are connected to each other through the open communicating valve 154, 164. In addition, the rate of increase of the fluid pressure in each wheel brake cylinder can be made lower in the present arrangement of FIGS. 13 and 14 in which the four wheel brake cylinders 20, 28 are connected to the booster chamber 98, than in the arrangement of FIG. 1 in which the two rear wheel brake cylinders 28 are connected to the booster chamber 98. In this respect, it is noted that opening the master-cylinder shut-off valve 162 rather than the master-cylinder shut-off valve 152 during opening of the communication valve 302 is more effective to reduce the rate of increase of the wheel brake cylinder pressure.

It is also noted that the difference between the pressure of the second hydraulic pressure source 14 and the pressure in the front wheel brake cylinders 20 has been lowered by the time when the master-cylinder shut-off valve 152 is opened in step S185 with the first switching flag set at "1", so that the rate of increase of the fluid pressure in the front wheel brake cylinders 30 can be restricted.

Further, the master-cylinder shut-off valve 152 rather than the shut-off valve 162 as well as the communication valve 302 may be opened. In this case, the pressure difference of the wheel brake cylinders can be made smaller than in the case where the communication valve 302 is not provided.

In step S185, the closing of the communication valve 302 is not essential.

The shut-off valves 152, 162 may be replaced by solenoid-operated flow control valves, so that the wheel brake cylinder pressure and the rate of change of the wheel brake cylinder pressure can be controlled by controlling the rate of flow of the fluid through the flow control valves. Further, the simulator shut-off valve 158 may be replaced by a flow control valve. In this case, the fluid flows between the stroke simulator 156 and the fluid passage 150 can be controlled by controlling the rate of flow of the fluid through the flow control valve.

It will be understood from the foregoing description that the linear valve devices 30 and the master-cylinder shut-off valves 152, 162 constitute a major portion of the switching device for selectively establishing the first and second operating states of the braking system, and the brake control unit 32 constitutes a major portion of a change restricting device for restricting a change of the operating state of the brake pedal 10 and/or the wheel brake cylinder pressure upon switching of the braking system between the first and second operating states.

Described in detail, the change restricting device is principally constituted by: (1) a portion of the brake control unit 32 assigned to execute the master-cylinder shut-off valve control routine illustrated in the flow chart of FIG. 3; (2) a portion of the brake control unit 32 assigned to execute the simulator shut-off valve control routine illustrated in the flow chart of FIG. 5; (3) a portion of the brake control unit 32 assigned to execute the master-cylinder shut-off valve duty-control routine illustrated in the flow chart of FIG. 8; (4) a portion of the brake control unit 32 assigned to execute the shut-off valve control routine illustrated in the flow chart of FIG. 9; (5) a portion of the brake control unit 32 assigned to execute the control-characteristic gradual change routine illustrated in the flow chart of FIG. 10; and (6) portions of the control routines illustrated in the flow charts of FIGS. 11, 12 and 14 upon detection of the first switching symptom.

The change restricting device includes a solenoid-operated-cut-off-valve control portion which is arranged to control a solenoid-operated cut-off valve provided in the fluid passages 152, 162 in the form of the solenoid-operated shut-off valve. This solenoid-operated-cut-off valve control portion is principally constituted by: (1) a portion of the brake control unit 32 assigned to implement steps S15 and S20–S23 of the control routine of FIG. 3; (2) a portion of the brake control unit 32 assigned to implement step S54 of the control routine of FIG. 5; (3) a portion of the brake control unit 32 assigned to implement steps S74 and S75 of the duty-control routine of FIG. 8; and (4) a portion of the brake control unit 32 assigned to implement step S154 of the control routine of FIG. 11.

The change restricting device further includes a duty-control portion which is arranged to control the duty-ratio of the shut-off valves 152, 162. This duty-control portion is principally constituted by: (1) a portion of the brake control unit 32 assigned to implement steps S19–21 of the control routine of FIG. 3; (2) a portion of the brake control unit 32 assigned to implement steps S74 and S75 of the duty-control routine of FIG. 8; and (3) a portion of the brake control unit 32 assigned to implement step S154 of the control routine of FIG. 11. The duty-control portion also functions as a change-rate restricting device arranged to restrict a change of he wheel brake cylinder pressure upon switching of the braking system from the first operating state to the second operating state.

The change restricting device further includes a communication control portion which is arranged to control the communication valve 302 and the master-cylinder shut-off valves 152, 162 such that the communication valve is held open while at least one of the shut-off valves 152, 162 is held open. This communication control portion is principally constituted by a portion of the brake control unit 32 assigned to implement steps S184–S186 of the control routine illustrated in the flow chart of FIG. 14. The change restricting device further includes a control-state-change restricting portion arranged to restrict a change in the manner of control of the wheel brake cylinder pressure. This control-state-change restricting portion is principally constituted by a portion of the brake control unit 32 assigned to execute the control-characteristic gradual change routine (steps S111–S126) illustrated in the flow chart of FIG. 10. The change restricting device further includes a fluid-flow control portion arranged to control the simulator shut-off valve 158 for controlling a fluid flow into the stroke simulator 156 and/or a fluid flow from the stroke simulator 156. This fluid-flow control portion is principally constituted by: a portion of the brake control unit 32 assigned to implement steps S54, S57 of the control routine illustrated in the flow chart of FIG. 5. The fluid-flow control portion also functions as a fluid-amount reducing device for reducing the amounts of fluid flows between the second hydraulic pressure source 14 and the wheel brake cylinders 20, 28 upon switching of the braking system from the first operating state to the second operating state, and a valve-opening control portion for opening the shut-off valves 152, 162 before opening the simulator shut-off valve 158 upon switching of the braking system from the first operating state to the second operating state.

The change restricting device further includes a brake-off switching portion arranged to open the simulator shut-off valve 158 and/or close the master-cylinder shut-off valves 152, 162, when the braking system is switched from the second operating state to the first operating state. This brake-off switching portion is principally constituted by a portion of the brake control unit 32 assigned to implement steps S93 and S94 of the control routine illustrated in the flow chart of FIG. 9.

The brake control unit 32 further includes a pressure-difference reducing device for reducing the difference between the pressure of the second hydraulic pressure source 14 and the wheel brake cylinder pressure. This pressure-difference reducing device is principally constituted by a portion of the brake control unit 32 assigned to execute the control routine illustrated in the flow chart of FIG. 3.

It will also be understood that the fluid-flow control portion, the flow-amount reducing device, the duty-control portion and the brake-off switching portion constitute a major portion of an influence-reducing device for reducing an influence of the switching between the first and second operating states on the operating state of the brake operating member in the form of the brake pedal 10, which influenced is unexpected to the vehicle operator. It will further be understood that the control-state-change restricting portion and a portion of the brake control unit 32 assigned to execute the control routine illustrated in the flow chart of FIG. 12 constitute a major portion of a modified-pressure-control device for controlling the wheel brake cylinder pressure during the switching of the braking system between the first and second operating states, in a manner different from the normal manners in the first and second operating states. It will also be understood that the portions of the brake control units 32 assigned to execute the control routines illustrated in the flow charts of FIGS. 11, 12 and 14 constitute a major portion of a forecasting-type change restricting device operable upon detection of a symptom of a switching between the first and second operating states, to restrict a change of the operating state of the brake pedal 10 and/or a change of the wheel brake cylinder pressure.

Figure 15:
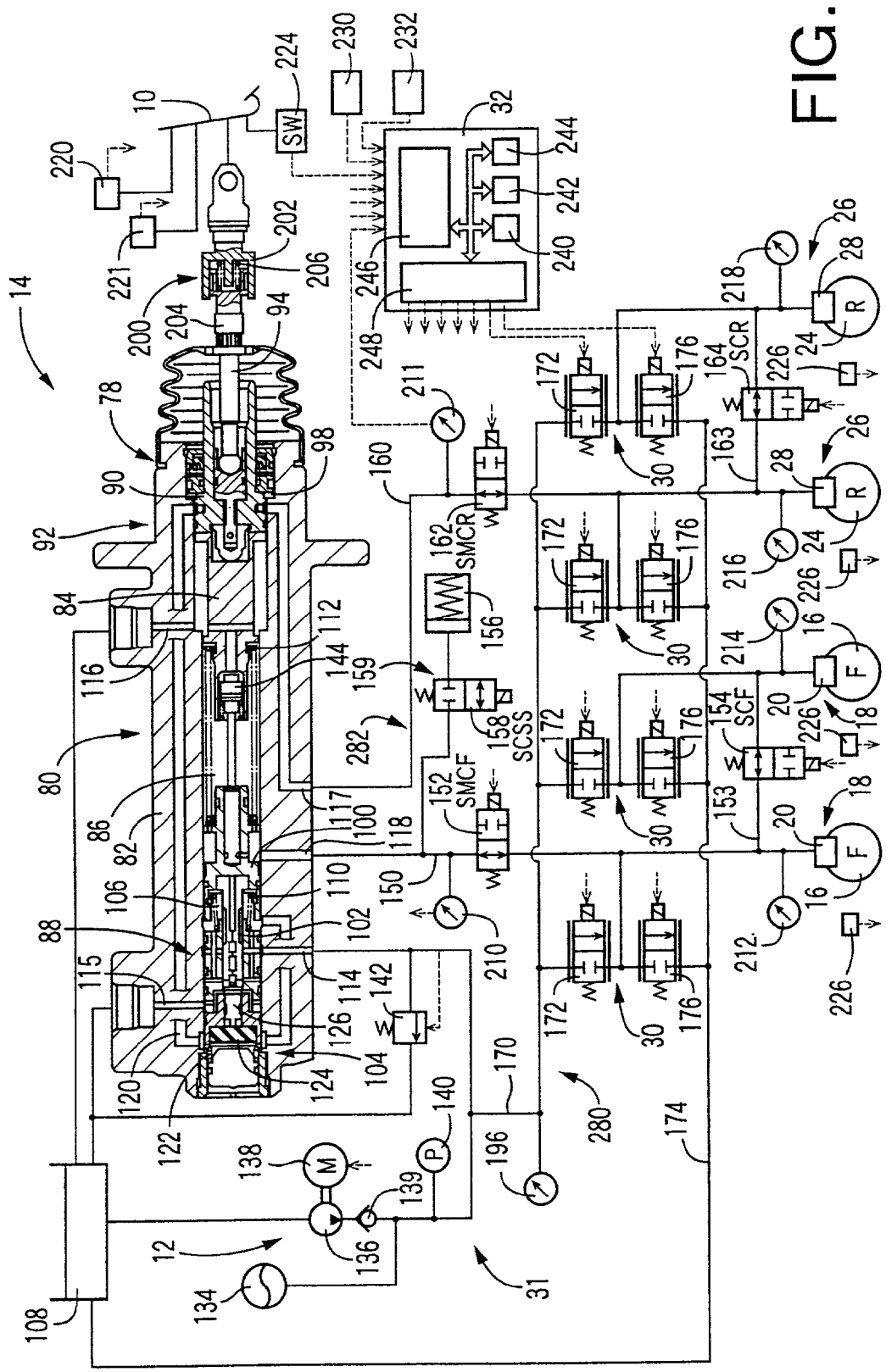
FIG. 15 is a schematic view showing a braking system including a braking pressure control apparatus constructed according to a ninth embodiment of this invention.

Referring next to FIG. 15, there will be described a braking system including a braking pressure control apparatus constructed according to a ninth embodiment of the present invention. This braking system is identical in hardware with the braking system of FIG. 1, except that the braking system of FIG. 15 does not include the operating-state detecting device 228, and includes a vehicle speed sensor 230 for detecting the running speed of the vehicle, and an ignition switch 232. The vehicle speed sensor 230 and the ignition switch 232 are connected to the input portion 246 of the brake control unit 32. The braking pressure control apparatus is adapted to detect the slipping state of each wheel 16, 24 on the basis of the output signals of the wheel speed sensors 26.

In the present embodiment, the ROM 244 stores various control programs which are different from those stored in the ROM 244 of the braking system of FIG. 1. Namely, the control program stored in the ROM 244 in the present braking system include: a control program for executing an operating state selecting routine illustrated in the flow chart of FIG. 16; a control program for executing a braking pressure control routine illustrated in the flow chart of FIG. 17; a data table for determining whether the braking system can be kept in the first operating state or must be switched to the second operating state, upon detection of various abnormalities of the braking system, as indicated in FIGS. 19A, 19B and 19C: a control program for effecting the anti-lock braking pressure control: a control program for effecting the vehicle turning stability control: a control program for effecting the cooperative braking control; and a control program for controlling the linear valve devices 30.

In the present braking system, the pump device 12, linear valve devices 30, fluid passage 170 and wheel brake cylinders 20, 28 constitute a major portion of a first hydraulic system 280, while the second hydraulic pressure source 14, fluid passages 150, 160, wheel brake cylinders 20, 28, master-cylinder shut-off valves 152, 162, stroke simulator device 159, stroke sensors 220, 221, stop switch 224, master-cylinder pressure sensor 210 and booster pressure sensor 211 constitute a major portion of a second hydraulic system 282. In the present embodiment, the switching device, which is constituted by the linear valve devices 30 and the master-cylinder shut-off valves 152, 162, also functions as a selectively cutting-off device for disconnecting the wheel brake cylinders 20, 28 a selected one of the first and second hydraulic pressure sources 31, 14. The pump device 12 is also used as a pressure source for the second hydraulic pressure source 14, more precisely, for delivering the pressurized fluid to the booster chamber 98. While the stroke simulator device 159 and most of the sensors are elements of the second hydraulic system 282, these elements may be considered to be also elements of the first hydraulic system 280.

There will be described an operation of the hydraulically operated braking system of FIG. 15 constructed as described above.

In the first operating state, the master-cylinder shut-off valves 152, 162 are held in the closed state, so that the wheel brake cylinders 20, 28 are disconnected from the second hydraulic pressure source 14. Further, the front and rear communicating valves 154, 164 are held in the closed state, while the simulator shut-off valve 158 is held in the open state. In this condition, the amount of electric current to be applied to the solenoid coil 188 of each linear valve device 30 is controlled, so that the fluid pressure in each wheel brake cylinder 20, 28 is controlled on the basis of the pressurized fluid delivered from the pump device 12.

In the second operating state, the master-cylinder shut-off valves 152, 162 are held in the open state, while the front and rear communicating valves 154, 164 are held in the open states, so that the wheel brake cylinders 20, 28 are communicated with the second hydraulic pressure source 14. The wheel brake cylinders 20, 28 are activated with the fluid pressurized by the second hydraulic pressure source 14 upon operation of the brake pedal 10.

In the second operating state, the simulator shut-off valve 158 is held in the closed state, so that the stroke simulator 156 is disconnected from the second hydraulic pressure source 14, so as to prevent an unnecessary consumption by the stroke simulator 156 of the pressurized fluid delivered from the second hydraulic pressure source 14. On the other hand, the solenoid coil 188 of each linear valve device 30 is held in the de-energized state, so that the pressure-increasing linear valve 172 and the pressure-reducing linear valve 176 are both held in the closed state, whereby the wheel brake cylinders 20, 28 are disconnected from the pump device 12.

In the second hydraulic pressure source 14, the hydraulic booster 78 is supplied with the pressurized fluid delivered from the pump device 12. The hydraulic booster 78 is not operable when the pump device 12 is abnormal and incapable of delivering the pressurized fluid to the booster chamber 98. In this event, however, the second hydraulic pressure source 14 simply functions as the master cylinder whose pressurizing piston 84 is advanced by an operation of the brake pedal 10, to pressurize the fluid in the pressurizing chamber 86, so that the front brake cylinders 20 are supplied with the pressurized fluid to operate the front wheel brakes 18.

In the present braking system, too, the braking effect control is normally effected in the first operating state. In the braking effect control, the operator's desired vehicle braking force is obtained on the basis of the output signals of the stroke sensors 220, 221, master-cylinder pressure sensor 210 and booster pressure sensor 211. The amount of electric current to be applied to the solenoid coils 188 of the linear valve devices 30 is controlled to control the fluid pressure in each wheel brake cylinder 20, 28 to a level correspond to the obtained operator's desired vehicle braking force.

The present braking system is also capable of effecting the cooperative braking control as described above with respect to the braking system of FIG. 1.

Figure 16:
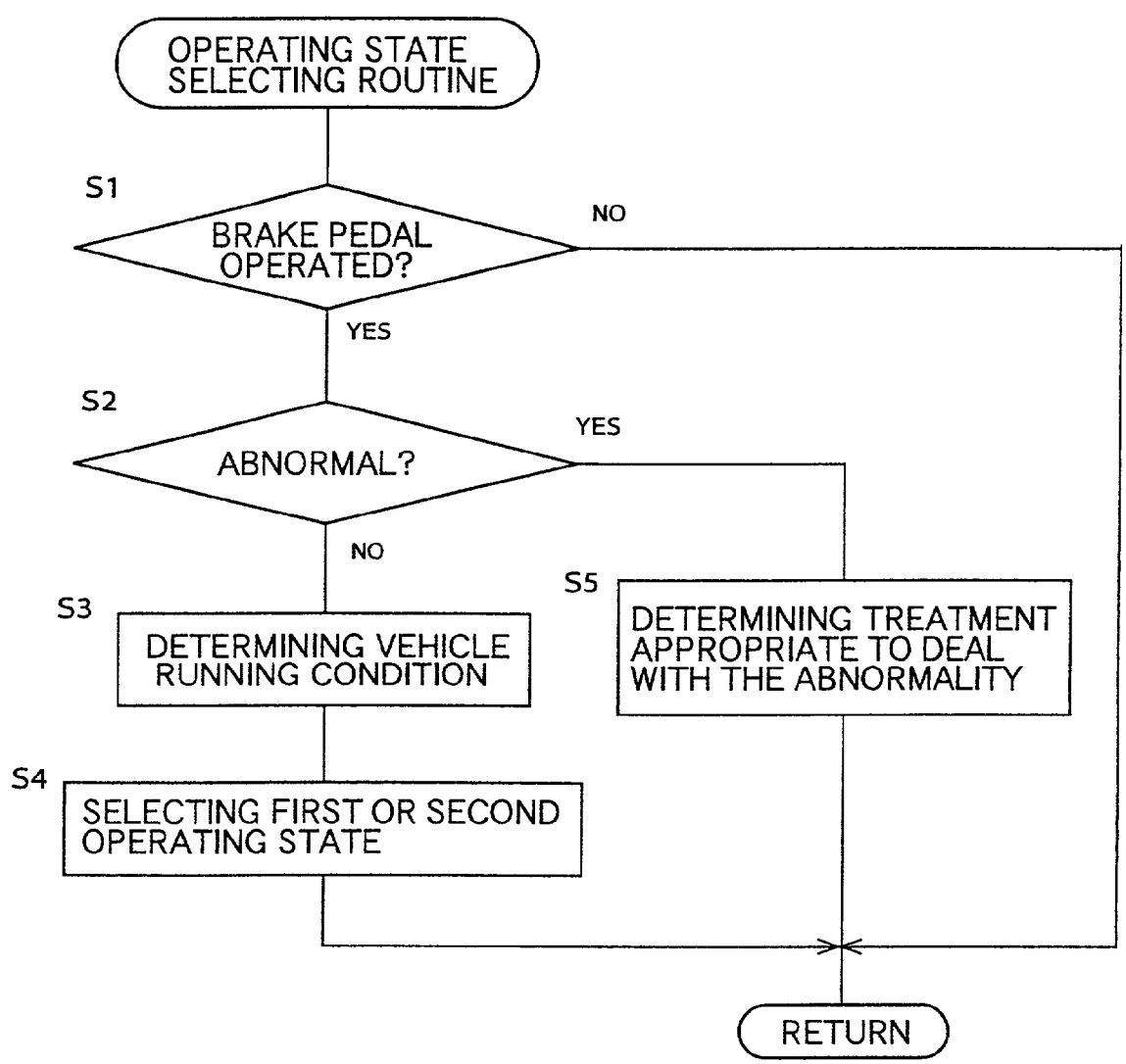
FIG. 16 is a flow chart illustrating an operating state selecting routine executed according to a control program stored in a ROM of the braking pressure control apparatus of FIG. 15.

The braking system is selectively placed in the first or second operating state, according to the operating state determining routine illustrated in the flow chart of FIG. 16. This routine is repeatedly executed while the ignition switch 232 is on.

The operating state determining routine of FIG. 16 is initiated with step S1 to determine whether the brake pedal 10 is in operation. This determination may be made by determining whether the fluid pressure in the wheel brake cylinders 20 28 is higher than a predetermined level. If an affirmative decision (YES) is obtained in step S1, the control flow goes to step S2 to determine whether the present braking system is abnormal. This determination is effected on the basis of an output signal of a suitable diagnosing device. In the present embodiment, the diagnosing device is activated to perform an initial diagnosis of the braking system when the ignition switch 230 is turned on. The diagnosing device is arranged to diagnose the pressure-increasing and pressure-reducing linear valves 172, 174 of each linear valve device 30 for any abnormality, the simulator shut-off valve 158 for sticking of its valve member in the closed state, the pump device 12 for any abnormality, and the various sensors for any abnormalities.

The diagnosis by the diagnosing device may be effected also while the vehicle is stationary, as well as when the ignition switch 230 is turned on. The determination as to whether the brake pedal 10 is in operation may also be made by determining whether the linear valve devices 30 are in operation or not, or whether the fluid pressure detected by the master-cylinder pressure sensor 210 is higher than a predetermined level. An operation of the brake pedal 10 can also be detected on the basis of the output signal of the stop switch 224 or the output signals of the stop switch 224 and the stroke sensors 220, 221. For instance, an operation of the brake pedal 10 is detected when the stop switch 224 is on, or when the stop switch 224 is on while the operating stroke of the brake pedal 10 detected by the stroke sensors 220, 221 is larger than a predetermined threshold. Alternatively, it is possible to determine that the brake pedal 10 is in operation, when the vehicle is stationary with the ignition switch 232 being held on.

If the braking system is normal, a negative decision (NO) is obtained in step S2, and the control flow goes to steps S3 and S4 to detect the vehicle running condition and select one of the first and second operating states of the braking system depending upon the detected vehicle running condition. In the normal sate of the vehicle, the braking system is placed in the first operating state. When one of predetermined conditions is satisfied, the braking system is switched to the second operating state.

If the braking system is diagnosed to be abnormal, an affirmative decision (YES) is obtained in step S2, and the control flow goes to step S5 to determine a treatment appropriate to deal with the detected abnormality, and select first or second operating state according to a treatment data table indicated in the tables of FIGS. 19A, 19B and 19C.

Initially, the operation to control the fluid pressure in the wheel brake cylinders 20, 28 in the first operating state will be described.

In the first operating state, the fluid pressure in the wheel brake cylinders 20, 28 is controlled by controlling the linear valve devices 30, as described above. More specifically described, the desired value of the wheel brake cylinder pressure is determined on the basis of the operating stroke of the brake pedal 10, the rate of change of the operating stroke, a derivative of the rate of change, and the fluid pressure corresponding to the operating force of the brake pedal 10. The actual value of the wheel brake cylinder pressure is controlled so as to coincide with the determined desired value. The operating stroke is determined on the basis of an average S of the outputs of the two stroke sensors 220, 221, and the fluid pressure corresponding to the operating force is determined as the fluid pressure PM detected by the master-cylinder pressure sensor 210 or the fluid pressure PB detected by the booster pressure sensor 211. The desired wheel brake cylinder pressure P* is determined according to the following equations:

$$P^* = K \cdot F^*$$

$$F^* = f(PM, PB, S, dS/dt, d^2S/dt^2)$$

The value K is a constant, and the desired wheel brake cylinder pressure P* is a value proportional to the desired vehicle braking force F*. For example, the function "f" is a linear function represented by $F^* = K_1 (PM+PB) + K_2 S + K_3 \cdot dS/dt + K_4 \cdot d^2S/dt^2$. The values $K_1$, $K_2$, $K_3$ and $K_4$ are constants, which may be fixed values or vary depending upon the running condition of the vehicle and the desired vehicle braking force F*, for instance.

Figure 17:
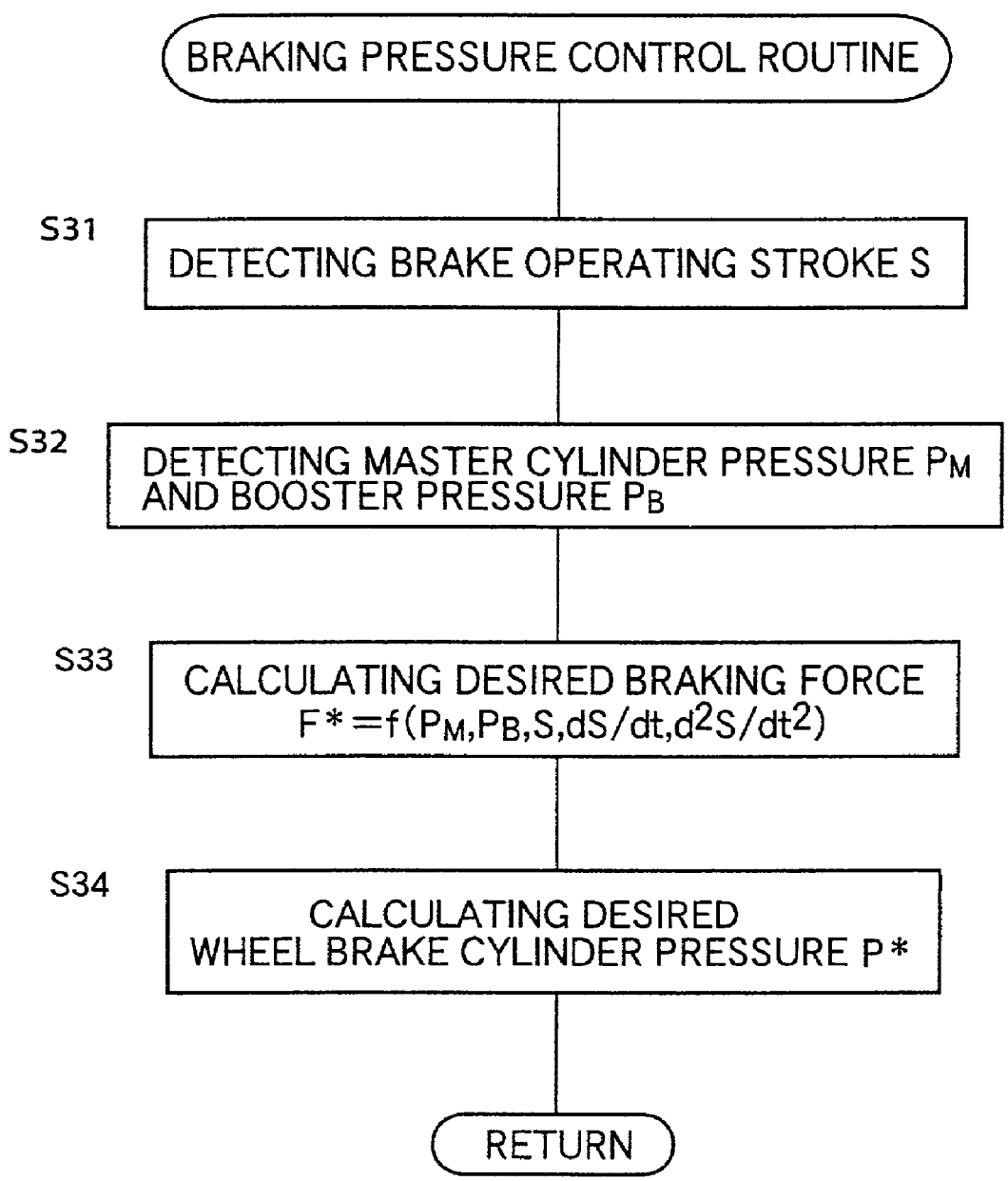
FIG. 17 is a flow chart illustrating a braking pressure control routine executed according to a control program stored in the ROM.

In the first operating state, a braking pressure control routine illustrated in the flow chart of FIG. 17 is repeatedly executed. This control routine is initiated with step S31 to detect the operating stroke S of the rake pedal 10. Then, the control flow goes to step S32 to detect the master cylinder pressure PM and the booster pressure PB, and step S33 to calculate the desired vehicle braking force F*. Step S34 is then implemented to calculate the desired wheel brake cylinder pressure P*. The linear valve devices 30 are controlled in a feedback fashion on the basis of the output signals of the brake cylinder pressure sensors 212–218 such that the detected actual value of the wheel brake cylinder pressure coincides with the desired value P*.

In the cooperative braking control, the desired hydraulic braking force is calculated by subtracting the actual regenerative braking force from the desired vehicle braking force F*, and the desired wheel brake cylinder pressure corresponding to the desired hydraulic braking force is calculated.

As described above, the desired vehicle braking force F* is obtained on the basis of the first derivative dS/dt and the second derivative $d^2S/dt^2$ of the operating stroke S as well as the operating stroke S. Accordingly, the control delay of the wheel brake cylinder pressure while the operating stroke S is being changed can be reduced, making it possible to reduce the deterioration of the operating feel of the brake pedal 10.

Figure 18:
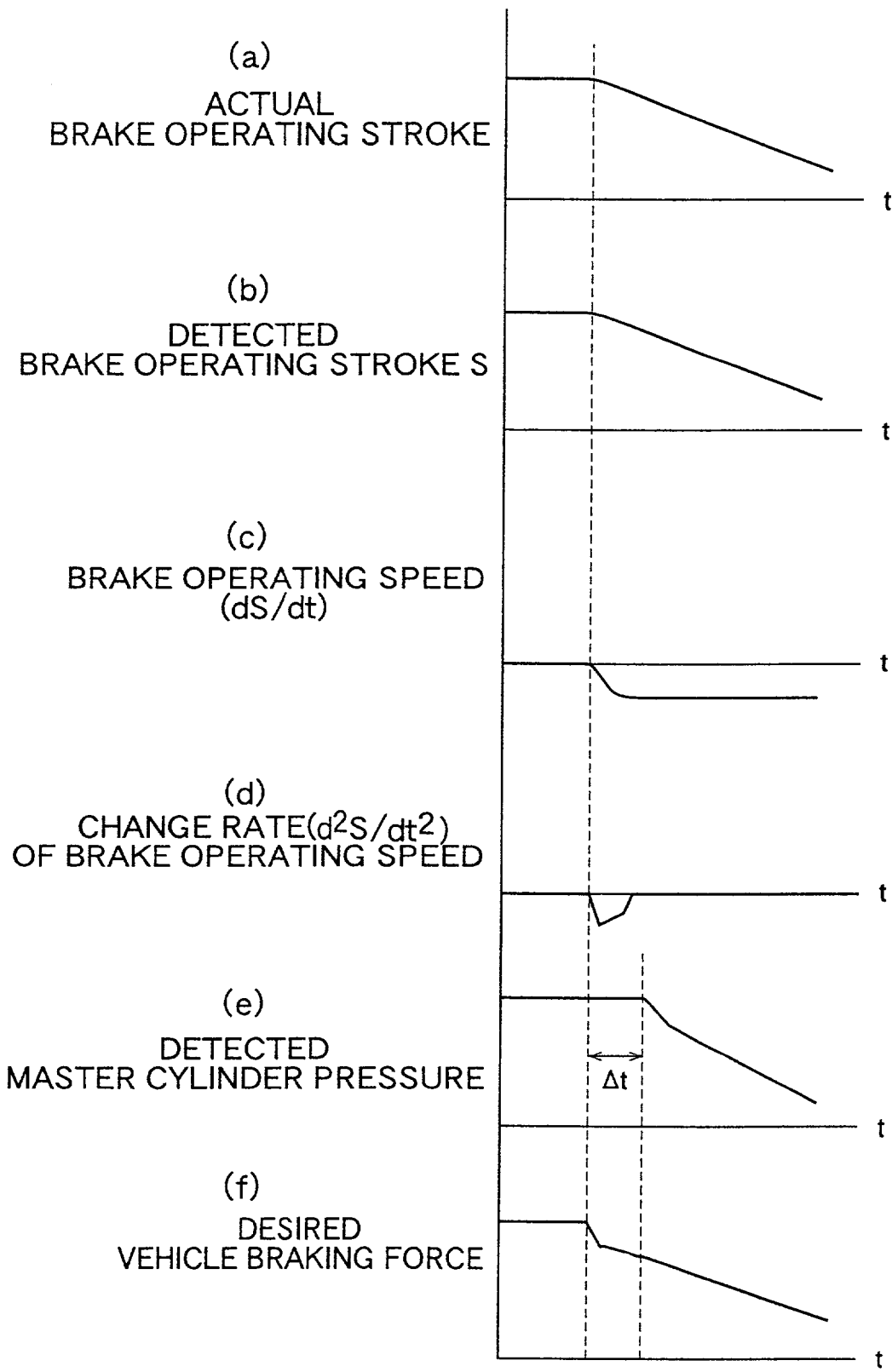
FIG. 18 is a graph indicating changes various parameters upon operation of a brake pedal.

When the actual operating stroke of the brake pedal 10 is reduced by the operator, as indicated at (a) in FIG. 18, the operating stroke S as detected by the stroke sensors 220, 221 is reduced as indicated at (b). When the operating stroke is reduced as indicated at (a) and (b), the first derivative of the operating stroke S is changed as indicated at (c), and the second derivative is changed as indicated at (d). Further, the master cylinder pressure PM as detected by the master-cylinder pressure sensor 210 is changed such that the change is delayed by Δt with respect to the change of the operating stroke S, as indicated at (e). If the desired wheel brake cylinder pressure P* were determined on the basis of the operating stroke S and the master cylinder pressure PM, and the linear valve devices 30 were controlled according to the thus determined desired wheel brake cylinder pressure P*, a change in the actual wheel brake cylinder pressure would be delayed with respect to the change in the operating stroke S, resulting in deterioration of the operating state of the brake pedal 10 as felt by the vehicle operator. In view of this drawback, the present embodiment is arranged to determine the desired wheel brake cylinder pressure P* on the basis of not only the operating stroke S but also the first and second derivatives of the operating stroke S so that the desired vehicle braking force is changed as indicated at (f), whereby the actual wheel brake cylinder pressure is changed with a reduced delay with respect to the change in the operating stroke of the brake pedal 10, making it possible to reduce the deterioration of the operating feel of the brake pedal 10.

While the present embodiment is arranged to determine the desired value P* of the wheel brake cylinder pressure by taking account of the rate of change of the operating stroke S of the brake pedal 10 and the derivative of this rate of change, the delay of the change in the actual wheel brake cylinder pressure can be reduced by determining the desired value P* by taking account of the rate of change of the master cylinder pressure PM and the derivative of this rate of change. Alternatively, the desired wheel brake cylinder pressure P* may be determined by taking account of the rate of change of the operating force of the brake pedal 10 a detected by a suitable force sensor, and the derivative of this rate of change. It is noted that the desired wheel brake cylinder pressure P* need not be determined on the basis of both the rate of change of the selected parameter indicated above and its derivative. The above-indicated delay can be reduced even where the desired wheel brake cylinder pressure P* is determined by taking account of only the rate of change or its derivative.

There will next be described the treatment of a detected abnormality of the braking system, namely, an operation in step S5 of the routine of FIG. 16.

According to the data table indicated in FIG. 19, the operation of the braking system in the first operating state is inhibited when an abnormality of the pump device 12 (first hydraulic pressure source 31) is detected. If the abnormality is detected while the braking system is placed in the first operating state, the braking system is switched to the second operating state. If the abnormality is detected while the braking system is placed in the second operating state, the braking system is kept in the second operating state. The operation of the braking system in the first braking condition is inhibited since the pressure of the fluid in the accumulator 134 is abnormally low when any one of the pump 136, pump motor 138 and accumulator 134 is abnormal. If the fluid pressure in the accumulator 134 when the braking system has been switched to the second operating state is high enough to operate the hydraulic booster 7, the operating force of the brake pedal 10 is boosted, and the second hydraulic pressure source 14 is able to pressurize the fluid to a level higher than a level corresponding to the operating force of the brake pedal 10. When the fluid pressure in the accumulator 134 is not high enough to operate the hydraulic booster 78, the operating force of the brake pedal 10 cannot be boosted. In this state, however, the fluid in the pressurizing chamber 86 can be pressurized by an advancing movement of the pressurizing piston 84 with the brake operating force, so that the brakes 18 for the front wheels 16 can be activated. Thus, the second hydraulic system 282 is operable in the second operating state. In this second operating state, the linear valve devices 30 need not be controlled by application of an electric current to the solenoid coils 188, the amount of consumption of the electric energy can be reduced. Further, the number of operations of the linear valve devices 30 can be reduced, leading to an increase in the service life of the linear valve devices 30. Further, the amount of consumption of the pressurized fluid in the accumulator 134 in the second operating state can be reduced by closing the linear valve devices 30 so that the pressurized fluid accommodated in the accumulator 134 is used for only the hydraulic booster 76.

Although the present embodiment is adapted to inhibit the operation of the braking system in the first operating state immediately after the detection of an abnormality of the pump device 12, the fluid pressure in the wheel brake cylinders 20, 28 can be controlled in the first operating state as long as the fluid pressure in the accumulator 134 is high enough to control the wheel brake cylinder pressure.

If an abnormality of the stroke simulator device 159 of the second hydraulic system 282 is detected, the operation in the first operating state is inhibited. Namely, if the simulator shut-off valve 158 is kept in the closed state due to an abnormality of the stroke simulator device 159, the operating feel of the brake pedal 10 is deteriorated. In the second operating state in which the simulator shut-off valve 158 is held in the closed state, the abnormality of the stroke simulator device 159 will not cause the deterioration of the brake operating feel. The abnormality of the stroke simulator device 159 includes sticking of the valve member of the simulator shut-off vale 158 in the closed position, and a defect of the stroke simulator 156.

The stroke simulator device 159 can be diagnosed for any abnormality, depending upon a relationship between the detected operating stroke of the brake pedal 10 and the detected master cylinder pressure PM or wheel brake cylinder pressure PB. When the simulator shut-off valve 158 is in the open state, for instance, the stroke simulator 156 is considered to be defective if the rate of change of the master cylinder pressure PM with a change in the brake operating stroke S is abnormally low. When the solenoid coil of the simulator shut-off valve 158 is energized (for opening the valve), the valve member of the shut-off valve 158 is considered to be stuck in the closed position if the rate of change of the master cylinder pressure PM with a change in the brake operating stroke S is abnormally high.

When an abnormality of the hydraulic booster 78 is detected, the operation of the braking system in the first operating state is continued, since the abnormality of the hydraulic booster 78 does not adversely influence the control of the wheel brake cylinder pressure in the first operating state.

When an abnormality of any linear valve device 30 is detected, the braking system is kept in the first operating state or switched to the second operating state, depending upon the specific abnormality of the linear valve device 30.

If the valve member of the pressure-increasing linear valve 172 of any linear valve device 30 is stuck in the open position, the operation of the braking system in the first operating state is inhibited. In this abnormal state of the pressure-increasing linear valve 172, the fluid pressure in the wheel brake cylinders 20, 28 is rapidly raised. If the pressure-reducing linear valve 176 is controlled in this state, to return the pressurized fluid from the wheel brake cylinders 20, 28 to the master reservoir 108, a large volume of the pressurized fluid stored in the accumulator 134 is consumed, and the pressure in the accumulator 134 is accordingly lowered. In this abnormal state, the braking system is switched from the first operating state to the second operating state so that the brakes 18, 26 are activated by the fluid pressurized by the second hydraulic pressure source 14 on the basis of the operating force of the brake pedal 10.

If the valve member of the pressure-increasing linear valve 172 of any one of the four linear valve devices 30 is stuck in the closed state, the corresponding front or rear communicating valve 154, 164 is opened, and the control of the wheel brake cylinder pressure in the first operating state is continued. If the valve member of the pressure-increasing linear valve 172 of one of the two front or rear linear valve devices 30 is abnormally stuck in the closed position while that of the other liner valve device 30 is normal, the fluid pressure in the two front or rear wheel brake cylinders 20, 28 can be controlled by the normal linear valve device 30.

If the pressure-reducing linear valve 176 of one of the four linear valve devices 30 is abnormal, the wheel brake cylinder 20, 28 corresponding to the abnormal pressure-reducing linear valve 176 is kept in the non-operated state with the corresponding pressure-increasing linear valve 172 held in the closed state, and the fluid pressure in the other three wheel brake cylinders 20, 28 is controlled in the first operating state, to brake the vehicle with the three brakes 16, 24. The vehicle braking force generated by the three wheel brake cylinders is not insufficient.

If the valve member of the pressure-reducing linear valve 176 of one of the linear valve devices 30 is stuck in the closed state, the corresponding front or rear communicating valve 154, 164 is opened, and the control of the wheel brake cylinder pressure is continued in the first operating state. If the valve member of the pressure-reducing linear valve 176 of one of the two front or rear linear valve devices 30 is abnormally stuck in the closed position while that of the other liner valve device 30 is normal, the fluid pressure in the two front or rear wheel brake cylinders 20, 28 can be controlled by the normal linear valve device 30.

If at least one linear valve device 30 of one of the front and rear sub-systems is abnormal, the pressure-increasing and pressure-reducing linear valves 172, 176 of the abnormal sub-system which includes the abnormal valve device or devices 30 are both closed, and the corresponding master-cylinder shut-off valve 152, 162 is opened, so that the wheel brake cylinder pressure in the abnormal sub-system is controlled by the second hydraulic system 282, while the wheel brake cylinder pressure in the normal sub-system is controlled by the first hydraulic system 280.

As described above, the control of the wheel brake cylinder pressure in the first operating state is continued, even when the linear valve device or devices 30 is/are abnormal, as long as the control in the first operating state is possible. Thus, the first hydraulic system 280 is utilized as much as possible, making it possible to continue the braking effect control or the cooperative braking control as much as possible. Since the opportunity to terminate the cooperative braking control due to the abnormality of the linear valve devices 30 is reduced, the energy efficiency of the vehicle braking device is improved by the utilization of the regenerative braking force.

The abnormality of each linear valve device 30 can be detected depending upon a relationship between the amounts of electric current applied to the solenoid coils 188 of the pressure-increasing and pressure-reducing linear valves 172, 176 and the fluid pressures as detected by the brake cylinder pressure sensors 212–218.

If any of the brake cylinder pressure sensors 212–218 (pressure sensors 212, 214 for the front wheel brake cylinders 20, and pressure sensors 216, 218 for the rear wheel brake cylinders 28) is abnormal, the control of the wheel brake cylinder in the first operating state is continued, utilizing the first hydraulic system 280, by opening the corresponding front or rear communicating valve 154, 164, so that the two front or rear wheel brake cylinders 20, 28 are communicated with each other. In this state, the two brake cylinders have the same fluid pressure, which can be detected by the normal one of the two brake cylinder pressure sensors.

The pressure sensors 212, 214 for the front wheel brake cylinders 20 can be diagnosed for an abnormality, on the basis of the fluid pressures detected by the pressure sensors 212, 214 when the front communicating valve 154 is switched between the open and closed states, in a condition in which the two front wheel brake cylinders 30 must have the same pressure. The pressure sensors 216, 218 for the rear wheel brake cylinders 28 can be similarly diagnosed.

If either one of the two accumulator pressure sensors 140, 196 is abnormal, the control of the wheel brake cylinder pressure in the first operating state is inhibited. Although the control of the linear valve devices 30 based on the pressure detected by the other normal accumulator pressure sensor 140, 196 is possible, the accuracy of detection of the accumulator pressure is not sufficiently high, resulting in inaccurate accuracy of control of the wheel brake cylinder pressure if the braking system is kept in the first operating state. In view of this problem, the braking system is switched to the second operating state.

In the present embodiment, one of the two accumulator pressure sensors 140, 196 is diagnosed to be abnormal if the difference between the fluid pressures detected by these pressure sensors is larger than a predetermined threshold, or if an electrical defect such as wire disconnection or short-circuiting of the pressure sensor 140, 196 is detected.

When one of the two accumulator pressure sensors 140, 196 is detected, the pump motor 138 may be controlled so that the lower one of the fluid pressure values detected by these two sensors is held within a predetermined range.

If either one of the master-cylinder pressure sensor 210 and the booster pressure sensor 211 is diagnosed to be abnormal, the control of the wheel brake cylinder pressure is continued on the basis of the fluid pressure detected by the other normal sensor 210, 211. If the master-cylinder and booster pressure sensors 210, 211 are both diagnosed to be abnormal, the control of the wheel brake cylinder in the first operating state is continued on the basis of the output signal of the other sensors such as the stroke sensors 220, 221.

If one of the pressure sensors 210, 211 is abnormal, the corresponding master cylinder pressure PM or booster pressure PB in the above-indicated equation used to calculate the desired vehicle braking force F* is zero, and the fluid pressure PM, PB detected by the other normal pressure sensor is doubled in the equation. If both of the pressure sensors 210, 211 are abnormal, the pressures PM and PB are both zeroed in the equation, and the operating stroke S detected by the stroke sensors 220, 221 is doubled in the equation.

The master-cylinder pressure sensor 210 and the booster pressure sensor 211 are diagnosed on the basis of the fluid pressures detected by these sensors, and the fluid pressure in the accumulator 134 and the operating state of the brake pedal 10. For instance, the pressure sensors 210, 211 can be determined to be abnormal, if the fluid pressures detected by these sensors are lower than predetermined thresholds while the accumulator pressure is sufficiently high during an operation of the brake pedal 10.

Further, the pressure sensors 210, 211 can be diagnosed on the basis of the fluid pressures detected by the brake cylinder pressure sensors 212–218 and the fluid pressures detected by the pressure sensors 210, 211 while the master-cylinder shut-off valves 152, 162 are held in the open state. In the open state of the shut-off valves 152, 162, the fluid pressures detected by those pressure sensors 210–218 must be equal to each other. The pressure sensors 210, 211 may also be diagnosed by comparing the detected master cylinder pressure PM, booster pressure PB and brake operating stroke S. The pressure sensor 210, 211 can be determined to be abnormal, if the detected master-cylinder pressure PM or booster pressure PB is different from the level corresponding to the detected brake operating stroke S.

Figure 20:
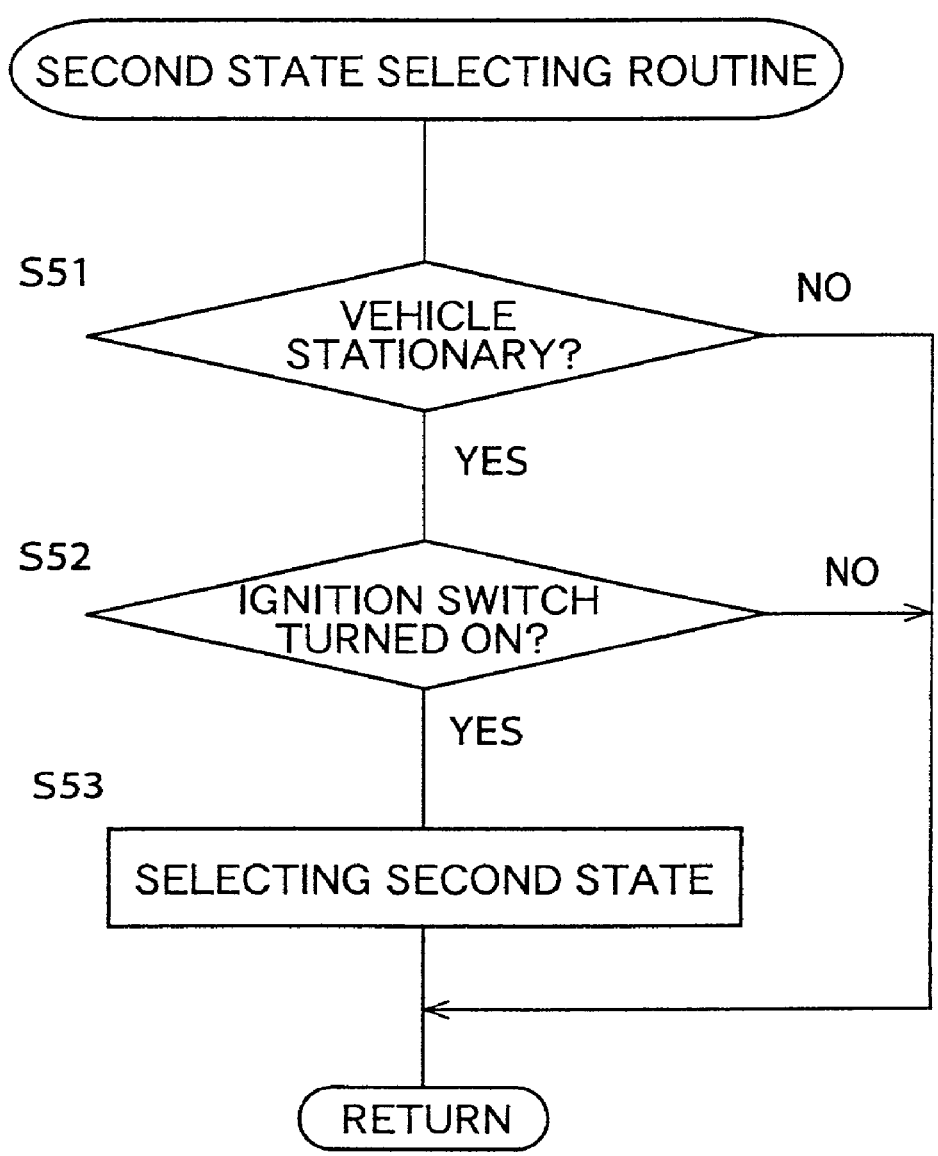
FIG. 20 is a flow chart illustrating a second state selecting routine executed according to a control program stored in the ROM.

There will next be described in detail the steps S3 and S4 of the routine of FIG. 16 to switch the braking system between the first and second operating states, depending upon the running condition of the vehicle. The present braking system is normally placed in the first operating state. When the ignition switch 232 is turned on while the vehicle is stationary, the braking system is switched to the second operating state. Namely, a second state selecting routine illustrated in the flow chart of FIG. 20 is executed. This routine is initiated with step S51 to determine whether the vehicle is stationary. If an affirmative decision (YES) is obtained in step S51, the control flow goes to step S52 to determine whether the ignition switch 232 is turned on. The determination in step S51 is effected by determining whether the vehicle running speed detected by the vehicle speed sensor 230 is lower than a predetermined threshold below which the vehicle is considered to be stationary. If an affirmative decision (YES) is obtained in step S52, the control flow goes to step S53 to select and establish the second operating state.

Immediately after the ignition switch 232 is turned on, the initial diagnosis is performed. In the initial diagnosis, the master-cylinder shut-off valves 152, 162 are usually switched to the open state. In view of this, the braking system is switched to the second operating state when the ignition switch is turned on. This arrangement eliminates a need of switching the braking system to the second operating state for performing the initial diagnosis, and facilitates the preparation for the initial diagnosis, utilizing the second hydraulic system 282.

It is desirable to reduce the amount of energy to be consumed during a warm-up period of the vehicle. In this sense, it is effective to place the braking system in the second operating state immediately after the ignition switch 232 is turned on.

As described above, the present braking system is arranged to effective utilization of the first and second hydraulic systems 280, 282, which are selectively established depending upon the vehicle condition.

It will be understood from the foregoing description of the ninth embodiment of this invention that a portion of the brake control unit 32 assigned to execute the operating state selecting routine illustrated in the flow chart of FIG. 16 (including the ROM 244 storing the data table of FIGS. 19A, 19B and 19C) constitutes a major portion of a switching control device for controlling the switching device 30, 152, 162 so as to select the first or second operating state of the braking system, depending upon the condition of the vehicle. It will be understood that a portion of the brake control unit 32 assigned to implement steps S3 and S4 (including a portion assigned to execute the second state selecting routine illustrated in the flow chart of FIG. 20) constitutes an operating state determining portion of the switching control device, which is operable to determine the operating state depending upon the running condition of the vehicle.

Although the present embodiment is arranged to switch the braking system between the first and second operating states during an operation of the braking system, the switching may be effected while the braking system is not in operation. In this case, step S1 of the routine of FIG. 16 is eliminated. The switching of the braking system between the first and second operating states while the braking system is not in operation will not cause an unexpected change of the operating state of the brake pedal 10 or an unexpected change of the vehicle braking force upon switching of the braking system.

The operating state selecting routine of FIG. 16 is arranged to switch the braking system to the second operating state in steps S3 and S4 (second state selecting routine of FIG. 20) when the ignition switch 232 is turned on while the vehicle is stationary. However, the braking system may be switched to the second operating state when the ignition switch 232 is turned on, irrespective of whether the vehicle is stationary or not. In this case, too, the initial diagnosis can be initiated immediately after the vehicle has been brought to the stationary state. Further, the braking system may be switched to the second operating state when the vehicle is brought to the stationary state for the first time after the ignition switch 232 is turned on.

The braking system may be switched to the second operating state when the ignition switch 232 is turned on while the vehicle is stationary, even when the hydraulic brakes 18, 26 are not in operation. Immediately after the ignition switch 232 is turned on, the vehicle may be stationary with a mechanically operated parking brake device is in operation, without operation of the hydraulically operated brakes 18, 26. When the brake pedal 10 is subsequently operated to activate the hydraulic brakes 18, 26 to hold the vehicle stationary, the fluid pressure in the wheel brake cylinders 20, 28 need not be controlled with high accuracy (need not be controlled in the braking effect control mode). In this sense, the braking system is placed in the second operating state when the ignition switch 232 is turned on while the vehicle is stationary, irrespective of whether the brakes 16, 26 are in operation or not. Where the braking system is adapted to perform the initial diagnosis when the brake pedal 10 is operated, the initial diagnosis can be initiated immediately after the operation of the brake pedal 10, since the braking system is already placed in the second operating state.

Conversely, the braking system can be switched to the second operating state when the vehicle is stationary, irrespective of whether the ignition switch 232 is turned on.

Figure 21:
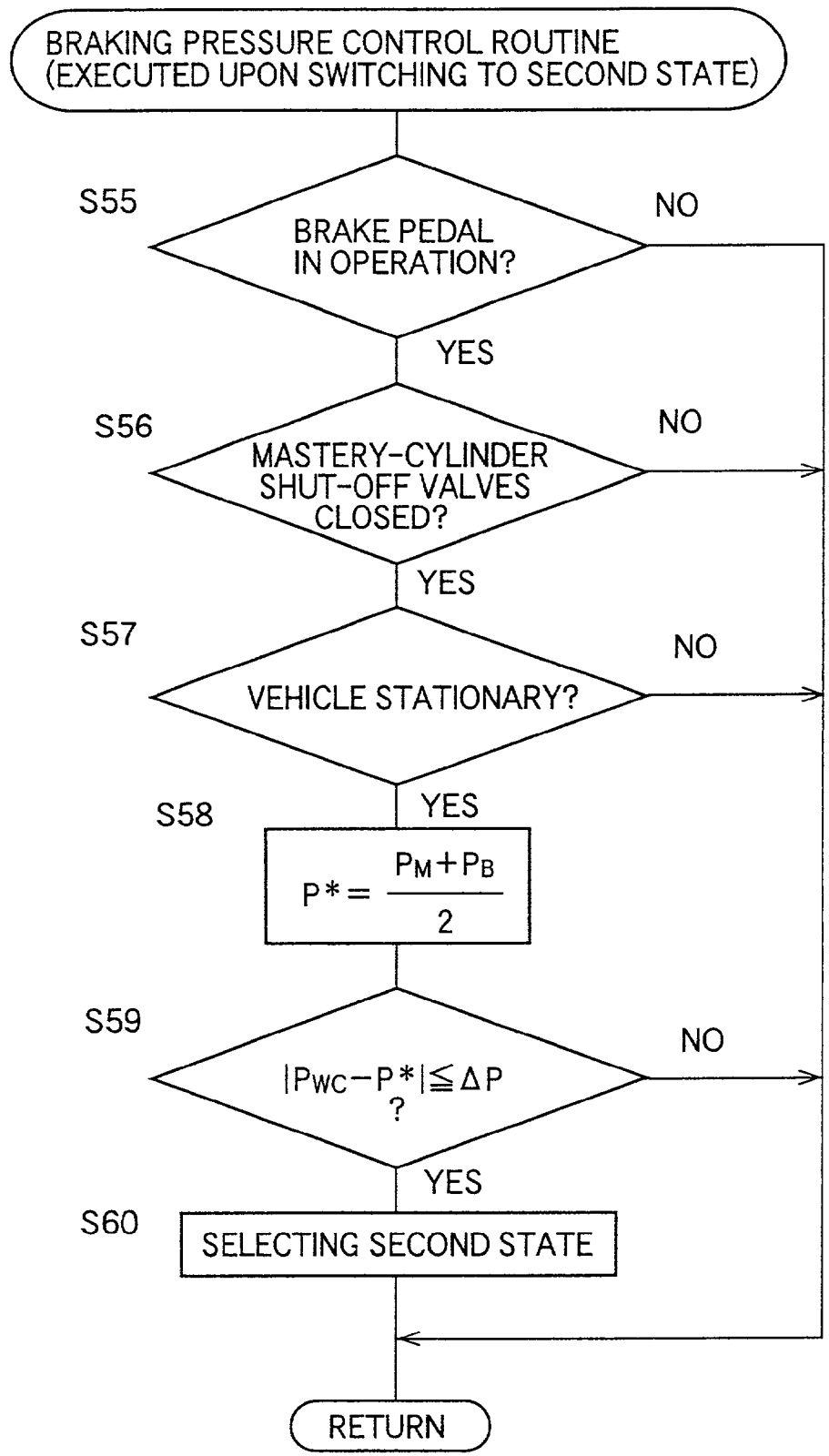
FIG. 21 is a flow chart illustrating a control routine executed according to a control program stored in a ROM of a braking pressure control apparatus according to a tenth embodiment of this invention, for controlling the wheel brake cylinder pressure when the operating state of the braking system is switched to a second state.

In the above case, the fluid pressure in the wheel brake cylinders 20, 28 is desirably controlled to a level close to the pressure of the fluid pressurized by the second hydraulic pressure source 14, before the braking system has been switched to the second operating state. This control of the wheel brake cylinder pressure may be effected according to a braking pressure control routine illustrated in the flow chart of FIG. 21 according to a tenth embodiment of this invention. The control routine of FIG. 21 is initiated with steps S55–S57 to determine whether the brake pedal 10 is in operation, whether the master-cylinder shut-off valves 152, 162 is in the closed state, and whether the vehicle is stationary. If an affirmative decision (YES) is obtained in all of these steps S55–S57, the control flow goes to step S58 to inhibit the control of the wheel brake cylinder pressure in the first operating state, and determine the desired wheel brake cylinder pressure P* such that the desired value P* is equal to an average of the detected master-cylinder pressure PM and booster pressure PB, namely, P*=(PM+PB)/2, which is considered to be the pressure of the second hydraulic pressure source 14. Accordingly, the linear valve devices 30 are controlled to control the actual wheel brake cylinder pressure to approach the desired value P*. Step S58 is followed by step S59 to determine whether the absolute value of the difference between the master-cylinder and booster pressures PM, PB has been reduced to a predetermined threshold $\Delta P$. If an affirmative decision (YES) is obtained in step S59, the control flow goes to step S60 to switch the braking system to the second operating state, more specifically, to open the master-cylinder shut-off valves 152, 162 and the front and rear communicating valves 154, 164, and close the simulator shut-off valve 158.

According to the control routine of FIG. 21, the braking system is switched to the second operating state since the need of controlling the wheel brake cylinder pressure with high accuracy is relatively low while the vehicle is stationary. While the vehicle is stationary, the ignition switch 230 may be turned off. When the ignition switch 230 is turned off, the solenoid coils of the master-cylinder shut-off valves 152, 162 are de-energized, and the shut-off valves 152, 162 are switched from the closed state to the open state, causing a change in the reaction force acting on the brake pedal 10 unexpectedly to the vehicle operator.

In the present embodiment of FIG. 21 wherein the fluid pressure in the wheel brake cylinders 20, 28 is controlled to the pressure of the second hydraulic pressure source 14 while the vehicle is stationary, the unexpected change of the operating state of the brake pedal 10 when the ignition switch 232 is turned off is reduced.

In the present tenth embodiment of FIG. 21 wherein the braking system is switched to the second operating state when the vehicle stationary, the amount of energy consumption can be reduced, by effectively utilizing the second hydraulic system 282. It will be understood that a portion of the brake control unit 32 assigned to execute steps S58 and S59 of the braking pressure control routine of FIG. 21 constitutes a braking pressure control device operable while the braking system is placed in the first operating state and while the vehicle is stationary, to control the wheel brake cylinder pressure to the pressure of the second hydraulic pressure source 14.

Although the tenth embodiment is arranged to control the linear valve devices 30 to control the wheel brake cylinder pressure, the duty ratio of the master-cylinder shut-off valves 152, 162 may be controlled so that the actual wheel brake cylinder pressure as represented by the fluid pressure detected by the brake cylinder pressure sensors 212–218 is gradually changed to the pressure of the second hydraulic pressure source. Step S59 in the control routine of FIG. 21 is not essential, and step S58 may be followed by step S60 so that the braking system is switched to the second operating state after the wheel brake cylinder pressure has been controlled to establish the desired value P*=(PM+PB)/2.

Figure 22:
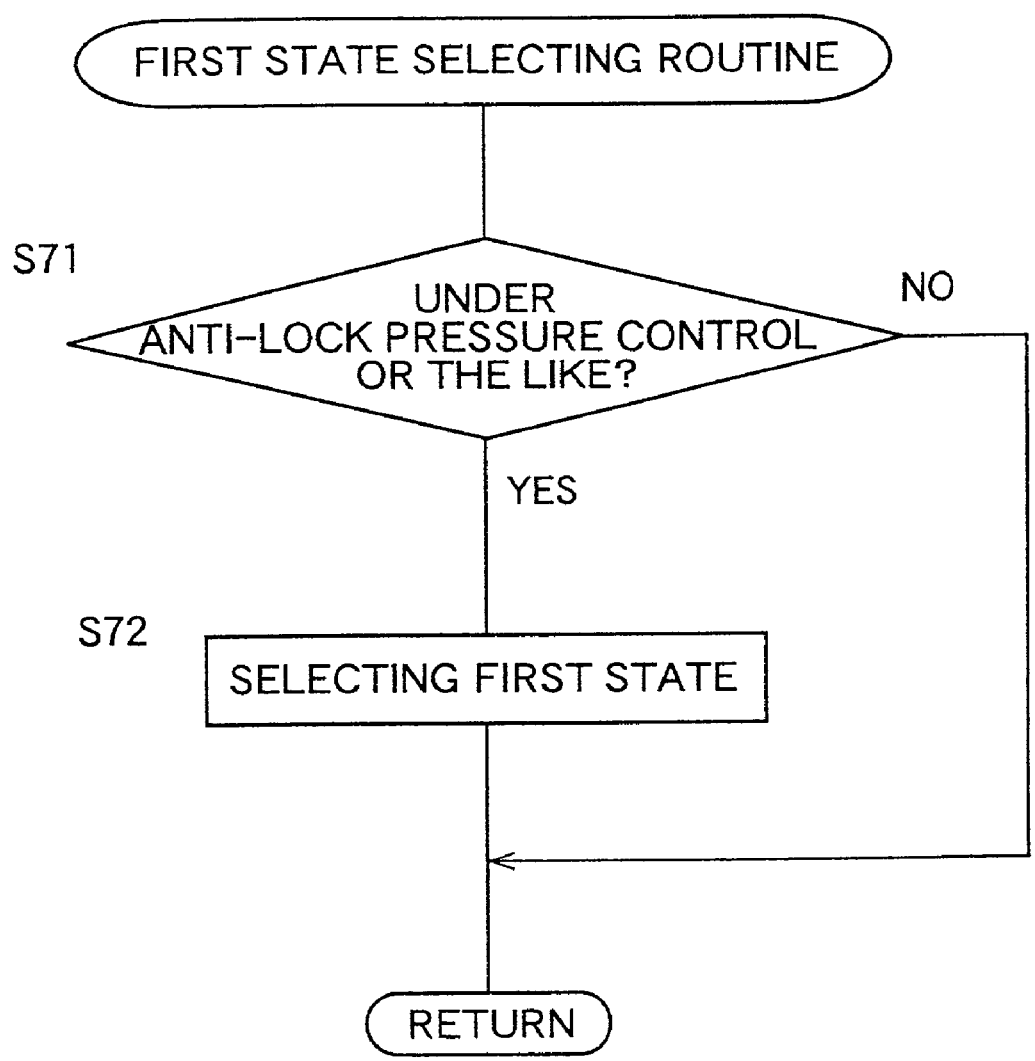
FIG. 22 is a flow chart illustrating a first state selecting routine executed according to a control program stored in a ROM of a braking pressure control apparatus according to an eleventh embodiment of the invention.

While the braking pressure control apparatus according to the ninth and tenth embodiments of the invention of FIGS. 16 and 21 is arranged to normally place the braking system in the first operating state in which the wheel brake cylinder pressure is controlled by controlling the linear valve devices 30, the braking system is normally placed in the second operating state, and is switched to the first operating state when a special braking control is required, according to a first state selecting routine illustrated in the flow chart of FIG. 22 according to an eleventh embodiment of this invention. The routine of FIG. 22 is initiated with step S71 to determine whether the running condition of the vehicle requires any special braking control such as the cooperative braking control, the anti-lock braking pressure control, the vehicle turning stability control (for controlling a difference between the total right and left braking forces of the vehicle). If an affirmative decision (YES) is obtained in step S71, the control flow goes to step S72 to switch the braking system to the first operating state. The determination in step S71 is effected on the basis of the states of the appropriate flags which are set for initiating the anti-lock braking pressure control and other special braking controls, as described above.

According to the eleventh embodiment of FIG. 11, the period during which the wheel brake cylinder pressure is controlled in the first operating state is reduced, resulting in an accordingly reduced amount of energy consumption by the braking system, and a prolonged service life of the linear valve devices 30. In the present embodiment wherein the second operating state is normally established, the second hydraulic system 282 can be more effectively utilized, than in the braking system which is switched to the second operating state to use the second hydraulic system 282 only when an abnormality of the braking system is detected. The embodiment of FIG. 22 may be advantageously combined with the diagnosis and treatments according to the data table of FIGS. 19A, 19B and 19C. In this case, the need to terminate the anti-lock braking pressure control and other special controls upon detection of an abnormality of the sensors, for instance, is significantly reduced, and the control stability of the braking system is accordingly improved.

Further, the wheel brake cylinders 20, 28 may be supplied with the pressurized fluid delivered from both of the first hydraulic pressure source 31 and the second hydraulic pressure source 14. When the rate of change of the desired wheel brake cylinder pressure has exceeded a predetermined upper limit, for instance, the pressurized fluid is delivered from the first and second hydraulic pressure sources 31, 14 to the wheel brake cylinders 20, 28, to increase the wheel brake cylinder pressure at an increased rate, so that the actual wheel brake cylinder pressure can be rapidly increased to the desired value. The operating state in which the wheel brake cylinders 20, 28 are supplied with the pressurized fluid from both of the first and second hydraulic pressure sources 31, 14 is referred to as "third operating state".

Figure 23:
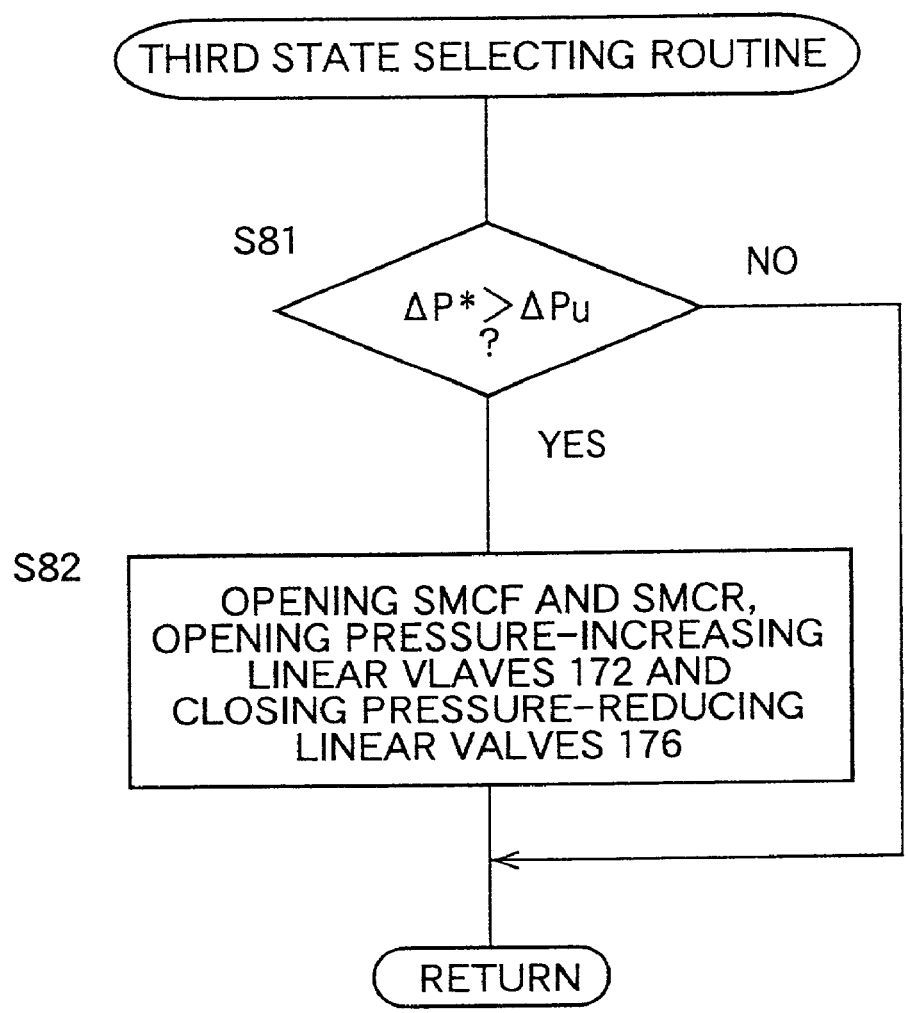
FIG. 23 is a flow chart illustrating a third state selecting routine executed according to a control program stored in the ROM.

An example of a third state selecting routine for switching the braking system to the third operating state according to a twelfth embodiment of the invention is illustrated in the flow chart of FIG. 23. The routine is initiated with step S81 to determine whether the rate of increase ΔP* of the desired wheel brake cylinder pressure P* is higher than a predetermined upper limit ΔPu. If an affirmative decision (YES) is obtained in step S81, the control flow goes to step S82 in which the master-cylinder shut-off valves 152, 162 are opened.

In the embodiment of FIG. 23, the wheel brake cylinders 20, 28 are supplied with the pressurized fluid delivered from the first hydraulic pressure source 31 and the pressurized fluid delivered from the second hydraulic pressure source 14, so that the wheel brake cylinder pressure can be increased at a higher rate, using the first and second hydraulic systems 280, 282.

Where the braking system is adapted to perform an abrupt braking control, the braking system may be switched to the third operating state when the abrupt braking control is performed. The abrupt braking control may be initiated when a rate of reduction in the distance between the present vehicle and an object in front of the vehicle has exceeded a predetermined upper limit. The rate of reduction of this distance may be detected on the basis of the output signal of a suitable sensor. The abrupt braking control may also be initiated when a hazard switch is operated by the vehicle operator in a emergency. Further, the abrupt braking control may be initiated when the rate of increase of the operating amount of the brake pedal 10 or the derivative of this rate of increase has exceeded a predetermined upper limit. The rate of increase of the brake operating amount may be represented by a rate of increase of the operating stroke S of the brake pedal 10 or a rate of increase of the master cylinder pressure PM. Where the braking system is adapted to perform an automatic braking control, the braking system may be switched to the third operating state. The automatic braking control is initiated when a distance between the present vehicle and the vehicle running in front of the present vehicle has been reduced to a predetermined lower limit.

Figure 24:
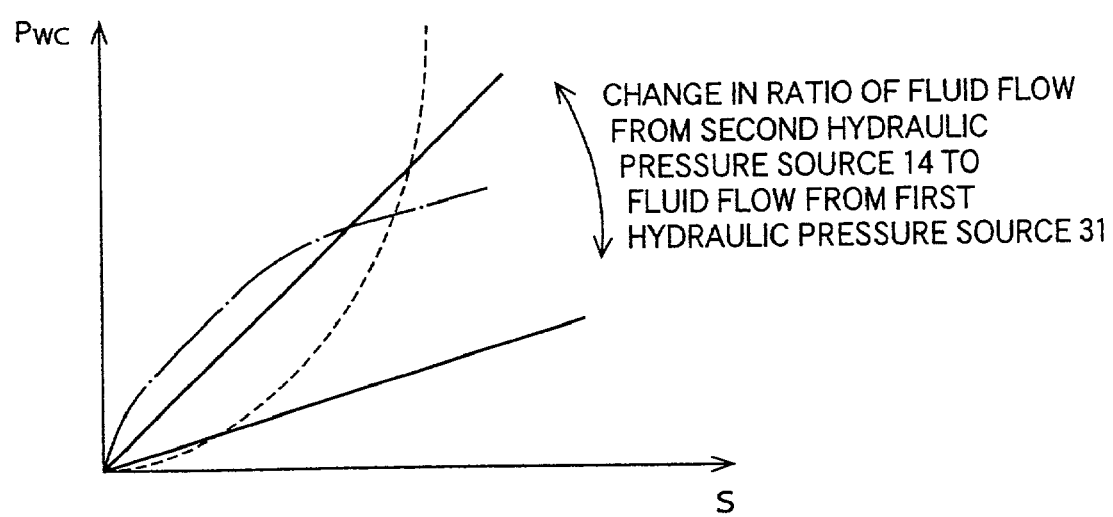
FIG. 24 is a graph indicating a braking effect characteristic of the braking pressure control apparatus of FIG. 15.

In the third operating state in which the wheel brake cylinders 20, 28 is supplied with the pressurized fluid delivered from both the first hydraulic pressure source 31 and the second hydraulic pressure source 14, the ratio of the fluid flow from the second hydraulic pressure source 14 to the fluid flow from the first hydraulic pressure source 31 may be controlled, to control the braking effect characteristic of the wheel brake cylinder, which is a relationship between the operating stroke S of the brake pedal S and the wheel brake cylinder pressure PWC (vehicle braking force), as indicated in the graph of FIG. 24. The above-indicated ratio of the fluid flows can be controlled by controlling the master-cylinder shut-off valves 152, 162 and the linear valve devices 30.

If the rate of flow of the fluid from the second hydraulic pressure source 14 to the wheel brake cylinders 20, 28 is made higher than the rate of flow of the fluid from the first hydraulic pressure source 31, the brake cylinders exhibit the braking effect characteristic wherein the wheel brake cylinder pressure is likely to follow the operating state of the brake pedal 10. If the rate of flow of the fluid from the second hydraulic pressure source 14 is made lower than the rate of flow of the fluid from the first hydraulic pressure source 31, the brake cylinders exhibit the braking effect characteristic wherein the brake cylinder pressure is likely to deviate from the operating state of the brake pedal 10.

The above-indicated ratio of the fluid flows from he first and second hydraulic pressure sources 31, 14 need not be constant during an operation of the brake pedal 10, as indicated by solid lines in FIG. 24, but may be changed continuously or in steps, to change the braking effect characteristic such that the relationship between the operating stroke S and the wheel brake cylinder pressure PWC is represented by a desired curve, as indicated by a broken line in FIG. 24, for instance.

It will be understood that a portion of the brake control unit 32 assigned to control the linear valve devices 30 and a cut-off valve device in the form of the master-cylinder shut-off valves 152, 162 so as to control the braking effect characteristic as indicated in the graph of FIG. 24 constitutes a ratio control portion for controlling the ratio of the fluid flows from the first and second hydraulic pressure sources 31, 14 to the wheel brake cylinders 20, 28.

Figure 25:
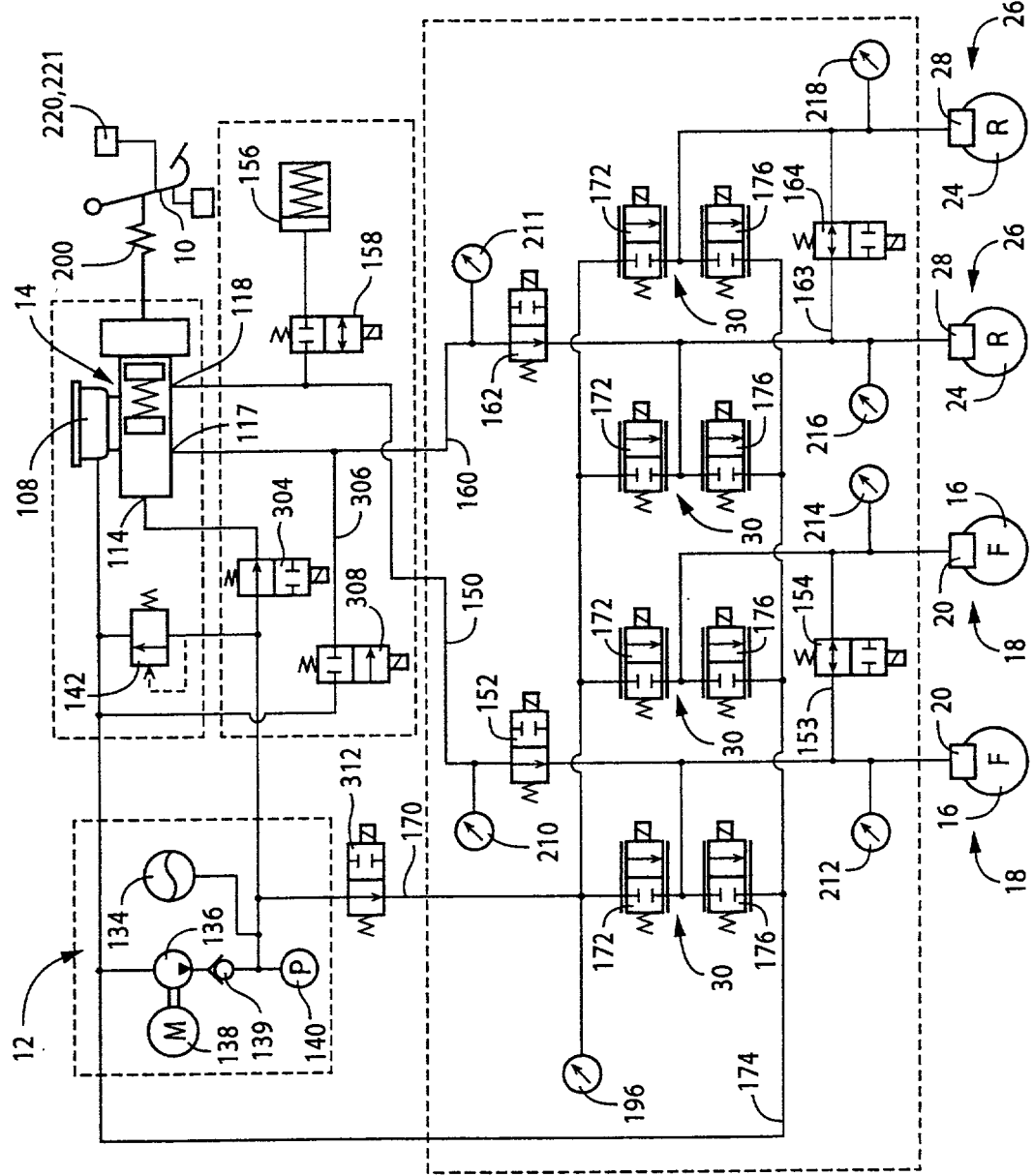
FIG. 25 is a schematic view showing a braking system including a braking pressure control apparatus constructed according to a tenth embodiment of this invention.

The braking system shown in FIG. 15 may be replaced by a braking system shown in FIG. 25 according to a thirteenth embodiment of this invention wherein a solenoid-operated shut-off valve 304 is provided between the pump device 12 and the high-pressure port 114 of the second hydraulic pressure source 14, and the brake-cylinder port 117 communicating with the booster chamber 98 is connected to the master reservoir 108 through a fluid passage 306 which is provided with a solenoid-operated shut-off valve 308.

When the shut-off valve 304 is closed, the pressurized fluid is not delivered from the accumulator 134 to the hydraulic booster 78. In this case, the shut-off valve 308 is opened to prevent the pressure in the booster chamber 98 from being lowered below the atmospheric level when the brake pedal is operated. Namely, the fluid is supplied from the master reservoir 108 through the fluid passage 306 to the booster chamber 98 upon operation of the brake pedal 10, preventing generation of a negative pressure in the booster chamber 998.

The solenoid-operated shut-off valve 304 is placed in the closed state when the braking system is placed in the first operating state, and in the open state when the braking system is laced in the second operating state. This arrangement eliminates unnecessary operation of the hydraulic booster 78 in the first operating state of the braking system, making it possible to reduce the amount of consumption of the pressurized fluid stored in the accumulator 134, and the amount of consumption of electric energy by the pump motor 138.

A solenoid-operated shut-off valve 312 may be provided in portion of the fluid passage 170 between the linear valve devices 30 and the pump device 12. By controlling the solenoid-operated shut-off valve 312 and shut-off valve 304 (and shut-off valve 308), the ratio of the fluid flow from the accumulator 135 to the hydraulic booster 78 to the fluid flow from the accumulator 135 to the linear valve devices 30 can be controlled. When the shut-off valves 312, 304 are controlled, the master-cylinder shut-off valves 152, 162, front and rear communicating valves 154, 164 and simulator shut-off valve 158 are accordingly controlled.

It will be understood that the shut-off valves 304 and 312 serve as cut-off valves which cooperate with the linear valve devices 30 and the master-cylinder shut-off valves 152, 162 to constitute the switching device that includes a pressurized-fluid distributing portion operable to control the ratio of a rate of flow of the pressurized fluid from a pressurizing device in the form of the pump device 12 to the brake cylinder 20, 28 through a pressure control valve device in the form of the linear valve devices 30 to a rate of flow of the pressurized fluid from the pressurizing device to the hydraulic booster 78. It will further be understood that the shut-off valves 304, 312 also cooperate to constitute the selectively cutting-off device indicated above.

In the second operating state, the wheel brake cylinders 20, 28 are supplied with the pressurized fluid delivered from the second hydraulic pressure source 14, such that the fluid pressurized by the advancing movement of the pressurizing piston 84 is delivered to the front wheel brake cylinders 30, While the pressurized fluid which is delivered from the pump device 12 and whose pressure has been controlled by the pressure regulating portion 88 is delivered to the rear wheel brake cylinders 28. Accordingly, the rear wheel brake cylinders 28 are supplied with a large amount of the pressurized fluid. However, the supply of the pressurized fluid to the wheel brake cylinders 28 tends to be delayed, since the hydraulic pressure control unit incorporating the linear valve devices 30, the pump device 12 and other hydraulic components is usually located on the front side of the vehicle.

In view of the above tendency, the braking system is placed in the third operating state in which the solenoid-operated shut-off valves 308, 312 are controlled to deliver the pressurized fluid from the accumulator 134 to both the linear valve devices 30 and the hydraulic booster 78, so that the pressurized fluid can be delivered at a higher rate of flow to the rear wheel brake cylinders 28, than in the first operating state, so as to reduce the delay of the braking effect produced by the rear wheel brake cylinders 28.

Thus, the braking pressure control apparatus according to the thirteenth embodiment of FIG. 25 is capable of controlling the ratio of the fluid flow from the accumulator 134 to the hydraulic booster 78 to the fluid flow from the accumulator 134 to the linear valve devices 30.

In the illustrated embodiments described above, the second hydraulic pressure source 14 includes the hydraulic booster 78. However, the hydraulic booster 78 may be replaced by a pressure-increasing device to permit the second hydraulic pressure source 14 to pressurize the fluid to a level higher than the level corresponding to the operating force of the brake pedal 10. Further, the second hydraulic pressure source 14 may include neither the hydraulic booster 78 nor the pressure-increasing device.

While the operating rod 94 is provided with the stroke simulator 200 in the illustrated embodiments, this stroke simulator 200 is not essential, provided that the stroke simulator 156 is provided.

Although the four linear valve devices 30 are provided for the respective four wheel brake cylinders 20, 28, the use of the four linear valve devices 30 is not essential. For instance, one linear valve device 30 may be provided for all of the four wheel brake cylinders, or each of the two pairs of the wheel brake cylinders 20, 28. Further, the pressure-increasing and pressure-reducing linear valves 172, 176 may be replaced by simple solenoid-operated shut-off valves. It is also noted that the linear valve devices 30 are not essential. In the absence of the linear valve devices 30, the wheel brake cylinder pressure can be controlled by controlling the pump device 12. The master-cylinder shut-off valves 152, 162 and other shut-off valves may be replaced by flow control valves capable of controlling a rate of fluid flow therethrough with a variable cross sectional area of fluid communication according to an electric current applied thereto.

The hydraulic booster 78 is not essential, and may be replaced by a vacuum booster.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking pressure control apparatus for controlling a pressure of a working fluid in a brake cylinder of a hydraulically operated brake in a hydraulically operated braking system for a vehicle, said braking pressure control apparatus comprising:
   a first hydraulic pressure source including a power-operated pressurizing device for pressurizing the fluid;
   a second hydraulic pressure source operable by an operation of a manually operable brake operating member, to pressurize the fluid to a pressure higher than a level corresponding to an operating force acting on said brake operating member;
   a switching device for selectively placing the braking system in a first operating state in which said brake cylinder is operated with the pressurized fluid delivered from said first hydraulic pressure source while said brake cylinder is disconnected from said second hydraulic pressure source, and a second operating state in which said brake cylinder is operated with the pressurized fluid delivered from said second hydraulic pressure source while said brake cylinder is disconnected from said first hydraulic pressure source; and
   at least one of (a) a change restricting means operable upon a switching of the braking system between said first and second operating states by said switching device, to restrict at least one of a change of an operating state of said brake operating member and a change of the fluid pressure in said brake cylinder, which changes take place due to said switching, and (b) a switching control device operable to control said switching device on the basis of a running condition of said vehicle, wherein said running condition of the vehicle is represented by at least one value selected from the group consisting of: a value indicating a slipping state of said wheel; a yaw rate of the vehicle; a steering angle of the vehicle; a running speed of the vehicle; a deceleration value of the vehicle; a value indicating a running environment of the vehicle external to the vehicle; and a value indicating a state of operation by a vehicle operator of a manually operable member provided on the vehicle, and wherein said switching control device includes a diagnosing device operable to determine whether the braking system is normal or not, said switching control device controlling said switching device on the basis of said running condition of the vehicle only when said diagnosing device determines that the braking system is normal.

2. A braking pressure control apparatus according to claim 1, wherein said second hydraulic pressure source includes at least one of a booster for boosting the operating force of said brake operating member, and a pressure-increasing device for increasing the fluid pressure generated by operation of said brake operating member.

3. A braking pressure control apparatus according to claim 1, wherein said second hydraulic pressure source includes a hydraulic booster for boosting the operating force of said brake operating member, said hydraulic booster being operable with a pressurized fluid having a pressure higher than a maximum pressure that can be generated by said second hydraulic pressure source based on the operating force of said brake operating member.

4. A braking pressure control apparatus according to claim 3, wherein said hydraulic booster includes a pressure regulating device operable to regulate the pressure of a pressurized fluid received a pressure source, to a level corresponding to the operating force of said brake operating member, said hydraulic booster having a booster chamber which receives the pressurized fluid whose pressure has been regulated by said pressure regulating portion, said booster chamber being partially defined by a rear end of a pressurizing piston which is operatively connected to said brake operating member.

5. A braking pressure control apparatus according to claim 1, wherein said switching device includes a solenoid-operated cut-off valve disposed in a fluid passage which connects said second hydraulic pressure source and said brake cylinder, and said change restricting device includes a solenoid-operated-cut-off valve control portion for controlling said solenoid-operated cut-off valve.

6. A braking pressure control apparatus according to claim 5, wherein said second hydraulic pressure source includes a power piston operatively connected to said brake operating member, a pressurizing piston connected to said power piston, a pressure source capable of delivering a pressurized fluid, and a pressure regulating device operable to regulate the pressure of the pressurized fluid received from said pressure source to a level corresponding to the operating force of said brake operating member, said second hydraulic pressure source having a first pressure chamber which is partially defined by a rear end face of said power piston and which receives the pressurized fluid whose pressure has been regulated by said pressure regulating device, said second hydraulic pressure source further having a second pressure chamber partially defined by a front end face of said pressurizing piston,
   and wherein the hydraulically operated braking system includes a plurality of brake cylinders including at least one first brake cylinder connected through a first fluid passage to said first pressure chamber, and at least one second brake cylinder connected through a second fluid passage to said second pressure chamber, said change restricting device includes a first solenoid-operated cut-off valve provided in said first fluid passage, and a second solenoid-operated cut-off valve provided in said second fluid passage,
   said solenoid-operated-cut-off-valve control portion being operable to control at least one of said first and second solenoid-operated cut-off valves, for restricting at least one of (1) at least one of a difference between the fluid pressure in said at least one first brake cylinder and the fluid pressure in said first pressure chamber, and a difference between the fluid pressure in said at least one second brake cylinder and the fluid pressure in said second pressure chamber, and (2) a difference between the fluid pressures in said at least one first brake cylinder and said at least one second brake cylinder.

7. A braking pressure control apparatus according to claim 6, wherein said solenoid-operated-cut-off-valve control portion is operable upon switching of the braking system from said first operating state to said second operating state, to open said second solenoid-operated cut-off valve so as to permit flows of the fluid through said second fluid passage, before opening said first solenoid-operated cut-off valve.

8. A braking pressure control apparatus according to claim 5, wherein said solenoid-operated cut-off valve is a solenoid-operated flow control valve whose amount of opening for fluid flows therethrough changes with an amount of electric current applied thereto, and wherein said solenoid-operated-cut-off-valve control portion controls said amount of opening of said solenoid-operated flow control valve on the basis of a difference between the fluid pressure in said brake cylinder and the pressure of the fluid pressurized by said second hydraulic pressure source.

9. A braking pressure control apparatus according to claim 5, wherein said solenoid-operated cut-off valve is a solenoid-operated shut-off valve which has a solenoid coil and which is selectively placed in an open state and a closed state by energization and de-energization of said solenoid coil, and wherein said solenoid-operated-cut-off-valve control portion includes a duty-control portion operable to control a duty ratio of said solenoid-operated shut-off valve.

10. A braking pressure control apparatus according to claim 5, wherein said solenoid-operated-cut-off-valve control portion controls said solenoid-operated cut-off valve while an absolute value of a difference between the fluid pressure in said brake cylinder and the pressure of the fluid pressurized by said second hydraulic pressure source is larger than a predetermined threshold.

11. A braking pressure control apparatus according to claim 5, wherein said solenoid-operated-cut-off-valve control portion initiates controlling said solenoid-operated cut-off valve upon detection of a symptom indicating a high degree of probability that said switching device switches the braking system between said first operating state and said second operating states.

12. A braking pressure control apparatus according to claim 5, wherein said solenoid-operated-cut-off-valve control portion is operable only when the braking system is switched from said first operating state to said second operating state, and is inoperable when the braking system is switched from said second operating state to said first operating state.

13. A braking pressure control apparatus according to claim 1, wherein said change restricting device includes an orifice provided between said second hydraulic pressure source and said brake cylinder.

14. A braking pressure control apparatus according to claim 6, wherein said change restricting device includes:

a connecting passage connecting said first fluid passage connecting said first pressure chamber and said at least one first brake cylinder, and said second fluid passage connecting said second pressure chamber and said at least one second brake cylinder, said connecting passage being connected at one end thereof to a portion of said first fluid passage between said first solenoid-operated cut-off valve and said at least one first brake cylinder, and at the other end thereof to a portion of said second fluid passage between said second solenoid-operated cut-off valve and said at least one second brake cylinder;

a communication valve provided in said connecting passage, and operable between a closed state therefore for inhibiting flows of the fluid through said connecting passage, and an open state for permitting the flows of the fluid through said connecting passage; and a communication control portion operable when the braking system is switched between said first and second operating states, to open said communication valve, and open at least one of said first ands second solenoid-operated cut-off valves.

15. A braking pressure control apparatus according to claim 1, wherein said first hydraulic pressure source includes a solenoid-operated pressure control valve device disposed between said pressurizing device and said brake cylinder and operable to control the fluid pressure in said brake cylinder while the braking system is placed in said first operating state, and wherein said change restricting device includes a control-state-change restricting portion operable upon said switching of the braking system between said first and second operating states, to control said solenoid-operated pressure control valve device, so as to restrict a change in a manner of control of the fluid pressure in said brake cylinder before and after said switching of the braking system.

16. A braking pressure control apparatus according to claim 1, wherein the braking system comprising a stroke simulator device including a stroke simulator connected to a fluid passage connecting said second hydraulic pressure source and said brake cylinder, and a simulator cut-off valve having a closed state for disconnecting said stroke simulator from said fluid passage and an open state for communicating said stroke simulator with said fluid passage, and where said change restricting device includes a fluid-flow control portion operable upon said switching of the braking system between said first and second operating states, to control said simulator cut-off valve, for controlling at least one of a flow of the fluid from said fluid passage into said stroke simulator and a flow of the fluid from said stroke simulator into said fluid passage.

17. A braking pressure control apparatus according to claim 16, wherein said switching device includes a solenoid-operated cut-off valve disposed in a fluid passage which connects said second hydraulic pressure source and said brake cylinder, and said change restricting device includes a valve-opening control portion for opening said solenoid-operated cut-off valve and said simulator cut-off valve at different times.

18. A braking pressure control apparatus according to claim 17, wherein said valve-opening control portion opens said solenoid-operated cut-off valve before opening said simulator cut-off valve, when said switching device is commanded to switch the braking system from said first operating state to said second operating state.

19. A braking pressure control apparatus according to claim 16, wherein said change restricting device includes a brake-off switching portion operable to effect at least one of a switching operation of said solenoid-operated cut-off valve between the closed and open states and a switching operation of said simulator cut-off valve between the closed and open states, while said brake operating member is not in operation.

20. A braking pressure control apparatus according to claim 19, wherein said brake-off switching control portion is operated to initiate at least one of said switching operations of said solenoid-operated cut-off valve and said simulator cut-off valve after detection of a non-operated state of said brake operating member after a predetermined condition for switching the braking system between said first operating state and said second operating state is satisfied.

21. A braking pressure control apparatus according to claim 16, wherein said change restricting device includes a simulator-valve control portion operable when a predetermined condition for switching the braking system from said second operating state to said first operating state, to control said simulator cut-off valve.

22. A braking pressure control apparatus according to claim 1, wherein said change restricting means comprises a pressure-difference reducing device operable to reduce a difference between the fluid pressure in said brake cylinder and the pressure of the fluid pressurized by said second hydraulic pressure source, when the braking system is switched between said first and second operating states by said switching device.

23. A braking pressure control apparatus according to claim 1, wherein said change restricting means comprises a flow-amount reducing device operable to reduce amounts of flow of the fluid between said second hydraulic pressure source and said brake cylinder when the braking system is switched between said first and second operating states by said switching device.

24. A braking pressure control apparatus according to claim 1, wherein said change restricting means comprises a change-rate restricting device for restricting a rate of change of the fluid pressure in said brake cylinder when the braking system is switched between said first and second operating states by said switching device.

25. A braking pressure control apparatus according to claim 1, wherein said switching control device commands said switching device to effect at least a switching operation of the braking system from said first operating state to said second operating state, while said brake operating member is not in operation.

26. A braking pressure control apparatus according to claim 1, wherein said change restricting means comprises a control-state-change restricting device operable to restrict a change in a control characteristic of the fluid pressure in said brake cylinder when the braking system is switched between said first and second operating states by said switching device.

27. A braking pressure control apparatus according to claim 26, wherein said control-state-change restricting device is operable to change said control characteristic each time said brake operating member is operated, such that the control characteristic during switching of the braking system is changed toward a nominal control characteristic of one of said first and second operating states to which the braking system is switched.

28. A braking pressure control apparatus according to claim 1, further comprising an influence reducing device operable to reduce an influence of the switching of the braking system by said switching device on an operating state of said brake operating member, which influence is unexpected to an operator of the brake operating member.

29. A braking pressure control apparatus according to claim 1, wherein said change restricting means comprises a modified-pressure-control device operable to control the fluid pressure in said brake cylinder during the switching of the braking system by said switching device, in a manner different from normal manners in which the fluid pressure in the brake cylinder is controlled in said first and second operating states.

30. A braking pressure control apparatus according to claim 1, wherein said change restricting means comprises a forecasting-type change restricting device operable to initiate an operation to restrict at least one of a change of an operating state of said brake operating member and a change of the fluid pressure in said brake cylinder, upon detection of a symptom indicating a high degree of probability that the braking system is switched between said first and second operating states by said switching device.

31. braking pressure control apparatus according to claim 1, wherein said switching device is operable in at least one of said first and second states, to establish a third state in which said brake cylinder is operated by both of said first and second hydraulic systems.

32. A braking pressure control apparatus according to claim 31, wherein said switching control device includes a ratio control portion operable to control said switching device for controlling a ratio of a rate of flow of the pressurized fluid from said first hydraulic pressure source to said brake cylinder to a rate of flow of the pressurized fluid from said second hydraulic pressure source to said brake cylinder.

33. A braking pressure control apparatus according to claim 32, wherein said hydraulically operated brake is provided for braking a wheel of a vehicle, and said ratio control portion includes a ratio determining portion for determining said ratio on the basis of a state of said vehicle.

34. A braking pressure control apparatus according to claim 31, wherein said first hydraulic pressure source includes (a) a power-operated pressurizing device operable to pressurize the fluid, and (b) a pressure control valve device operable to control the pressure of the fluid pressurized by said pressurizing device, and wherein said second hydraulic pressure source includes (a) a master cylinder operable to pressurize the fluid to a level corresponding to said operating force of said brake operating member, and (b) at least one of a hydraulic booster operable with the pressurized fluid delivered from said pressurizing device, to boost said operating force and transmit the boosted operating force to said master cylinder, and a pressure-increasing device operable with the pressurized fluid delivered from said pressurizing device, to increase the pressure of the fluid pressurized by said master cylinder and supply the pressurized fluid having the increased pressure to said brake cylinder, said switching control device including a pressurized-fluid distributing portion operable to control a ratio of a rate of flow of the pressurized fluid from said pressurizing device to said brake cylinder through said pressure control valve device to a rate of flow of the pressurized fluid from said pressurizing device to said at least one of said hydraulic booster and said pressure-increasing device.

35. A braking pressure control apparatus according to claim 1, wherein said switching device includes a selectively cutting-off device operable between a first cut-off state in which said brake cylinder is communicated with said first hydraulic pressure source and is disconnected from said second hydraulic pressure source, and a second cut-off state in which said brake cylinder is communicated with said second hydraulic pressure source and is disconnected from said first hydraulic pressure source.

36. A braking pressure control apparatus according to claim 1, wherein said hydraulically operated brake is provided for braking a wheel of the vehicle, and said switching control device command said switching device to establish said first state, when the running condition of said vehicle requires said brake cylinder to be operated with the pressurized fluid whose pressure does not corresponds to said operating force of said brake operating member.

37. A braking pressure control apparatus according to claim 1, wherein said hydraulically operated brake is provided for each of four wheels of the vehicle, and said switching control device commands said switching device to establish said first state, when the running condition of said vehicle does not require the brakes for the four wheels to be controlled in the same manner.

38. A braking pressure control apparatus according to claim 1, wherein said hydraulically operated brake is provided for braking a wheel of the vehicle, and said switching control device commands said switching device to establish said first state, when the running condition of said vehicle requires said brake cylinder to be operated with the pressurized fluid whose pressure is different from the pressure of the fluid pressurized by said second hydraulic pressure source.

39. A braking pressure control apparatus according to claim 31, wherein said hydraulically operated brake is provided for braking a wheel of the vehicle, and said switching control device is operable when said vehicle is permitted to run after having been inhibited from running to command said switching device to establish said second state, when said vehicle which has been inhibited from running is permitted to run.

40. A braking pressure control apparatus according to claim 1, wherein said hydraulically operated brake is provided for braking a wheel of the vehicle, and said switching control device commands said switching device to establish said second state, when said vehicle is stationary.

41. A braking pressure control apparatus according to claim 1, wherein said hydraulically operated brake is provided for braking a wheel of a vehicle, and said switching control device includes a braking pressure control device operable when said first state is established by said switching device and when said vehicle is stationary, to control the pressure of the pressurized fluid by which said brake cylinder is operated, to a level of the fluid pressurized by said second hydraulic pressure source.

42. A braking pressure control apparatus according to claim 1, further comprising a braking pressure control device operable when said first state is established by said switching device, to control the pressure of the pressurized fluid by which said brake cylinder is operated, on the basis of an operating amount of said brake operating member, and at least one of a rate of change of said operating amount and a derivative of said rate of change.

43. A braking pressure control apparatus according to claim 1, further comprising:
    a stroke simulator device operable to permit flows of the fluid to and from said second hydraulic pressure source, according to an operation of said brake operating member; and
    a diagnosing device for diagnosing said stroke simulator device for any abnormality thereof,
    and wherein said switching control device commands said switching device to establish said second state, when said diagnosing device determines that said stroke simulator device is abnormal.

44. A braking pressure control apparatus according to claim 1, further comprising:
    a brake-operating-state detecting device for detecting an operating state of said brake operating member;
    a diagnosing device for diagnosing said brake-operating-state detecting device for any abnormality thereof; and
    a first-pressure-source control device for controlling the pressure of the fluid pressurized by said first hydraulic pressure source, on the basis of an output signal of said brake-operating-state detecting device,
    and wherein said switching control device commands said switching device to establish said second state, when said diagnosing device determines that said brake-operating-state detecting device is abnormal.

45. A braking pressure control apparatus according to claim 1, further comprising:
    a stroke detecting device for detecting an operating stroke of said brake operating member;
    a force detecting device for detecting said operating force of said brake operating member;
    a diagnosing device for diagnosing said stroke detecting device and said force detecting device for any abnormality thereof;
    a first pressure control device operable when said stroke detecting device and said force detecting device are normal, to control the pressure of the pressurized fluid by which said brake cylinder is operated, on the basis of both the operating stroke and the operating force which are respectively detected by said stroke detecting device and said force detecting device; and
    a second pressure control device operable when one of said stroke detecting device and said force detecting device is abnormal, to control the pressure of the pressurized fluid by said brake cylinder is operated, on the basis of an output signal of the other of said stroke detecting device and said force detecting device.

46. A braking pressure control apparatus according to claim 1, further comprising:
    a plurality of operating-state detecting devices for detecting an operating state of said brake operating member;
    a diagnosing device for diagnosing each of said plurality of operating-state detecting devices for any abnormality thereof;
    a first pressure control device operable when said plurality of operating-state detecting devices are normal, to control the pressure of the fluid pressurized by said first hydraulic pressure source on the basis of at least one of output signals of said plurality of operating-state detecting devices; and
    a second pressure control device operable when at least one of said plurality of operating-state detecting devices is normal and when at least one of said plurality of operating-state detecting devices is abnormal, to control the pressure of the fluid pressurized by said first hydraulic pressure source, on the basis of an output signal of said at least one operating-state detecting device which is normal.

47. A braking pressure control apparatus according to claim 1, which is provided for controlling the pressure of the pressurized fluid in each of a plurality of brake cylinders of a plurality of brakes, and wherein said first hydraulic pressure source includes a plurality of pressure control valve devices which are operable independently of each other to control the pressures of the pressurized fluid in said plurality of brake cylinders, on the basis of the fluid pressurized by said pressurizing device, said braking pressure control apparatus further comprising:

a plurality of braking-pressure detecting devices for detecting the pressure in said plurality of brake cylinders, respectively;

a diagnosing device for diagnosing each of said braking-pressure detecting devices for any abnormality thereof;

a connecting passage connecting two of said plurality of brake cylinders;

a communicating valve provided in said connecting passage;

a first pressure control device operable when said plurality of braking-pressure detecting devices are all normal, to control said plurality of pressure control valve devices on the basis of the pressures detected by said braking-pressure detecting devices; and a second pressure control device operable when one of said plurality of braking-pressure control devices is abnormal and when the braking-pressure detecting device corresponding to the brake cylinder connected through said connecting passage to the brake cylinder corresponding to said abnormal braking-pressure detecting device is normal, said second pressure control device controlling the two pressure control valve devices connected to each other by said connecting passage, on the basis of the pressure detected by the normal braking-pressure detecting device, while said communicating valve in said connecting passage is open.

48. A braking pressure control apparatus according to claim 1, which is provided for controlling the pressure of the pressurized fluid in each of a plurality of brake cylinders of a plurality of brakes, and wherein said first hydraulic pressure source includes a plurality of pressure control valve devices which are operable independently of each other to control the pressures of the pressurized fluid in said plurality of brake cylinders, on the basis of the fluid pressurized by said pressurizing device, said braking pressure control apparatus further comprising:

a diagnosing device for diagnosing each of said pressure control valve devices for any abnormality thereof;

a connecting passage connecting two of said plurality of brake cylinders;

a communicating valve provided in said connecting passage;

a first pressure control device operable when said plurality of pressure control valve devices are all normal, to control the pressures in said plurality of brake cylinders, by controlling said plurality of pressure control valve devices, respectively; and a second pressure control device operable when said diagnosing device determines that at least one of said plurality of pressure control valve is abnormal and when the pressure control valve device corresponding to the brake cylinder connected through said connecting passage to the brake cylinder corresponding to said abnormal pressure control valve device is normal, said second pressure control device controlling the pressures in the two brake cylinders connected to each other by said connecting passage, by controlling the normal pressure control valve device, while said communicating valve in said connecting passage is open.

49. A braking pressure control apparatus to according to claim 1, which is provided for controlling the pressure of the pressurized fluid in each of four brake cylinders of four brakes, and wherein said first hydraulic pressure source includes four pressure control valve devices which are operable independently of each other to control the pressures of the pressurized fluid in said four brake cylinders, on the basis of the fluid pressurized by said pressurizing device, said braking pressure control apparatus further comprising:

a diagnosing device for diagnosing each of said four pressure control valve devices for any abnormality thereof;

a first pressure control device operable when said four pressure control valve devices are all normal, to control the pressures in said plurality of brake cylinders, by controlling said four pressure control valve devices, respectively; and a second pressure control device operable when said diagnosing device determines that one of said four pressure control valve device is abnormal, to control the pressure in each of the brake cylinders corresponding to the normal pressure control valve devices, by controlling said normal pressure control valve devices, while the brake cylinder corresponding to the abnormal pressure control valve device is disconnected from both of said first and second hydraulic pressure sources.

* * * * *